US008236387B2

(12) United States Patent
Amimori et al.

(10) Patent No.: US 8,236,387 B2
(45) Date of Patent: Aug. 7, 2012

(54) PROCESS OF PRODUCING PATTERNED BIREFRINGENT PRODUCT

(75) Inventors: Ichiro Amimori, Minami-ashigara (JP); Hideki Kaneiwa, Minami-ashigara (JP); Shinichi Morishima, Minami-ashigara (JP); Haruhiko Yoshino, Fujinomiya (JP); Hidetoshi Tomita, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 1268 days.

(21) Appl. No.: 11/943,037

(22) Filed: Nov. 20, 2007

(65) Prior Publication Data
US 2008/0143926 A1 Jun. 19, 2008

(30) Foreign Application Priority Data

Nov. 21, 2006 (JP) .................................. 2006-314089
Aug. 21, 2007 (JP) .................................. 2007-215185

(51) Int. Cl.
*C08F 2/46* (2006.01)
*C08F 2/48* (2006.01)
*C08J 7/18* (2006.01)
*C08J 7/04* (2006.01)

(52) U.S. Cl. ......... 427/493; 427/487; 427/508; 427/510

(58) Field of Classification Search .................. 427/553, 427/385.5, 496, 493, 492; 349/117–118; 252/299.1; 428/1.6
See application file for complete search history.

(56) References Cited

U.S. PATENT DOCUMENTS

| 7,244,798 B2 | 7/2007 | Matsumoto et al. |
| 2003/0111640 A1 | 6/2003 | Lub |
| 2004/0120040 A1 | 6/2004 | Moia |
| 2005/0101752 A1* | 5/2005 | Matsumoto et al. .......... 526/319 |
| 2006/0083867 A1* | 4/2006 | Ito et al. ......................... 428/1.3 |
| 2006/0177605 A1 | 8/2006 | Lub et al. |
| 2006/0232734 A1 | 10/2006 | Schadt et al. |

(Continued)

FOREIGN PATENT DOCUMENTS

CN 1500780 A 6/2004

(Continued)

OTHER PUBLICATIONS

B.M.I. van der Zande et al, Synthesis, Properties, and Photopolymerization of liquid-Crystalline Oxetanes: Application in Transflective Liquid-Crystal Displays, Mar. 7, 2006, Advanced Funtional Materials, 2006, 16, 791-798.*

(Continued)

*Primary Examiner* — Dah-Wei Yuan
*Assistant Examiner* — Nga Leung Vera Law
(74) *Attorney, Agent, or Firm* — Buchanan Ingersoll & Rooney PC

(57) ABSTRACT

A process of readily producing a patterned birefringent product excellent in resolution and heat-resistance is provided. Said process comprises at least the following steps [1] to [3] in order:
  [1] preparing a birefringence pattern builder which comprises an optically anisotropic layer comprising a polymer, and said optically anisotropic layer has a retardation disappearance temperature in the range higher than 20° C.,
  at said retardation disappearance temperature in-plane retardation becomes 30% or lower of the retardation at 20° C. of the same optically anisotropic layer, and
  said retardation disappearance temperature rises by light exposure;
  [2] subjecting the birefringence pattern builder to patterned light exposure;
  [3] heating the laminated structure obtained after the step [2] at 50° C. or higher and 400° C. or lower.

11 Claims, 12 Drawing Sheets

U.S. PATENT DOCUMENTS

| | | | |
|---|---|---|---|
| 2008/0106725 A1 | 5/2008 | Schuetzmann et al. | |
| 2009/0174857 A1* | 7/2009 | Amimori et al. | 349/158 |

FOREIGN PATENT DOCUMENTS

| | | | |
|---|---|---|---|
| GB | 2394718 A | 5/2004 | |
| JP | 03-141320 A | 6/1991 | |
| JP | H06-289374 A | 10/1994 | |
| JP | H08-304626 A | 11/1996 | |
| JP | H10-153707 A | 6/1998 | |
| JP | H11-095205 A | 4/1999 | |
| JP | 2001-004837 A | 1/2001 | |
| JP | 2002-006138 A | 1/2002 | |
| JP | 2003-185835 A | 7/2003 | |
| JP | 2003-207641 A | 7/2003 | |
| JP | 2005-017430 A | 1/2005 | |
| JP | 2005-037736 A | 2/2005 | |
| JP | 2005-055486 A | 3/2005 | |
| JP | 2005-227472 A | 8/2005 | |
| JP | 2005-538416 A | 12/2005 | |
| JP | 2006-003506 A | 1/2006 | |
| JP | 2006-142699 A | 6/2006 | |
| JP | 2006-162813 A | 6/2006 | |
| JP | 2006-520928 A | 9/2006 | |
| JP | 2006-313239 A | 11/2006 | |
| JP | 2007-001130 A | 1/2007 | |
| WO | WO 03/006261 A1 | 1/2003 | |
| WO | WO 03/019276 A2 | 3/2003 | |
| WO | WO 2004/025337 A1 | 3/2004 | |
| WO | WO 2004/083913 | 9/2004 | |
| WO | WO 2005/005727 A1 | 1/2005 | |
| WO | WO 2005/122099 A2 | 12/2005 | |
| WO | WO 2006104252 A2 * | 10/2006 | |

OTHER PUBLICATIONS

Office Action from State Intellectual Property Office of the People's Republic of China issued in corresponding Chinese Patent Application No. 200710186700.4 dated Jul. 19, 2011, with an English translation.

Office Action issued by the European Patent Office on Feb. 2, 2012, in corresponding European Patent Application No. 07022544.6.

Office Action issued by Chinese Patent Office issued in corresponding Chinese Patent Application No. 200710186700.4 dated Nov. 9, 2011, and translation thereof.

Official Action issued in Japanese Patent Application No. 2007-299181, May 22, 2012, pp. 1-7, Japanese Patent Office, JP, and English-language translation (6 pages).

Lub, J., et al., "Formation of Optical Films by Photo-Polymerisation of Liquid Crystalline Acrylates and Application of These Films in Liquid Crystal Display Technology," *Mol. Cryst. Liu. Cryst.*, vol. 429, pp. 77-99, Taylor & Francis Inc., England.

* cited by examiner (a)

(b)

(c)

(d)

(e)

(f)

(h)

(g)

(i)

(a)

(b)

(c)

(d)

(e)

(f)

(b)

(c)

BP-1

BP-3

BP-4

PROCESS OF PRODUCING PATTERNED BIREFRINGENT PRODUCT

TECHNICAL FIELD

The present invention relates to a process of producing a patterned birefringent product and a patterned birefringent product such as a substrate for a liquid crystal display device produced by said process.

RELATED ART

Attempts have been made to industrially exploit birefringence patterns in a variety of forms. Japanese Unexamined Patent Publication (KOKAI) Heisei No. 3-141320 proposes a method for recording images employing birefringence patterns. Birefringence patterns that are normally unidentifiable to the human eye are rendered visible by being sandwiched between two polarizing plates. A technique of actively exploiting birefringence pattern characteristics by "using polarizing plates to render visible what was originally invisible" is disclosed in Japanese Unexamined Patent Publication (KOKAI) No. 2007-1130, which proposes the use of a birefringence pattern as a true authentication image.

Reflection holograms have been exclusively employed in the area of authentication images. With holograms, an authenticity determination can readily be made visually, and simple copying with a copier is difficult. Thus, they are suited to be used as authentication images. However, holograms have become easy to produce as the technology has become widespread in recent years, and it has become relatively easy to produce imitations that are indistinguishable from the original visible holograms. To avoid forgery, a configuration is possible in which a machine is used to more precisely detect the direction and intensity of refracted light, but visible identification has become difficult.

By contrast, birefringence patterns can be readily identified using polarizing plates and the manufacturing technique is not that widespread. Thus, forgeries are difficult, and birefringence patterns are suited to be used as authentication images.

Birefringence patterns can also be employed in diffraction gratings and binary lenses, which are optical elements manufactured using refractive index patterns. The use of birefringence patterns permits the manufacturing of polarized light-separating elements that only function as optical elements on desired polarized light. Thus, application in the areas of projectors and optical communication can be expected.

Further, the application of birefringence patterns to information-recording materials is also conceivable. So-called "photopolymers" can record information in the form of densities and refractive indexes, while birefringence pattern information can be recorded in the form of birefringence. While densities and refractive indexes are scalar quantities having only magnitude, birefringence is a vector quantity having both magnitude and direction, and can thus be anticipated to permit information recording of greater density.

As an example of the applications of birefringence patterns, their use in three-dimensional image displays is also being studied (Japanese Unexamined Patent Publication (KOKAI) No. 2005-37736).

A number of techniques of producing birefringence patterns have been proposed.

One technique employs heat. For example, the technique of using a heat mode laser or thermal head to apply heat to the image-forming portion of an anisotropic film, thereby completely or partially reducing the anisotropy, is employed in the above-cited Japanese Unexamined Patent Publication (KOKAI) Heisei No. 3-141320. The technique of using a laser or a stamp having a heat pattern on a retardation film to thermally attenuate the orientation is employed in the above-cited Japanese Unexamined Patent Publication (KOKAI) No. 2007-1130. Further, the technique of using a heated member having protrusions to selectively eliminate retardation in a retardation film is employed in the above-cited Japanese Unexamined Patent Publication (KOKAI) 2005-37736.

However, patterns produced by techniques in which birefringence is reduced with heat, as set forth above, all have the drawback of poor heat resistance. That is, there is a risk that when heat is applied to a portion in which birefringence remains, the birefringence of that portion will end up decreasing. Further, in techniques employing thermal heads and heat stamps, since it is difficult to impart different thermal conductivities in the direction of thickness and the in-surface direction, it is extremely difficult to create a pattern at a resolution lower than the thickness of the film. Heating with a laser permits the creation of high-resolution patterns, but there is a problem in that the drawing of fine patterns by scanning with a laser is time-consuming.

The above-cited Japanese Unexamined Patent Publication (KOKAI) Heisei No. 3-141320 also proposes the technique of lowering the birefringence by using a photodecomposing photopolymer or a photoisomerizing polymer with light. However, the resistance to light of the pattern that is produced by this technique is low, rendering the pattern unsuitable as a birefringence pattern for use in optical elements in particular.

Another technique for producing birefringence patterns has been proposed in the form of the method of applying a coating liquid comprising polymerizable liquid crystals and a polymerization initiator on a support having an alignment film, conducting patterned exposure through a photomask to the coating liquid wherein the liquid crystals are in an oriented state, fixing the orientation of exposed portions by polymerization, applying heat to create an isotropic phase in unexposed portions, and conducting exposure a second time to cause only those portions exposed the first time around to exhibit optical anisotropy (British Patent 2,394,718A, Advanced Function Materials, 791-798, 16, 2006). However, in this method, controlling the state of orientation of the liquid crystals prior to fixation requires conducting multiple exposures while carefully controlling the temperature of the overall system, presenting a problem in the form of a demanding manufacturing process.

Application of the manufacturing of birefringence patterns can also be expected in the area of liquid-crystal displays.

A CRT (cathode ray tube) has been mainly employed in various display devices used for office automation (OA) equipment such as a word processor, a notebook-sized personal computer and a personal computer monitor, mobile phone terminal and television set. In recent years, a liquid crystal display device (LCD) has more widely been used in place of a CRT, because of its thinness, lightweight and low power consumption. A liquid crystal display device usually comprises a liquid crystal cell and polarizing plates. The polarizing plate usually has protective films and a polarizing film, and is obtained typically by dying a polarizing film composed of a polyvinyl alcohol film with iodine, stretching the film, and laminating the film with the protective films on both surfaces. A transmissive liquid crystal display device usually comprises polarizing plates on both sides of a liquid crystal cell, and occasionally comprises one or more optical compensation films having optically anisotropic layer. A reflective liquid crystal display device usually comprises a reflector plate, a liquid crystal cell, one or more optical compensation films, and a polarizing plate in this order. A liquid crystal cell comprises liquid-crystalline molecules, two substrates encapsulating the liquid-crystalline molecules, and electrode layers applying voltage to the liquid-crystalline molecules. The liquid crystal cell switches ON and OFF displays depending on variation in orientation state of the liquid-crystalline molecules, and is applicable both to transmission type and reflective type, of which display modes ever proposed include TN (twisted nematic), IPS (in-plane switching), OCB (optically compensatory bend) and VA (vertically aligned) ECB (electrically controlled birefringence), and STN (super twisted nematic).

Further, taking advantage of its features such as thinness, lightness, and small energy consumption, LCD recently has been used widely as a display device for a mobile use such as mobile phone or digital camera. In a mobile use, a display device is needed to be used outdoors as well as indoors, or for long time without energy supply. Therefore, semi-transmissive LCD is preferably used, which can display in transmissive mode by using backlight indoors, and in reflective-mode by using outside light instead of backlight outdoors. However, semi-transmissive LCD, which has transmissive and reflective displays in one pixel at the same time, needs an optically compensation sheet sufficient to meet the requirements of both transmissive and reflective modes. Therefore, many problems arise: the LCD becomes thick because it requires two or more optically compensation sheets laminated together in various angles; the laminated structure of the optically compensation sheets becomes expensive because lamination by roll to roll method is not possible; and viewing angle becomes asymmetric because the angles of the optically compensation sheets are various.

In order to solve these problems, a method is proposed wherein an optically anisotropic layer is formed only in the reflective parts of semi-transmissive LCD (SID Symposium Digest 34, 194 (2003)). In this method, first (with photomask) and second (in whole area) light exposures to the optically alignment film are conducted by using polarized ultraviolet ray irradiation with the polarized angles rotated by 45° and changing the alignment directions of polymerizable liquid crystalline compounds on the film. By this method, optically compensation sheet for semi-transmissive LCD is not needed and LCD can be drastically thin. However, this method has a problem of burden in the process, because it needs three ultraviolet ray irradiations including two polarized ultraviolet ray irradiations, and two coatings of optically alignment layer and polymerizable liquid crystalline layer. Therefore, the method has not come into practical use. Further, in this method, the two alignment domains must have the same retardations, and thus flexibility of designing the switching of LCD is limited.

SUMMARY OF THE INVENTION

An object of the present invention is to provide a process and material which are useful for readily producing a patterned birefringent product excellent in resolution and heat-resistance. Another object of the present invention is to provide a process and material of producing pattern which is almost transparent and colorless when observed through no polarizing plate and becomes easily pattern-identifiable when observed through a polarizing plate. Further object of the present invention is to provide a process useful for producing a substrate for liquid crystal display device having patterned retardation. Another object of the present invention is to provide a substrate for liquid crystal display device contributing to the reduction of the number of optical compensation sheets of LCD, particularly semi-transmissive LCD, and thickness of LCD.

The present invention thus provides the following (1) to (27).

(1) A process of producing a patterned birefringent product, which comprises at least the following steps [1] to [3] in order:

[1] preparing a birefringence pattern builder which comprises an optically anisotropic layer comprising a polymer, and said optically anisotropic layer has a retardation disappearance temperature in the range higher than 20° C., at said retardation disappearance temperature in-plane retardation becomes 30% or lower of the retardation at 20° C. of the same optically anisotropic layer, and said retardation disappearance temperature rises by light exposure;

[2] subjecting the birefringence pattern builder to patterned light exposure;

[3] heating the laminated structure obtained after the step [2] at 50° C. or higher and 400° C. or lower.

(2) The process according to the above (1), wherein the risen retardation disappearance temperature is not in the range of 250° C. or lower.

(3) The process according to the above (1) or (2), wherein the in-plane retardation at 20° C. of the birefringence pattern builder is 10 nm or higher.

(4) The process according to any one of the above (1) to (3), wherein the polymer has an unreacted reactive group.

(5) The process according to any one of the above (1) to (4), wherein the optically anisotropic layer is a layer formed by coating with a solution comprising a liquid crystalline compound having at least one reactive group and drying the solution to thereby form a liquid crystal phase, and then applying heat or irradiating ionized radiation to the liquid crystal phase for polymerization and fixation.

(6) The process according to the above (5), wherein the liquid crystalline compound has two or more types of reactive groups each of which has different polymerization condition.

(7) The process according to the above (5), wherein the liquid crystalline compound has a radically reactive group and a cationically reactive group.

(8) The process according to the above (7), wherein the radically reactive group is acrylic group and/or methacrylic group and the cationically reactive group is vinyl ether group, oxetanyl group, and/or epoxy group.

(9) The process according to any one of the above (1) to (4), wherein the optically anisotropic layer is a stretched film.

(10) The process according to any one of the above (1) to (9), wherein the birefringence pattern builder comprises two or more optically anisotropic layers.

(11) The process according to the above (10), wherein the two or more optically anisotropic layers comprises at least two optically anisotropic layers having different direction of slow axis and/or different in-plane retardation to each other.

(12) The process according to any one of the above (1) to (11), wherein the optically anisotropic layer is a layer provided by conducting transfer of a transfer material comprising the optically anisotropic layer to a target transfer material.

(13) The process according to any one of the above (1) to (12), which comprises the following steps [13] and [14] in order after the step [2] and before the step [3]:

[13] transferring another birefringence pattern builder on the laminated structure obtained after the step [2];

[14] subjecting the laminated structure obtained after the step [13] to patterned light exposure.

(14) The process according to any one of the above (1) to (12), which comprises the following steps [24] to [26] in order after the step [3]:

[24] transferring another birefringence pattern builder on the laminated structure obtained after the step [3];

[25] subjecting the laminated structure obtained after the step [24] to patterned light exposure;

[26] heating the laminated structure obtained after the step [25] at 50° C. or higher and 400° C. or lower.

(15) The process according to any one of the above (1) to (12), wherein the birefringence pattern builder has a photosensitive polymer layer on the optically anisotropic layer; and the birefringence pattern builder is subjected to the patterned light exposure from the side of the photosensitive polymer layer in the step [2]; and which comprises the following step [9] after the step [2]:

[9] removing unwanted photosensitive polymer layer from the laminated structure.

(16) A product used as a mean of preventing forgery, which is obtainable from the process according to any one of the above (1) to (15).

(17) An optical element, which is obtainable from the process according to any one of the above (1) to (15).

(18) A substrate for liquid crystal display device, which is obtainable from the process according to any one of the above (1) to (15).

(19) A process of producing a substrate for liquid crystal display device, which comprises at least the following steps [101] to [103] in order:

[101] forming an optically anisotropic layer by coating a substrate with a solution comprising a liquid crystalline compound having at least one reactive group and drying the solution to thereby form a liquid crystal phase, and then applying heat or irradiating ionized radiation to the liquid crystal phase;

[102] subjecting the optically anisotropic layer to patterned light exposure;

[103] heating the optically anisotropic layer at 50° C. or higher and 400° C. or lower.

(20) A process of producing a substrate for liquid crystal display device, which comprises at least the following steps [111] to [115] in order:

[111] forming an optically anisotropic layer by coating a substrate with a solution comprising a liquid crystalline compound having at least one reactive group and drying the solution to thereby form a liquid crystal phase, and then applying heat or irradiating ionized radiation to the liquid crystal phase;

[112] forming photosensitive polymer layer on the optically anisotropic layer;

[113] subjecting the photosensitive polymer layer and the optically anisotropic layer to patterned light exposure;

[114] removing unwanted photosensitive polymer layer on the substrate;

[115] heating the optically anisotropic layer at 50° C. or higher and 400° C. or lower.

(21) A process of producing a substrate for liquid crystal display device, which comprises at least the following steps [121] to [123] in order:

[121] forming an adhesive layer for transfer and an optically anisotropic layer in order on a substrate by using a transfer material having the adhesive layer for transfer and the optically anisotropic layer formed by coating a substrate with a solution comprising a liquid crystalline compound having at least one reactive group and drying the solution to thereby form a liquid crystal phase, and then applying heat or irradiating ionized radiation to the liquid crystal phase;

[122] subjecting the optically anisotropic layer to patterned light exposure;

[123] heating the optically anisotropic layer at 50° C. or higher and 400° C. or lower.

(22) A process of producing a substrate for liquid crystal display device, which comprises at least the following steps [131] to [135] in order:

[131] forming an adhesive layer for transfer and an optically anisotropic layer in order on a substrate by using a transfer material having the adhesive layer for transfer and the optically anisotropic layer formed by coating a substrate with a solution comprising a liquid crystalline compound having at least one reactive group and drying the solution to thereby form a liquid crystal phase, and then applying heat or irradiating ionized radiation to the liquid crystal phase;

[132] forming photosensitive polymer layer on the optically anisotropic layer;

[133] subjecting the photosensitive polymer layer and the optically anisotropic layer to patterned light exposure;

[134] removing unwanted photosensitive polymer layer on the substrate;

[135] heating the optically anisotropic layer at 50° C. or higher and 400° C. or lower.

(23) A substrate for liquid crystal display device, which is obtainable from the process according to any one of the above (19) to (22).

(24) The substrate for liquid crystal display device according to the above (18) or (23), which comprises a region having in-plane retardation Re1 and a region having in-plane retardation Re2, wherein Re1>Re2.

(25) The substrate for liquid crystal display device according to the above (24), wherein Re2 is 5 nm or lower.

(26) A liquid crystal display device comprising the substrate for liquid crystal display device according to any one of the above (23) to (25).

(27) A liquid crystal display device according to the above (26), wherein the liquid crystal mode is semi-transmissive mode.

The present invention also provides a birefringence pattern builder as the following (201) to (212).

(201) A birefringence pattern builder which comprises an optically anisotropic layer comprising a polymer, and said optically anisotropic layer has a retardation disappearance temperature in the range higher than 20° C., at said retardation disappearance temperature, in-plane retardation becomes 30% or lower of the retardation at 20° C. of the same optically anisotropic layer, and said retardation disappearance temperature rises by light exposure.

(202) The birefringence pattern builder according to the above (201), wherein the risen retardation disappearance temperature is not in the range of 250° C. or lower.

(203) The birefringence pattern builder according to the above (201) or (202), wherein the in-plane retardation at 20° C. is 10 nm or higher.

(204) The birefringence pattern builder according to any one of the above (201) to (203), wherein the polymer has an unreacted reactive group.

(205) The birefringence pattern builder according to any one of the above (201) to (204), wherein the optically anisotropic layer is a layer formed by coating with a solution comprising a liquid crystalline compound having at least one reactive group and drying the solution to thereby form a liquid crystal phase, and then applying heat or irradiating ionized radiation to the liquid crystal phase for polymerization and fixation.

(206) The birefringence pattern builder according to the above (205), wherein the liquid crystalline compound has two or more types of reactive groups each of which has different polymerization condition.

(207) The birefringence pattern builder according to the above (205), wherein the liquid crystalline compound has a radically reactive group and a cationically reactive group.

(208) The birefringence pattern builder according to the above (207), wherein the radically reactive group is acrylic group and/or methacrylic group and cationically reactive group is vinyl ether group, oxetanyl group, and/or epoxy group.

(209) The birefringence pattern builder according to any one of the above (201) to (204), wherein the optically anisotropic layer is a stretched film.

(210) The birefringence pattern builder according to any one of the above (201) to (209), which comprises two or more optically anisotropic layers.

(211) The birefringence pattern builder according to the above (210), wherein the two or more optically anisotropic layers comprises at least two optically anisotropic layers having different direction of slow axis and/or different in-plane retardation to each other.

(212) The birefringence pattern builder according to any one of the above (201) to (211), wherein the optically anisotropic layer is a layer provided by conducting transfer of a transfer material comprising the optically anisotropic layer to a target transfer material.

As preferred embodiments of the present invention, the following (28) and (29) are provided.

(28) A process of producing a patterned birefringent product, which comprises the following steps [211] to [215] in order:

[211] preparing the birefringence pattern builder according to any one of the above (201) to (212);

[212] subjecting the birefringence pattern builder to patterned light exposure;

[213] transferring another birefringence pattern builder according to any one of the above on the laminated structure obtained after the step [212];

[214] subjecting the laminated structure obtained after the step [213] to patterned light exposure.

[215] heating the laminated structure obtained after the step [214] at 50° C. or higher and 400° C. or lower.

(29) A process of producing a patterned birefringent product, which comprises the following steps [221] to [226] in order:

[221] preparing the birefringence pattern builder according to any one of the above (201) to (212);

[222] subjecting the birefringence pattern builder to patterned light exposure;

[223] heating the laminated structure obtained after the step [222] at 50° C. or higher and 400° C. or lower;

[224] transferring another birefringence pattern builder according to any one of the above on the laminated structure obtained after the step [223];

[225] subjecting the laminated structure obtained after the step [224] to patterned light exposure.

[226] heating the laminated structure obtained after the step [225] at 50° C. or higher and 400° C. or lower.

Figure 1:
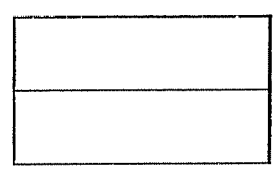
FIGS. 1(a) to 1(i) are schematic sectional views showing examples of the birefringence pattern builder.
Figure 1:
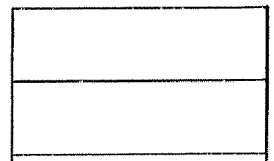
Figure 1:
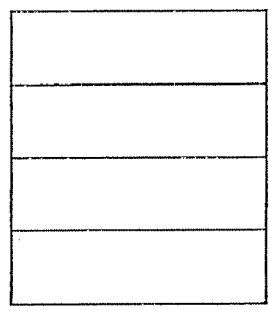
Figure 1:
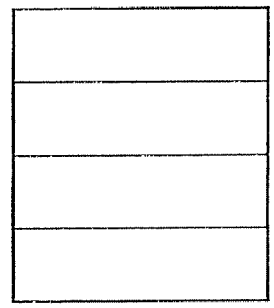
Figure 1:
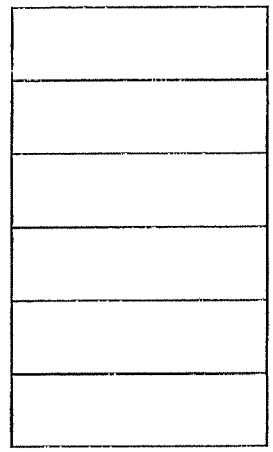
Figure 1:
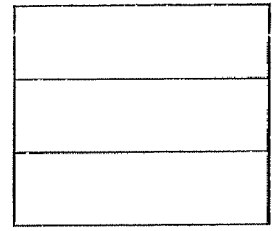
Figure 1:
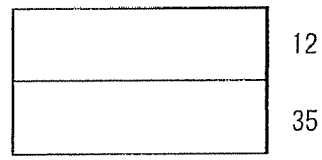
Figure 1:
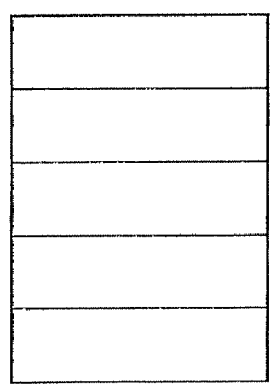
Figure 1:
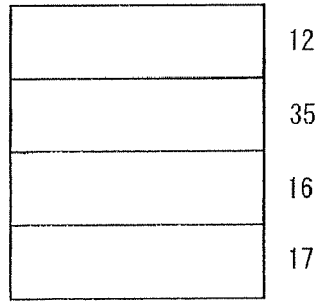

Reference numerals used in the drawings express the followings:
11 support or substrate;
12 optically anisotropic layer;
12A light-exposed domain of optically anisotropic layer;
12A non-light-exposed domain of optically anisotropic layer;

12F first optically anisotropic layer;
12S second optically anisotropic layer;
13 alignment layer (on support or substrate);
14 adhesive layer for transfer;
14F first adhesive layer for transfer;
14S second adhesive layer for transfer;
14T third adhesive layer for transfer;
15 photosensitive polymer layer;
16 post-adhesive layer;
17 delamination layer;
18 surface-protecting layer;
21 temporary support;
22 alignment layer (on temporary support);
22F first alignment layer on temporary support;
22S second alignment layer on temporary support;
23 dynamic property control layer;
112 patterned optically anisotropic layer;
112-A patterned optically anisotropic layer (light-exposed domain);
112-B patterned optically anisotropic layer (non-light-exposed domain);
112F-A first patterned optically anisotropic layer (light-exposed domain);
112F-B first patterned optically anisotropic layer (non-light-exposed domain);
112S-A second patterned optically anisotropic layer (light-exposed domain);
112S-B second patterned optically anisotropic layer (non-light-exposed domain);
112T-A third patterned optically anisotropic layer (light-exposed domain);
112T-B third patterned optically anisotropic layer (non-light-exposed domain);
24 temporary support for transfer material for transfer on temporary support 21;
31 black matrix;
32 color filter layer;
33 transmissive domain;
34 reflective domain;
35 reflective layer;
41 polarizing layer;
42 cellulose acetate film (polarizing plate protective film);
43 cellulose acetate film, or optical compensation sheet;
43A λ/2 plate;
43B λ/4 plate;
44 adhesive layer;
45 drive element;
46 reflecting plate;
47 liquid crystal;
48 substrate for liquid crystal display device; and
49 polarizing plate

DETAILED DESCRIPTION OF THE INVENTION

Paragraphs below will detail the present invention.

In the specification, ranges indicated with "to" mean ranges including the numerical values before and after "to" as the minimum and maximum values.

In the specification, retardation or Re represents in-plane retardation. The in-plane retardation Re at the wavelength of λ nm is measured by means of KOBRA 21ADH or WR manufactured by Oji Scientific Instruments while applying a λ nm wavelength light in the normal line direction of the film. In the specification, λ is 611±5 nm, 545±5 nm and 435±5 nm for R, G and B, respectively, and denotes 545±5 nm or 590±5 nm if no specific description is made on color.

It is to be noted that, regarding angles, the term "substantially" in the context of this specification means that a tolerance of less than ±5° with respect to the precise angles can be allowed. Difference from the precise angles is preferably less than 4°, and more preferably less than 3°. It is also to be noted that, regarding retardation values, the term "substantially" in the context of the specification means that a tolerance of less than ±5% with respect to the precise values can be allowed. It is also to be noted that the term "The Re value is substantially not zero" in the context of the specification means that the Re value is not less than 5 nm. The measurement wavelength for refractive indexes is a visible light wavelength, unless otherwise specifically noted. It is also to be noted that the term "visible light" in the context of the specification means light of a wavelength falling within the range from 400 to 700 nm.

In the specification, "retardation disappearance temperature" means a temperature at which the retardation of the optically anisotropic layer becomes 30% or lower of the retardation at 20° C. of the same optically anisotropic layer when the temperature of the optically anisotropic layer is increased at the rate of 20° C./minute from the state of 20° C. In the specification, "no retardation disappearance temperature at 250° C. or lower" means that the retardation of the optically anisotropic layer does not become 30% of the retardation at 20° C. of the same optically anisotropic layer when the temperature of the optically anisotropic layer is increased as above until the temperature reaches 250° C.

[Birefringence Pattern Builder]

FIGS. 1(a) to (i) are schematic sectional views showing several examples of the birefringence pattern builder. The birefringence pattern builder is a material for preparing birefringence pattern, and a material with which the patterned birefringent product can be prepared by conducting the predetermined steps. The birefringence pattern builder shown in FIG. 1(a) is an example having an optically anisotropic layer 12 on a support (substrate) 11. The birefringence pattern builder shown in FIG. 1(b) is an example having an alignment layer 13. The alignment layer 13 functions as a layer for supporting the orientation of liquid crystalline compounds, when a layer formed by coating a substrate with a solution comprising the liquid crystalline compounds and drying the solution to thereby form a liquid crystal phase, and then polymerizing and fixing the compounds by applying heat or irradiating ionized radiation to the liquid crystal phase, is used as the optically anisotropic layer 12. The birefringence pattern builder shown in FIG. 1(c) is an example further having a reflective layer 35 on the support 11. The birefringence pattern builder shown in FIG. 1(d) is an example further having the reflective layer 35 under the support 11. The birefringence pattern builder shown in FIG. 1(e) is an example having post-adhesive layer 16 and delamination layer 17 under the support 11, in order to be attached to another product after forming the birefringence pattern. The birefringence pattern builder shown in FIG. 1(f) is an example having an adhesive layer for transfer 14 between the support 11 and the optically anisotropic layer 12 due to the fact that it is prepared by using a transfer material. The birefringence pattern builder shown in FIG. 1(g) is an example having plural optically anisotropic layers (12F,12S). The birefringence pattern builder shown in FIG. 1(h) is an example having a reflective layer 35 under a self-supporting optically anisotropic layer 12. The birefringence pattern builder shown in FIG. 1(i) is an example having the post-adhesive layer 16 and the delamination layer 17 under the reflective layer 35 in order to be attached to another product after forming the birefringence pattern.

[Birefringence Pattern Builder Used as Transfer Material]

FIGS. 2(a) to 2(f) are schematic sectional views showing several examples of the birefringence pattern builder used as a transfer material. By using the birefringence pattern builder as a transfer material, a birefringence pattern builder having optically anisotropic layer, a birefringence pattern builder having plural optically anisotropic layers, or a product having plural layers having birefringence pattern, can be easily formed on a desired support.

Figure 2:
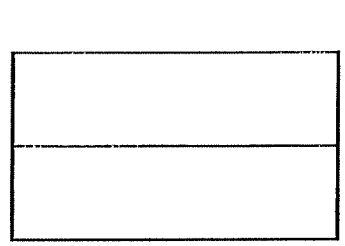
FIGS. 2(a) to 2(f) are schematic sectional views showing examples of the birefringence pattern builder which are used as a transfer material.
Figure 2:
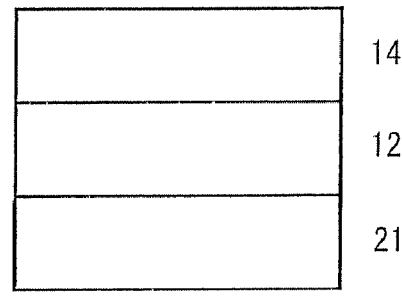
Figure 2:
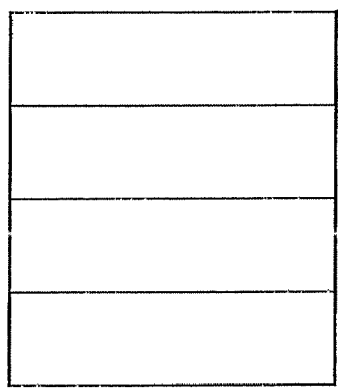
Figure 2:
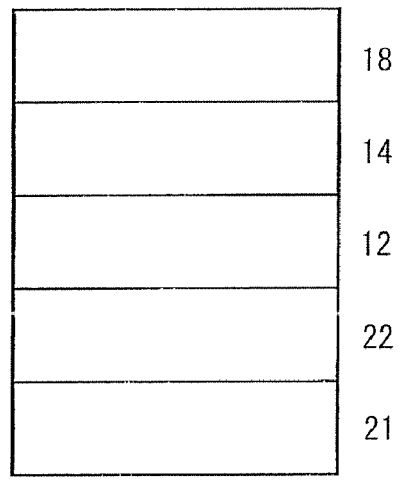
Figure 2:
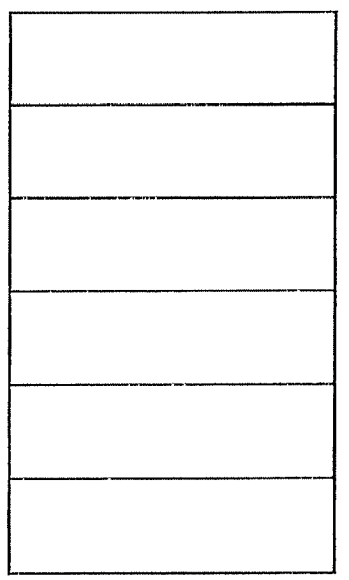
Figure 2:
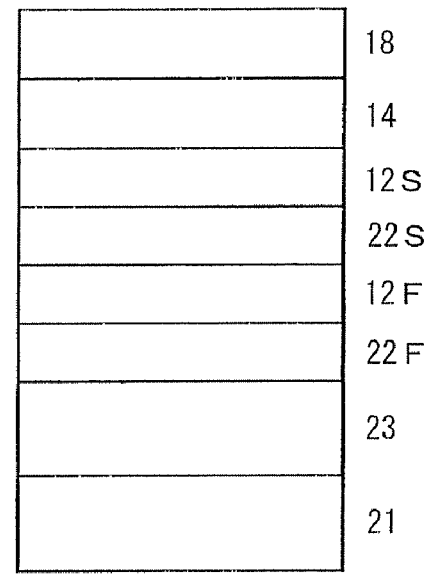

The birefringence pattern builder shown in FIG. 2(a) is an example having an optically anisotropic layer 12 on the temporary support 21. The birefringence pattern builder shown in FIG. 2(b) is an example further having an adhesive layer for transfer 14 on the optically anisotropic layer 12. The birefringence pattern builder shown in FIG. 2(c) is an example further having surface-protecting layer 18 on the adhesive layer for transfer 14. The birefringence pattern builder shown in FIG. 2(d) is an example further having an alignment layer on temporary support 22 between the temporary support 21 and the optically anisotropic layer 12. The birefringence pattern builder shown in FIG. 2(e) is an example having further a dynamic property control layer 23 between the temporary support 21 and the alignment layer on temporary support 22. The birefringence pattern builder shown in FIG. 2(f) is an example having plural optically anisotropic layers (12F,12S).

[Patterned Birefringent Product]

Figure 3:
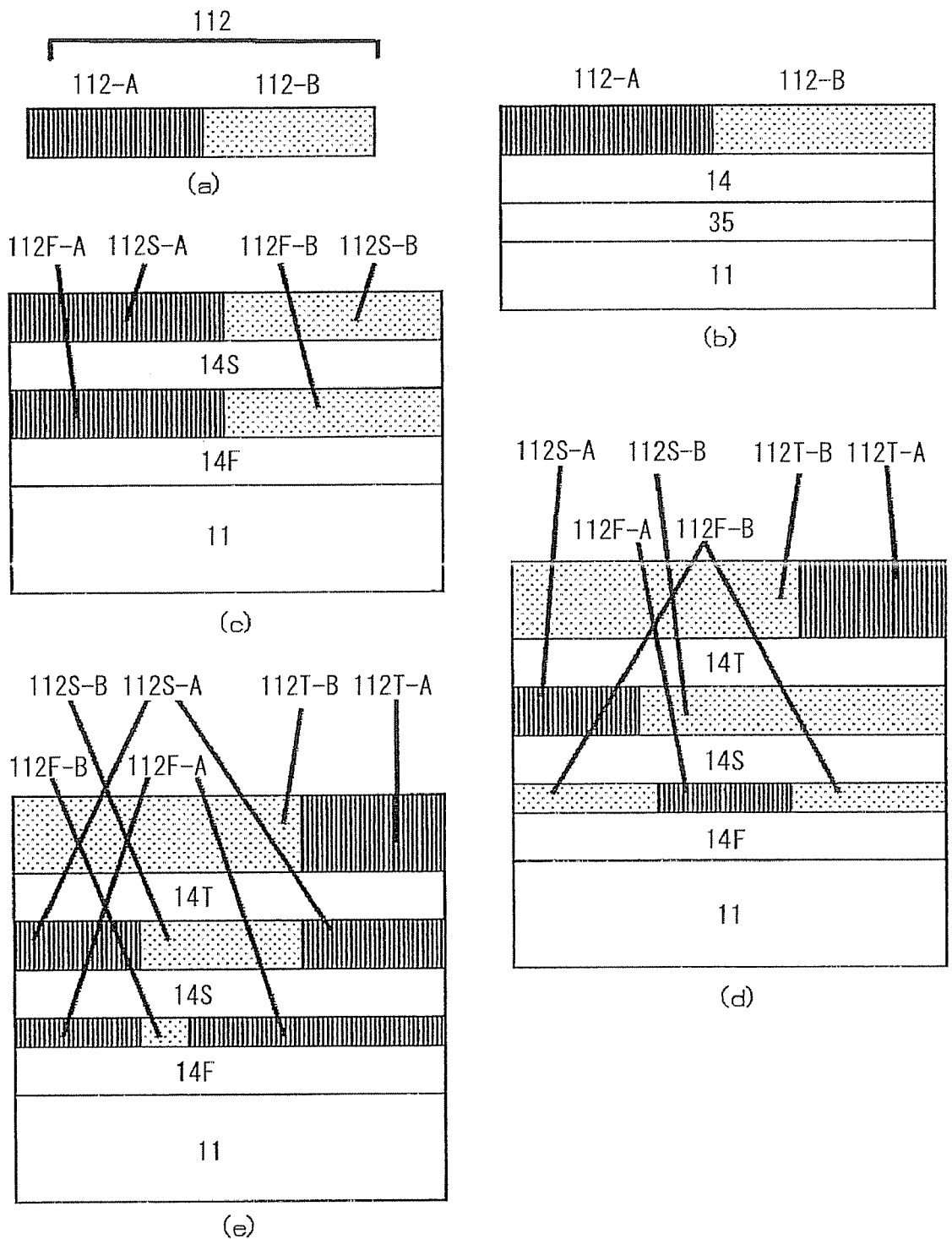
FIGS. 3(a) to 3(e) are schematic sectional views showing examples of patterned birefringent products which can be obtained by the process of the present invention.

FIGS. 3(a) to 3(e) are schematic sectional views showing several examples of the patterned birefringent product obtained by the process of the present invention using the birefringence pattern builder. The patterned birefringent product obtainable by the process of the present invention has at least one patterned optically anisotropic layer 112. In the specification, "patterned optically anisotropic layer" means "an optically anisotropic layer having differently birefringent domains in a patterned manner". The patterned birefringent product shown in FIG. 3(a) is an example consisting of only the patterned optically anisotropic layer 112. The light-exposed domain 112-A and the non-light-exposed domain 112-B shown in the figures have different birefringence to each other. The patterned birefringent product shown in FIG. 3(b) is an example having a reflective layer 35, an adhesive layer for transfer 14, and a patterned optically anisotropic layer 112, in order from the support side, on support 11. The patterned birefringent product may have plural patterned optically anisotropic layers. By having plural optically anisotropic layers, the more various functions can be achieved. The patterned birefringent product shown in FIG. 3(c) is an example of the product produced by conducting patterned light exposure after stacking plural optically anisotropic layers to apply the same pattern between the layers. Such example is useful, for example, for forming a pattern including a domain having high retardation which cannot be achieved with one optically anisotropic layer. The patterned birefringent product shown in FIG. 3(d) is an example of the product produced by repeating "optically anisotropic layer formation (including a transfer)→patterned light exposure→baking (heating)" plural times to provide an independent pattern to each of the plural optically anisotropic layer. This is an example which is useful when, for example, each of two or more optically anisotropic layers wherein retardation or the direction of slow-axis is different to each other is desired to be provided with independent pattern. The patterned birefringent product shown in FIG. 3(e) is an example of a product prepared by baking once after alternating optically anisotropic layer formation (including a transfer) and patterned light exposure, necessary times. In a similar manner, needed number of domains having different retardation to each other can be formed, with keeping the number of burdened baking steps to a minimum.

[Substrate for Liquid Crystal Display Device]

The substrate for liquid crystal display device which can be obtained by the process of the present invention has a patterned retardation, and comprises a substrate and at least one optically anisotropic layer having patterned retardation. In the specification, "optically anisotropic layer having patterned retardation" means "optically anisotropic layer having domains in a patterned manner, each of which has different retardation", and it generally means "optically anisotropic layer having a domain with in-plane retardation Re1 and a domain with in-plane retardation Re2 (provided that Re1>Re2) in a patterned manner". In the specification, "substrate" is differentiated from "substrate for liquid crystal display device" unless otherwise noted.

FIGS. 4(a) to 4(e) are schematic sectional views showing several examples of the substrate for liquid crystal display device which can be obtained by the process of the present invention. The substrate for liquid crystal display device shown in FIG. 4(a) has optically anisotropic layer 12 having patterned retardation formed on substrate 11. The substrate 11 is not specifically limited so far as it is transparent, and is preferably a support comprising materials having a small birefringence. A support comprising glass, small-birefringent polymer, or the like can be used. The optically anisotropic layer 12 having patterned retardation can be obtained by patterned exposure and heating of an optically anisotropic layer which can be obtained by coating a substrate with a solution comprising a liquid crystalline compound, maturing and aligning the compound at the temperature forming liquid crystal phase, and then applying heat or irradiating ionized radiation to the liquid crystal phase for fixation. An optically anisotropic layer having patterned retardation is formed by retardation difference between light-exposed domains 12A and non-light-exposed domains 12B generated in the heating step. By this difference, different display modes in liquid crystal cell, particularly transmissive domain and reflective domain in semi-transmissive LCD, can be optically compensated respectively. Unlike the conventional cases where the optically anisotropic layer is provided on a plastic support which is likely to cause dimensional changes with environmental temperature or humidity, the optical anisotropic layer provided in the cell is less likely to cause dimensional changes with environmental temperature or humidity, because the optically anisotropic layer is tightly held by a glass substrate, and thereby makes it possible to reduce the corner non-uniformity. Patterned exposure may be conducted directly by using commercial patterned exposure system or indirectly by using photomask.

Figure 4:
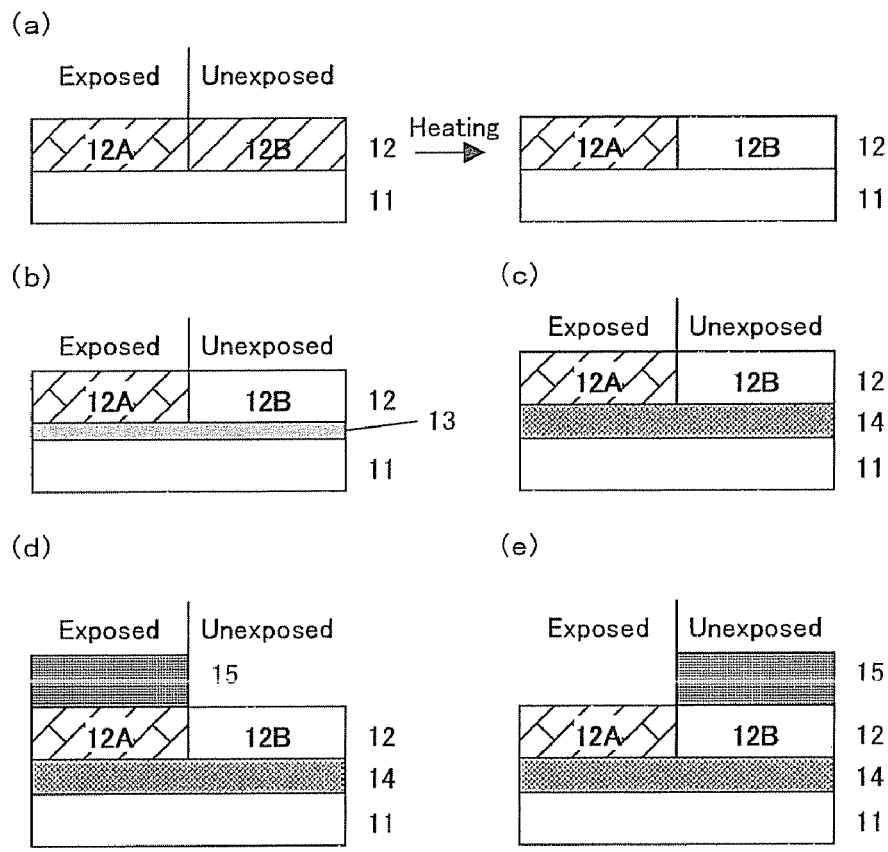
FIGS. 4(a) to 4(e) are schematic sectional views showing examples of the substrate for liquid crystal display device which can be obtained by the process of the present invention.
Figure 5:
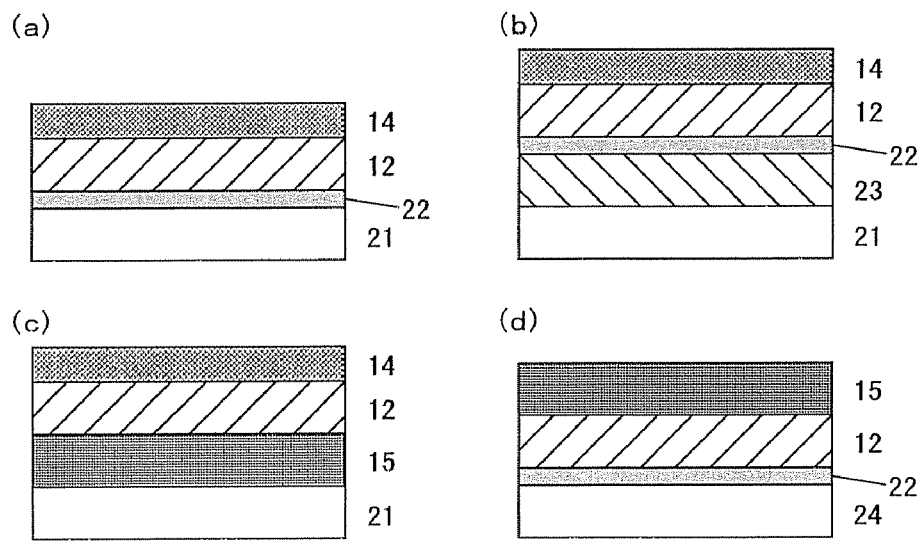
FIGS. 5(a) to 5(d) are schematic sectional views showing examples of the transfer material used for the process of producing a substrate for liquid crystal display device of the present invention.

In the substrate for liquid crystal display device shown in FIG. 4(b), an alignment layer 13 is formed between substrate 11 and the optically anisotropic layer 12. The optically anisotropic layer 12 can be obtained by directly coating the alignment layer 13, which is rubbed, with a solution comprising a liquid crystalline compound, maturing and aligning the compound at the temperature forming liquid crystal phase, and then applying heat or irradiating ionized radiation to the liquid crystal phase for fixation. The domains with different retardations can be formed in a similar manner to that of the above. In the substrate for liquid crystal display device shown in FIG. 4(c), an adhesive layer for transfer 14 is formed between substrate 11 and the optically anisotropic layer 12 having patterned retardation. This type can be produced by using the transfer material as shown in FIG. 5 (a). The substrate for liquid crystal display device shown in FIG. 4(d) or (e) has a photosensitive polymer layer 15 on the optically anisotropic layer 12. For FIG. 4(*d*) type, negative-type photosensitive polymer layer is used, and for FIG. 4(*e*) type, positive-type photosensitive polymer layer is used. In each type, unleveled pattern can be formed at the time of the exposure for retardation patterning. This type can be produced by directly applying photosensitive polymer layer 15 on FIG. 4 (*c*), or by using the transfer material as shown in FIG. 5 (*c*).

[Transfer Material Used for Producing Substrate for Liquid Crystal Display Device]

FIG. 5(*a*) shows an example of a transfer material, which has an optically anisotropic layer 12 formed on a temporary support 21 via adhesive layer for transfer 22. The example has adhesive layer for transfer 14 formed on the optically anisotropic layer 12. A substrate for liquid crystal display device can be produced by laminating the transfer material on a substrate via the adhesive layer for transfer 14. As the adhesive layer for transfer, any layer can be used as long as it has sufficient property for transfer. Examples of the adhesive layer include an adhesive layer using adhesive, a photosensitive polymer layer, a pressure-sensitive polymer layer, and a heat sensitive polymer layer. Among them, a photosensitive polymer layer or heat sensitive polymer layer is preferable from the viewpoint of heat-resistance requisite for substrate for liquid crystal display device. To apply good property of transfer, the optically anisotropic layer 12 and the adhesive layer for transfer 22 are preferably designed to be separated smoothly. FIG. 5(*b*) is an embodiment having a dynamic property control layer 23 for the purpose of preventing incorporation of bubbles in the transfer step, or of absorbing irregularity on the substrate for liquid crystal display device. The dynamic property control layer preferably has sufficient elasticity, gets softened by heat, or exhibits fluidity by heat. FIG. 5(*c*) is a transfer material that can produce FIG. 4(*d*) or (*e*). The transfer material has a photosensitive polymer layer 15 under the optically anisotropic layer 12 in order to form a unleveled layer. For producing this embodiment, liquid crystal compounds need to be aligned on the photosensitive polymer layer 15. However, when a coating solution containing a liquid crystal compound is applied on a photosensitive polymer layer by using an organic solvent, the liquid crystal compound cannot be aligned because the photosensitive polymer layer is dissolved in the organic solvent. Therefore, a transfer material as shown in the FIG. 5(*d*) can be formed on temporary support 24, which can then be transferred on temporary support 21 by using the photosensitive polymer layer 15 as an adhesive layer for transfer. The obtained laminated structure is provided with adhesive layer for transfer 14 on the optically anisotropic layer 12 to obtain the embodiment as FIG. 5(*c*).

[Substrate for Liquid Crystal Display Device (Having Color Filter Layer)]

Figure 6:
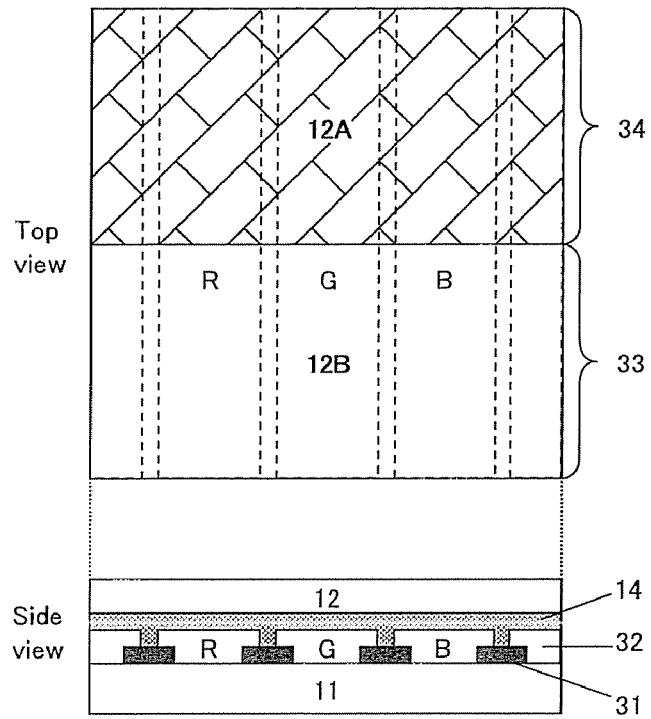
FIGS. 6(a) to 6(d) are schematic sectional views showing examples of the substrate for liquid crystal display device having a color filter layer which can be obtained by the process of the present invention.
Figure 6:
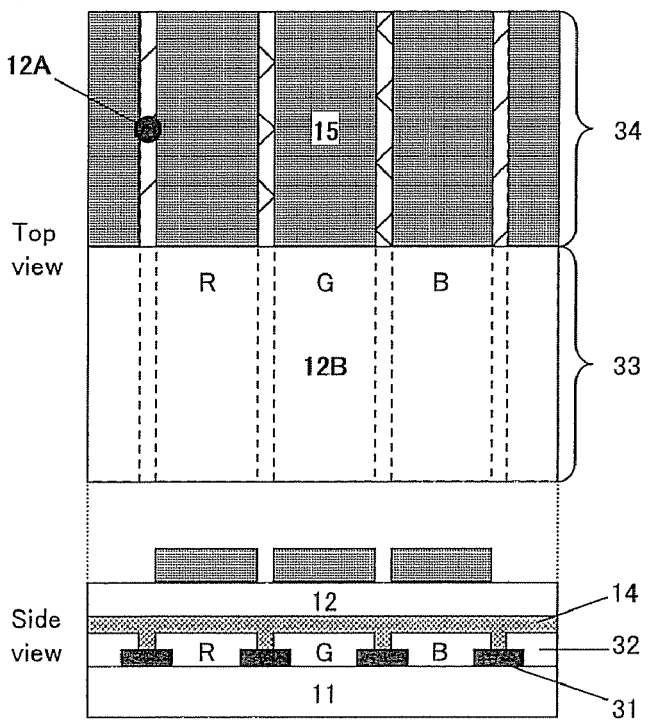
Figure 6:
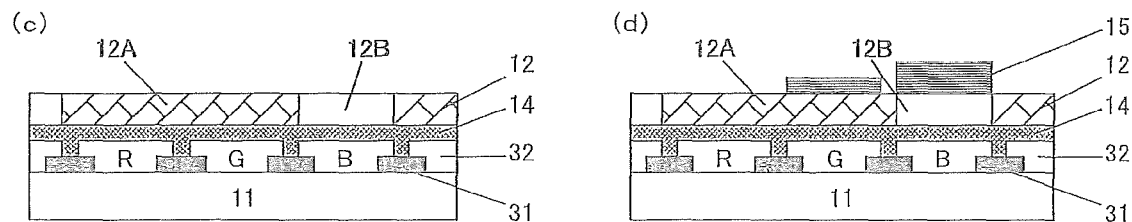

FIG. 6(*a*) shows a schematic sectional view of an example of the substrate for liquid crystal display device having color filter layer which can be obtained from the process of the present invention. In this example, color filter substrate having color filter layer on the substrate comprising glass, small-birefringent polymer, or the like as described above is used. The substrate for liquid crystal display device which can be obtained from the process of the present invention is preferably used as a substrate for liquid crystal display device on the side having color filter layer, which is produced by a process at lower temperature than that for a substrate for liquid crystal display device on the side having TFT layer. In the substrate for liquid crystal display device on the side having color filter layer, black matrix 31 may be generally formed on a substrate, and color filter may be formed thereon by photolithography process. Further thereon, a layer comprising an optically anisotropic layer can be formed directly or by using a transfer material, and then an optically anisotropic layer 12 having patterned retardation can be formed through patterned exposure and heating process as mentioned above. FIG. 6(*a*) shows cross-sectional and overhead views. In a semi-transmissive LCD, transmissive domain 33 and reflective domain 34 are provided in one pixel consisting of RGB, the pattern may be thus formed to make parts or to male a striped shape. Transmissive domain 33 and reflective domain 34 may be inversed. However, as only transmissive domain can be optically compensated at the side of backlight in the liquid crystal cell in a semi-transmissive LCD, it is preferable to apply retardation only to reflective domain for optical compensation, leading to improvement of performance. FIG. 6(*b*) shows an example wherein step layer consisting of photosensitive polymer layer is further formed. In this manner, the height can be changed between transmissive domain 33 and reflective domain 34 by the process of the present invention, and thus the gap of the liquid crystal cell can be changed, i.e., multi-gap can be achieved. FIG. 6(*b*) has projection in the reflective domain. The embodiment wherein reflective domain has projection is preferable because cell-gap in a reflective domain is generally smaller than that in a transmissive domain. The photosensitive polymer layer may be positive type when transmissive domain has projection.

The substrate for liquid crystal display device obtained by the process of the present invention is also effective when it is used in transmissive LCD. FIG. 6(*c*) shows an embodiment for transmissive LCD. In FIG. 6(*c*), R and G are light-exposed domain, and B is non-light-exposed domain, and retardation in B is small or substantially zero. The optimum retardation values for optical compensation of R, G, and B are generally different, retardation can be controlled for each of RGB by the process of the present invention. The substrate for liquid crystal display device obtained from the process of the present invention can be used in combination with a general optical compensation sheet, and improvement in viewing angle characteristics, particularly the characteristics of color can be expected. FIG. 6(*d*) is an embodiment wherein cell gap is controlled for each of RGB. By this multi-gap, viewing angle characteristics of color of LCD can be further improved and high quality LCD-display characteristics can be achieved by using the RGB-independent retardation control of the present invention in combination.

When the substrate for liquid crystal display device obtained by the process of the present invention is used as a substrate for liquid crystal display device at the side having TFT layer, the optically anisotropic layer may be formed anywhere. However, as TFT array process includes a process at a temperature as high as 300° C. or higher, the optically anisotropic layer is preferably formed in a upper layer than a silicon layer of TFT, in an active-matrix-type device having the TFT.

[Liquid Crystal Display Device]

Figure 7:
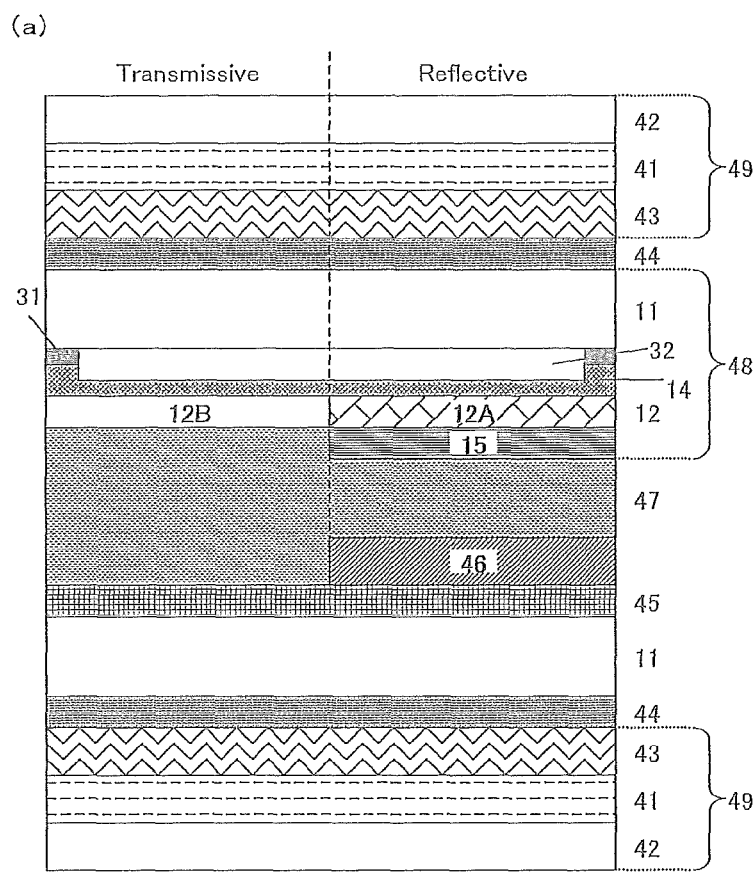
FIGS. 7(a) to 7(c) are schematic sectional views showing examples of the liquid crystal display device having the substrate for liquid crystal display device which can be obtained by the process of the present invention.
Figure 7:
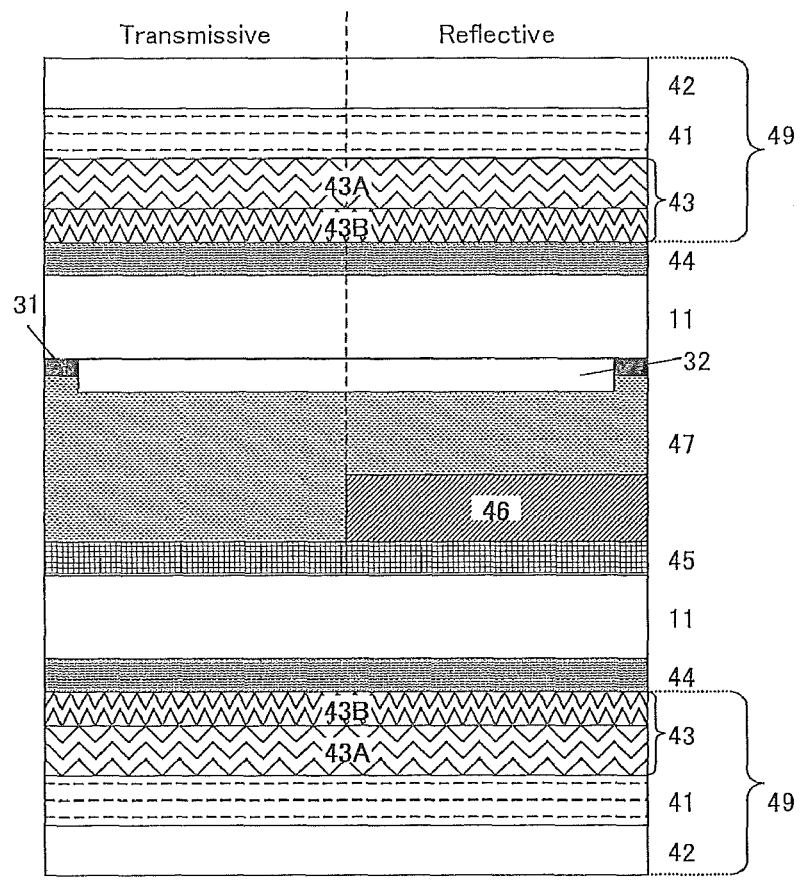
Figure 7:
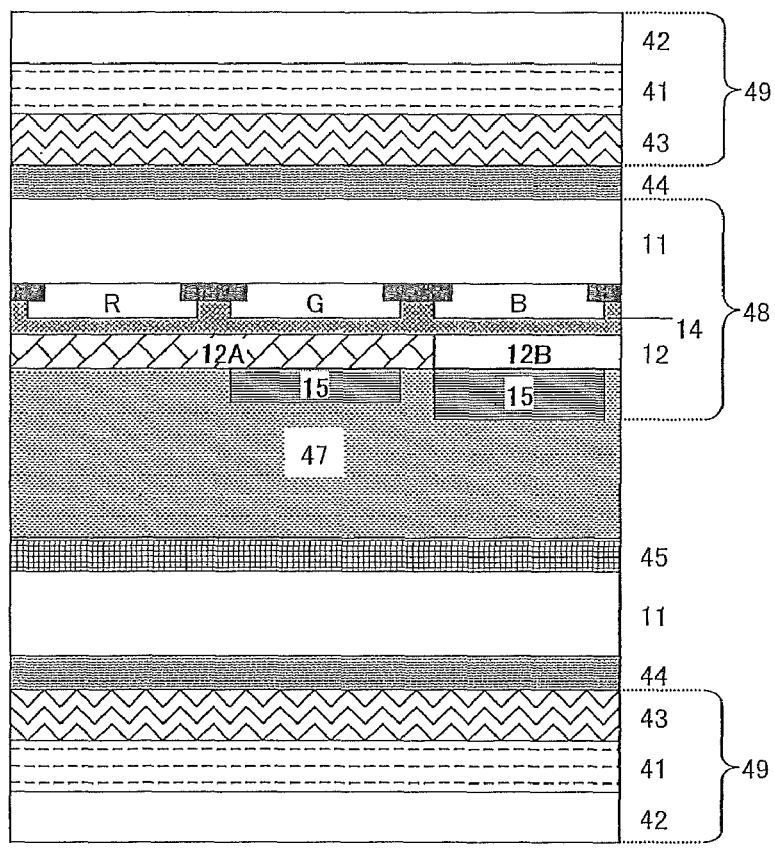

FIGS. 7(*a*) and 7(*c*) are schematic sectional views of examples of the liquid crystal display device comprising the substrate for liquid crystal display device of the present invention. FIG. 7(*a*) exemplifies the semi-transmissive liquid crystal display device using FIG. 6(*b*) as the substrate for liquid crystal display device 48 at the side having color filter layer. Two polarizing plate 49 configured by protective films 42 and 43 holding polarizing layer 41 in between are each attached via adhesive 44 to substrates for liquid crystal display device 11 of upside and downside forming liquid crystal cell. In a substrate for liquid crystal display device of downside of liquid crystal cell, drive element 45 such as TFT is generally formed, and reflecting plate 46 formed of aluminum, dielectric multi-layer membrane, or the like is formed only in the reflective domain of the semi-transmissive LCD. Between the substrates for liquid crystal display device of upside and downside, liquid crystal 47 is filled. The orientation of the liquid crystal changes by applying voltage, and thereby switches liquid crystal display device. On each surface of the substrates for liquid crystal display device of upside and downside, alignment layer (not illustrated in Figs.) for determining the orientation of liquid crystal 47 is generally formed and rubbed thereon. The gap of the liquid crystal cell in reflective domain can be controlled to be a different gap with the step formed of reflecting plate 46 and photosensitive polymer layer 15. As protective films holding polarizing layer 41 in between, 43 may be an optical compensation sheet or ordinary protective film 42. The viewing angle is controlled by the two optical compensation sheets 43 in the transmissive domain, and by the optical compensation sheet 43 upside and the optically anisotropic layer 12A in the cell in the reflective domain.

FIG. 7(*b*) shows an example of semi-transmissive LCD having only optical compensation sheet as a comparative example. 43A is λ/2 plate, 43B is λ/4 plate, and thus the combination of 43A and 43B is wideband λ/4. With the wideband λ/4 plates disposed upside and downside, reflection-type LC display can be conducted by using the compensation sheet 43 upside in the reflective domain. The wideband λ/4 plate upside is not needed for transmissive-type LCD and needed to be canceled in the polarizing plate downside. Therefore, four compensation sheets are needed in total.

FIG. 7(*c*) exemplifies the transmissive-type liquid crystal display device using FIG. 6(*d*) as the substrate for liquid crystal display device 48 at the side having color filter layer. Each component is the same as that of semi-transmissive-type, except reflecting plate 46 is not provided. However, transmissive-type LCD such as television is required to have high quality display characteristics in terms of image, particularly color. Therefore, liquid crystal cell is preferred to be designed with optimization for each of RGB. For this purpose, either one or both of the two optical compensation sheets 43 upside and downside forming polarizing plates 49, and patterned optically anisotropic layer in the cell can be used for optical compensation. In addition, liquid crystal cell gaps between RGB can be changed to use multi-gap, enabling a flexible design of liquid crystal cell. This system enables excellent viewing angle characteristics particularly in VA-mode or IPS-mode device and thus are preferable for these modes.

The substrate for liquid crystal display device obtained by the process of the present invention comprises a substrate, at least one optically anisotropic layer having patterned retardation, and optionally a photo-sensitive polymer layer forming steps. Application of the substrate for liquid crystal display device obtained by the process of the present invention is not specifically limited, wherein it is preferable to use it for producing members of liquid crystal display devices. In such embodiment, the optically anisotropic layer may contribute to optical compensation of the liquid crystal cell, that is, contribute to widen the viewing angle ensuring desirable contrast and to cancel coloration of image on the liquid crystal display device.

Paragraphs below will detail the birefringence pattern builder, the process of producing a patterned birefringent product using the same, materials of the patterned birefringent product, and the process of producing the same. However, it is to be noted that the present invention is not limited to the embodiments below. Any other embodiments can be also carried out referring to the description below and known methods.

[Optically Anisotropic Layer]

As the optically anisotropic layer in the birefringence pattern builder is not particularly limited as far as the layer gives a retardation, which is substantially not zero, for a light incoming in at least one direction, that is, the layer has an optical characteristic not understood as being isotropic. Further, the above optically anisotropic layer preferably has a retardation disappearance temperature. The retardation disappearance temperature is preferably 20° C. or higher and 250° C. or lower, more preferably 40° C. to 245° C., further preferably 50° C. to 245° C., and most preferably 80° C. to 240° C.

In addition, as the optically anisotropic layer in the birefringence pattern builder, an optically anisotropic layer of which the retardation disappearance temperature rises by light exposure to the birefringence pattern builder is used. As a result, difference in the retardation disappearance temperatures between the light-exposed and non-light-exposed domains can be obtained, and the retardation in non-light-exposed domain can be selectively eliminated by baking at a temperature which is higher than the retardation disappearance temperature in non-light-exposed domain and lower than the retardation disappearance temperature in light-exposed domain. The degree of the above-mentioned rise in the retardation disappearance temperature is preferably 5° C. or more, more preferably 10° C. or more, and most preferably 20° C. or more, in view of the efficiency of the selective elimination of retardation in non-light-exposed domain and robustness against temperature variation in the heating device. It is also preferred that non-light-exposed domain has no retardation disappearance temperature at 250° C. or lower, for the purpose of easily eliminating the retardation in non-light-exposed domain sufficiently.

The optically anisotropic layer in the birefringence pattern builder contains polymer. By containing polymer, the optically anisotropic layer can meet various requirements such as birefringence, transparency, solvent-resistance, toughness, and flexibility. The polymer in the optically anisotropic layer preferred to have an unreacted reactive group. The unreacted reactive group reacts by light-exposure to make cross-link between polymer chains, which, as a result, is considered to easily lead to the rise in the retardation disappearance temperature of the optically anisotropic layer.

The optically anisotropic layer may be solid at 20° C., preferably 30° C., and more preferably 40° C., because an optically anisotropic layer which is solid at 20° C. can easily be applied to another functional layer, or transferred or attached to a support.

In order to be applied with another functional layer, the optically anisotropic layer is preferred to have solvent-resistance. In the specification, "to have solvent-resistance" means that the retardation of the layer after soaked in the subject solvent for two minutes is in the range of 30 to 170%, more preferably 50 to 150%, most preferably 80 to 120%, with respect to the retardation of the layer before the soaking. As the subject solvent, examples include water, methanol, ethanol, isopropanol, acetone, methylethylketone, cyclohexanone, propyleneglycolmonomethyletheracetate, N-methylpyrrolidone, hexane, chloroform, ethylacetate, and a mixture thereof. Among them, acetone, methylethylketone, cyclohexanone, propyleneglycolmonomethyletheracetate, and N-methylpyrrolidone are preferable, and methylethylketone, cyclohexanone, and propyleneglycolmonomethyletheracetate are most preferable.

The retardation of the optically anisotropic layer at 20° C. may be 5 nm or more, preferably 10 nm or more and 10000 nm or less, more preferably 20 nm or more and 2000 nm or less. When the retardation is less than 5 nm, formation of birefringence pattern may become difficult. When the retardation is more than 10000 nm, error becomes larger and it may become difficult to achieve practically needed accuracy. As a reference, rough indication of the easiness of differentiation of the pattern (visibility) when a patterned birefringent product is viewed in a crossed Nicol state is shown in Table 1, wherein the patterned birefringent product is produced from a birefringence pattern builder including an optically anisotropic layer having any retardation in the range of 1 to 50 nm by conducting light-exposure and baking of suitable condition, that is for example, when the birefringence pattern builder shown in Example 1 is used, ultraviolet radiation at 35 mJ (UV-A region) once and baking at 230° C. for one hour once. In the specification, "in a crossed Nicol state" means a state wherein a sample is arranged between two polarizing plates which are stacked so that the absorption axes of them are about orthogonal to each other.

TABLE 1

| Retardation (nm) | Visibility |
| --- | --- |
| 1 | X |
| 3 | X |
| 5 | Δ |
| 10 | Δ |
| 20 | ◯ |
| 30 | ◯ |
| 40 | ◯ |
| 50 | ◯ |

◯: easily visible
Δ: visible with difficulty
X: not visible

The production process of the optically anisotropic layer is not particularly limited. Examples include a process conducting coating with a solution comprising a liquid crystalline compound having at least one reactive group and drying the solution to thereby form a liquid crystal phase, and then applying heat or irradiating ionized radiation for polymerization and fixation; a process stretching a layer formed by polymerizing and fixing a monomer having two or more reactive groups; a process stretching a layer consisting of polymer after a reactive group is being introduced to the layer by using a coupling agent; and a process stretching a layer consisting of polymer and then introducing a reactive group to the layer by using a coupling agent.

Further, as explained below, the optically anisotropic layer may be formed by transfer.

The optically anisotropic layer functions as an optically anisotropic layer compensating the viewing angle of a liquid crystal device, by being incorporated into the liquid crystal cell as described above. Not only an embodiment in which the optically anisotropic layer can independently exhibit a sufficient level of optical compensation property, but also an embodiment in which an optical characteristic necessary for the optical compensation is satisfied after being combined with other layer (for example, an optically anisotropic layer in the opposed substrate in the liquid crystal cell or an optically anisotropic layer disposed outside the liquid crystal cell) are within the scope of the present invention. The optically anisotropic layer included in the laminated structure does not necessarily have an optical characteristic sufficient for satisfying the optical compensation property. Alternatively, the layer may exhibit an optical characteristic necessary for the optical compensation as a result, for example, of the exposure step carried out during a transfer process of the transfer material onto the substrate which generates or changes the optical characteristics of the layer.

The thickness of the optically anisotropic layer in a liquid crystal display device is preferably 0.1 to 20 μm, and more preferably 0.5 to 10 μm.

[Optically Anisotropic Layer Formed by Polymerizing and Fixing Composition Comprising Liquid Crystalline Compound]

The production process of the optically anisotropic layer is explained below, wherein coating with a solution comprising a liquid crystalline compound having at least one reactive group is conducted and the solution is dried to thereby form a liquid crystal phase, and then the liquid crystal phase is polymerized and fixed by applying heat or irradiating ionized radiation. In the process, an optically anisotropic layer with an equal retardation, which is thinner than the layer obtained by the after-mentioned process wherein polymer is stretched, can be obtained.

[Liquid-Crystalline Compound]

The optically anisotropic layer is preferably formed of a composition comprising at least one liquid crystalline compound (a liquid crystalline composition). The liquid-crystalline compounds can generally be classified by molecular geometry into rod-like one and discotic one. Each category further includes low-molecular type and high-molecular type. The high-molecular type generally refers to that having a degree of polymerization of 100 or above ("Kobunshi Butsuri-Soten'i Dainamikusu (Polymer Physics-Phase Transition Dynamics), by Masao Doi, p. 2, published by Iwanami Shoten, Publishers, 1992). Either type of the liquid-crystalline molecule may be used in the present invention, wherein it is preferable to use a rod-like liquid-crystalline compound or a discotic liquid-crystalline compound. A mixture of two or more rod-like liquid-crystalline compound, a mixture of two or more discotic liquid-crystalline compound, or a mixture of a rod-like liquid-crystalline compound and a discotic liquid-crystalline compound may also be used. It is more preferable that the optically anisotropic layer is formed using a composition comprising the rod-like liquid-crystalline compound or the discotic liquid-crystalline compound, having a reactive group, because such compound can reduce temperature- and moisture-dependent changes, and it is still further preferable that at least one compound in the mixture has two or more reactive group in a single liquid-crystalline molecule. The liquid-crystalline composition may be a mixture of two or more compounds, wherein at least one of the compounds preferably has two or more reactive groups.

It is also preferred that liquid-crystalline compound have two or more reactive groups which have different polymerization condition to each other. In such case, an optically anisotropic layer comprising polymer having unreacted reactive group can be produced by only polymerizing one type of reactive groups among plural types of reactive groups by selecting polymerization condition. The polymerization condition may be wavelength range of the irradiation of ionized radiation, or mechanism of polymerization. Preferably, the condition may be polymerization initiator, which can control polymerization of compound having a combination of a radically polymerisable group and a cationically polymerisable group. The combination of acrylic group and/or methacrylic group as a radically polymerisable group and vinyl ether group, oxetanyl group, and/or epoxy group as a cationically polymerisable group is particularly preferred, because the reactivity can be controlled easily.

Examples of the rod-like liquid-crystalline compound include azomethine compounds, azoxy compounds, cyanobiphenyl compounds, cyanophenyl esters, benzoate esters, cyclohexanecarboxylic acid phenyl esters, cyanophenylcyclohexane compounds, cyano-substituted phenylpyrimidine compounds, alkoxy-substituted phenylpyrimidine compounds, phenyldioxane compounds, tolan compounds and alkenylcyclohexylbenzonitrile compounds. Not only the low-molecular-weight, liquid-crystalline compound as listed in the above, high-molecular-weight, liquid-crystalline compound may also be used. High-molecular-weight liquid-crystalline compounds may be obtained by polymerizing low-molecular-weight liquid-crystalline compounds having at least one reactive group. Among such low-molecular-weight liquid-crystalline compounds, liquid-crystalline compounds represented by a formula (I) are preferred.

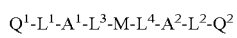  Formula (I)

In the formula, $Q^1$ and $Q^2$ respectively represent a reactive group. $L^1$, $L^2$, $L^3$ and $L^4$ each represent a single bond or a divalent linking group. $A^1$ and $A^2$ respectively represent a $C_{2-20}$ spacer group. M represents a mesogen group.

In formula (I), $Q^1$ and $Q^2$ respectively represent a reactive group. The polymerization reaction of the reactive group is preferably addition polymerization (including ring opening polymerization) or condensation polymerization. In other words, the reactive group is preferably a functional group capable of addition polymerization reaction or condensation polymerization reaction. Examples of reactive groups are shown below.

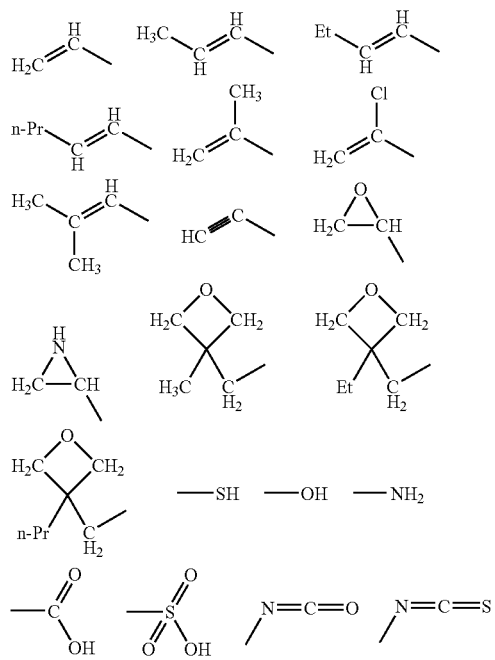

As the divalent linking group represented by each of $L^1$, $L^2$, $L^3$ and $L^4$, a divalent linking group selected from the group consisting of —O—, —S—, —CO—, —$NR^2$—, —CO—O—, —O—CO—O—, —CO—$NR^2$—, —$NR^2$—CO—, —O—CO—, —O—CO—$NR^2$—, —$NR^2$—CO—O— and —$NR^2$—CO—$NR^2$— is preferred. $R^2$ represents a $C_{1-7}$ alkyl group or a hydrogen atom. Each of $Q^1$-$L^1$ and $Q^2$-$L^2$- is preferred to be $CH_2$=CH—CO—O—, $CH_2$=C($CH_3$)—CO—O— or $CH_2$=C(Cl)—CO—O—CO—O—; and more preferred to be $CH_2$=CH—CO—O—.

In the formula, $A^1$ and $A^2$ preferably represent a $C_{2-20}$ spacer group. Each of $A^1$ and $A^2$ is preferred to be a $C_{2-12}$ aliphatic group, and more preferred to be a $C_{2-12}$ alkylene group. The spacer group is preferably selected from chain groups and may contain at least one unadjacent oxygen or sulfur atom. And the spacer group may have at least one substituent such as a halogen atom (fluorine, chlorine or bromine atom), cyano, methyl and ethyl.

Examples of the mesogen represented by M include any known mesogen groups. The mesogen groups represented by a formula (II) are preferred.

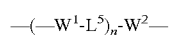  Formula (II)

In the formula, each of $W^1$ and $W^2$ represent a divalent cyclic alkyklene or alkenylene group, a divalent arylene group, or a divalent hetero-cyclic group; and $L^5$ represents a single bond or a linking group. Examples of the linking group represented by $L^5$ include those exemplified as examples of $L^1$ to $L^4$ in the formula (I) and —$CH_2$—O— and —O—$CH_2$—. In the formula, n is 1, 2 or 3.

Examples of $W^1$ and $W^2$ include 1,4-cyclohexanediyl, 1,4-phenylene, pyrimidine-2,5-diyl, pyridine-2,5-diyl, 1,3,4-thiazole-2,5-diyl, 1,3,4-oxadiazole-2,5-diyl, naphtalene-2,6-diyl, naphtalene-1,5-diyl, thiophen-2,5-diyl, pyridazine-3,6-diyl. 1,4-cyclohexanediyl has two stereoisomers, cis-trans isomers, and the trans isomer is preferred. $W^1$ and $W^2$ may independently have at least one substituent. Examples the substituent include a halogen atom such as a fluorine, chlorine, bromine or iodine atom; cyano; a $C_{1-10}$ alkyl group such as methyl, ethyl and propyl; a $C_{1-10}$ alkoxy group such as methoxy and ethoxy; a $C_{1-10}$ acyl group such as formyl and acetyl; a $C_{2-10}$ alkoxycarbonyl group such as methoxy carbonyl and ethoxy carbonyl; a $C_{2-10}$ acyloxy group such as acetyloxy and propionyloxy; nitro, trifluoromethyl and difluoromethyl.

Preferred examples of the basic skeleton of the mesogen group represented by the formula (II) include, but not to be limited to, these described below. And the examples may have at least one substituent selected from the above.

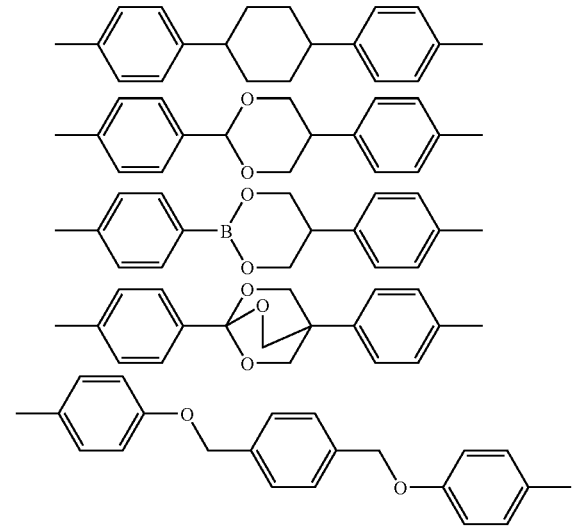

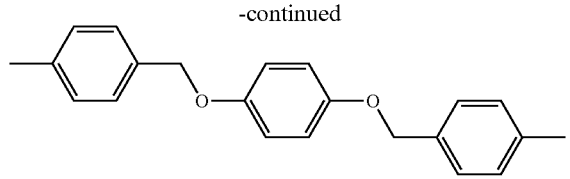
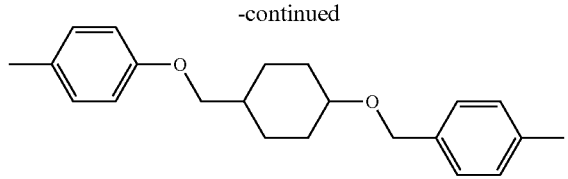
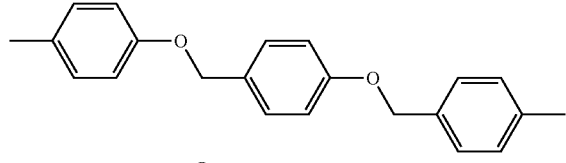
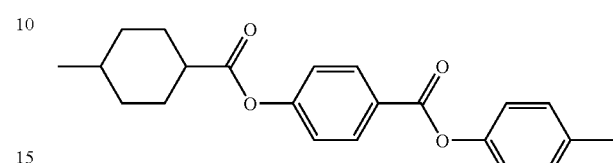
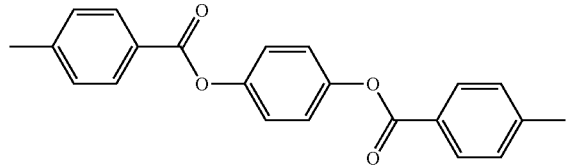
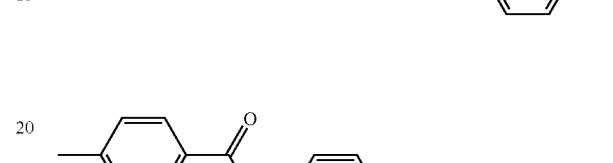
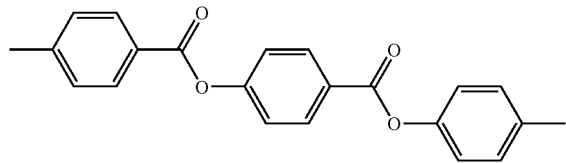
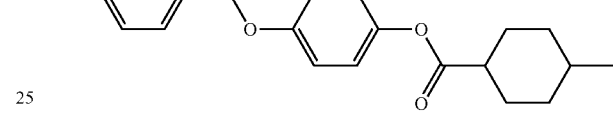
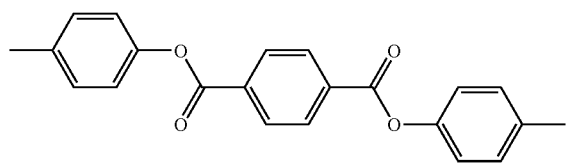
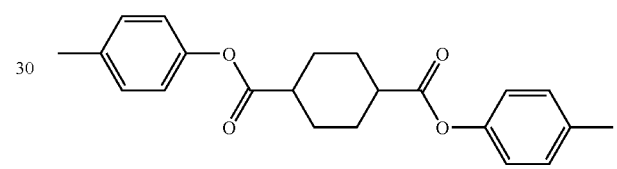
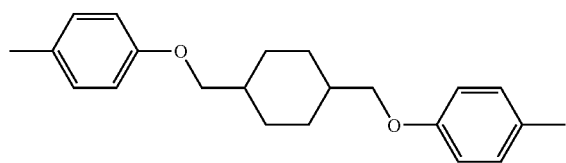
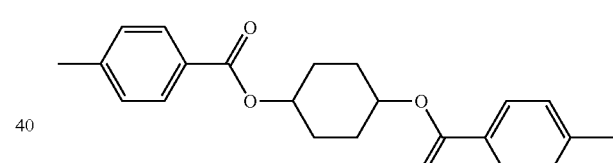
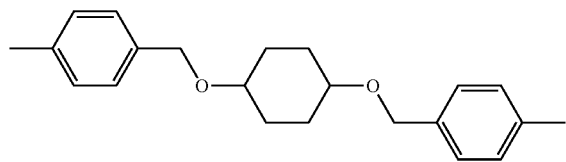
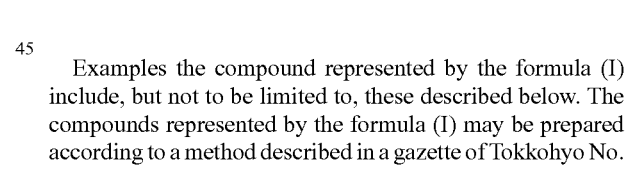
Examples the compound represented by the formula (I) include, but not to be limited to, these described below. The compounds represented by the formula (I) may be prepared according to a method described in a gazette of Tokkohyo No. hei 11-513019 (WO97/00600).
I-1
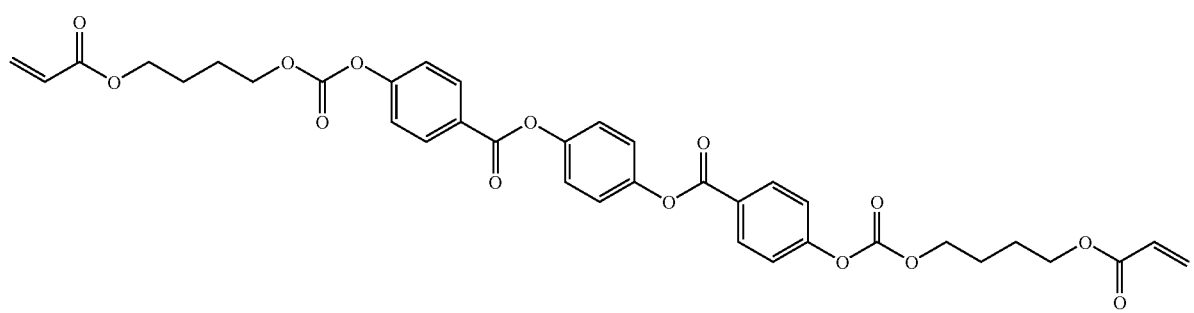

-continued
I-2
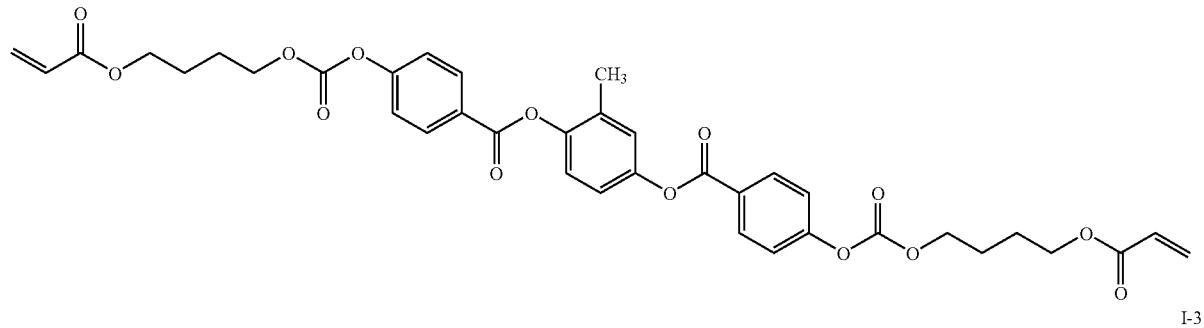
I-3
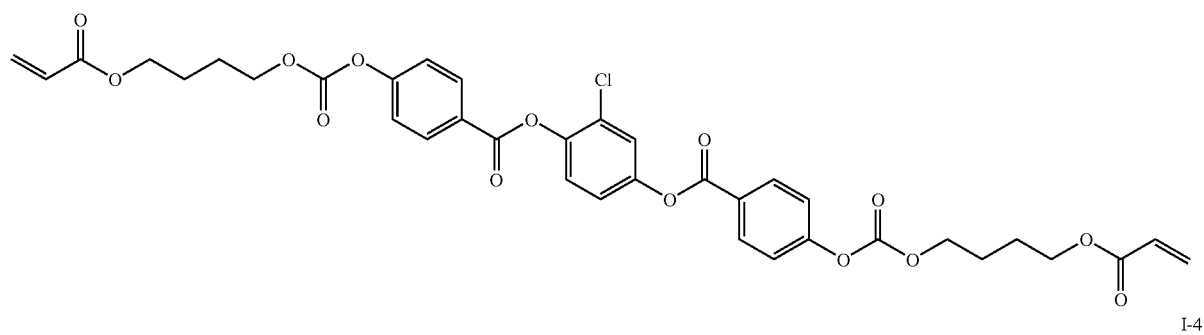
I-4
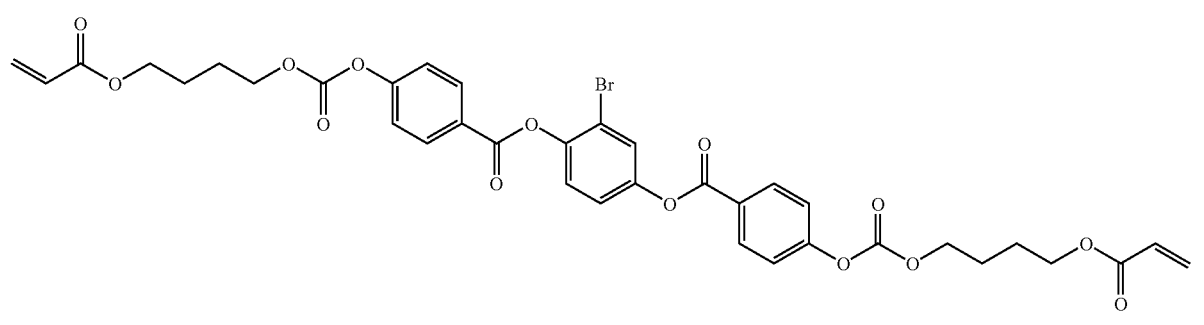
I-5
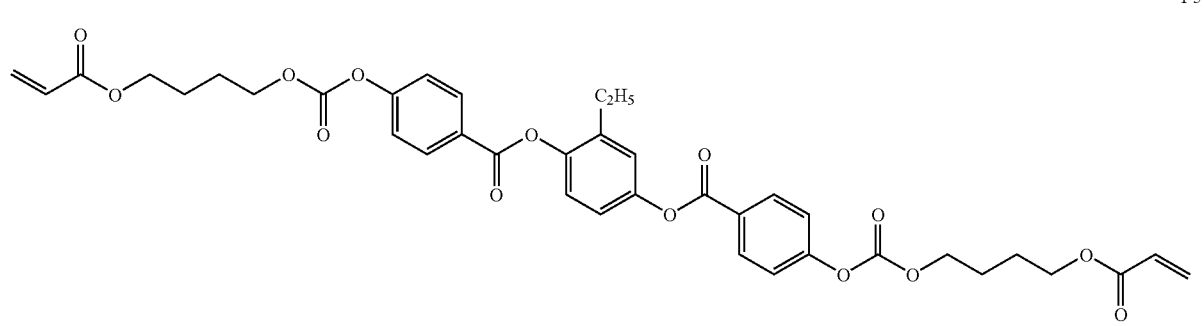
I-6
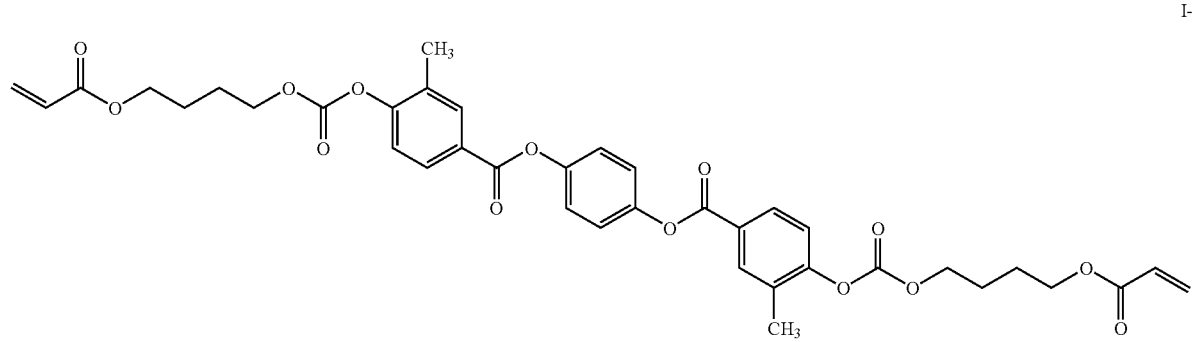

I-7
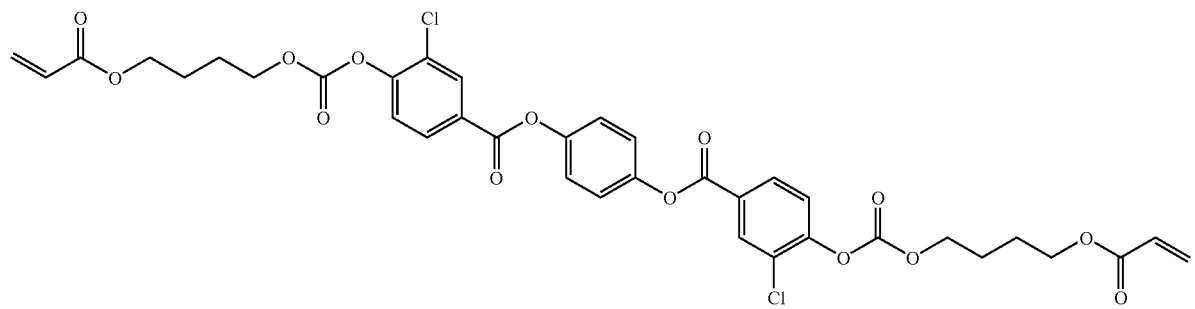
I-8
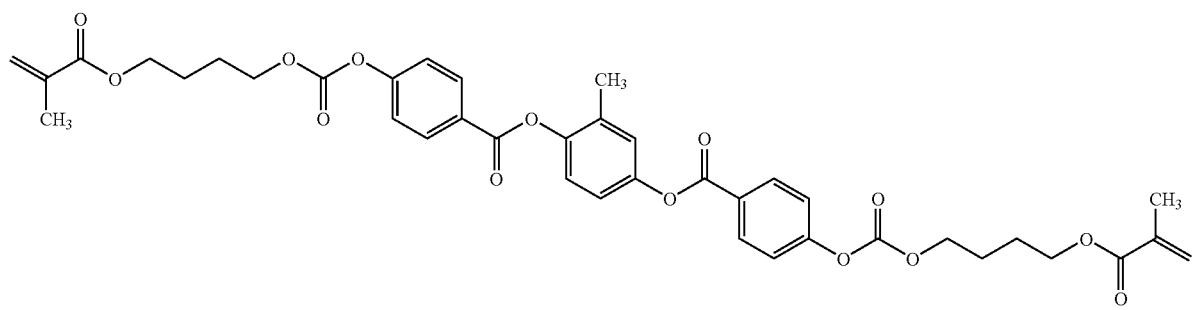
I-9
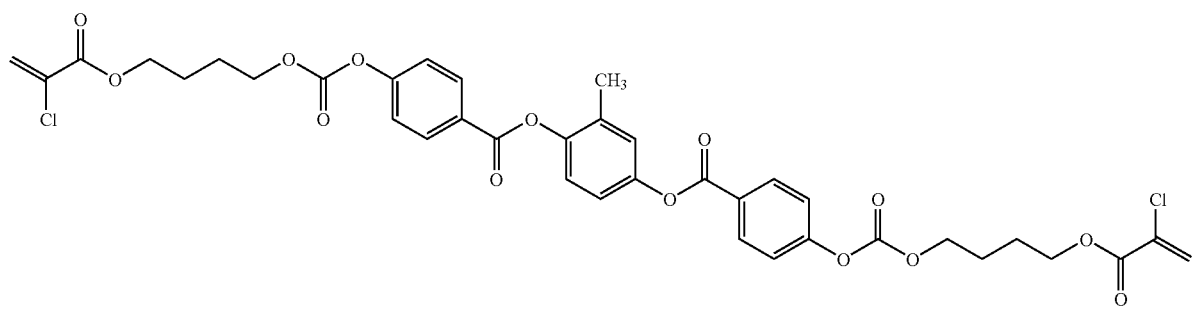
I-10
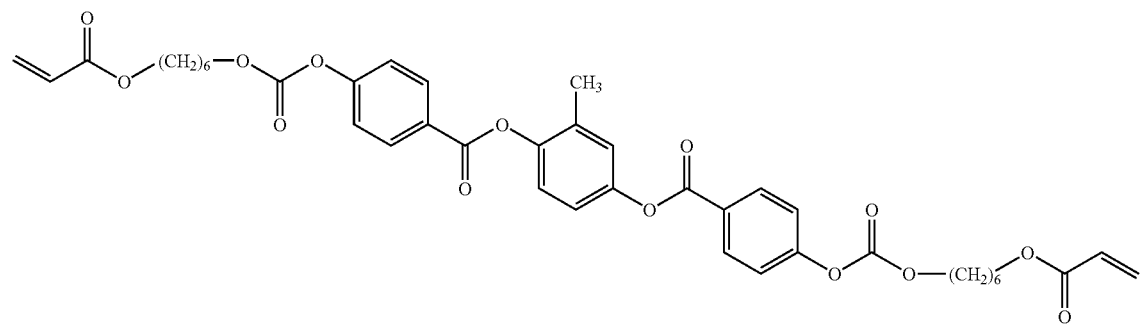

-continued
I-11
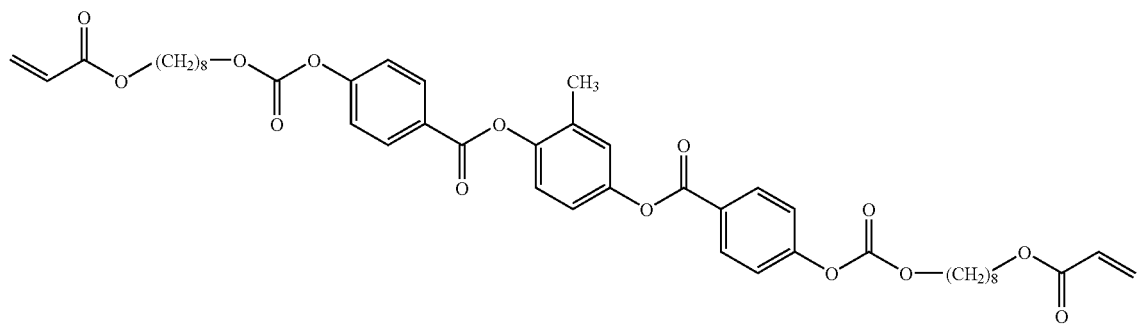
I-12
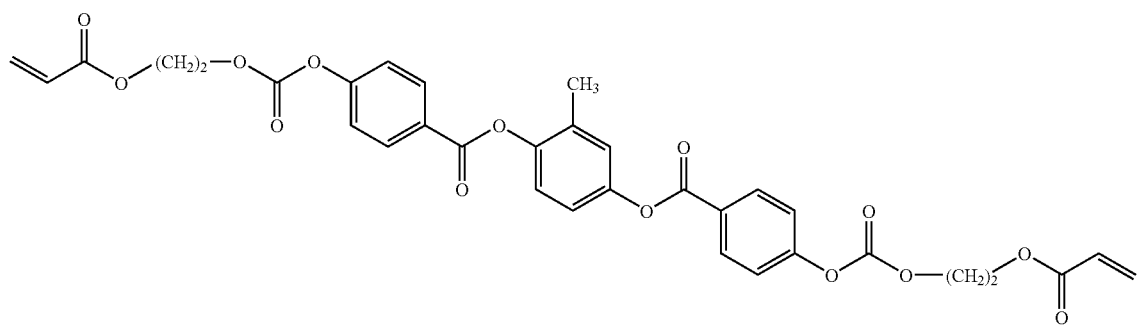
I-13
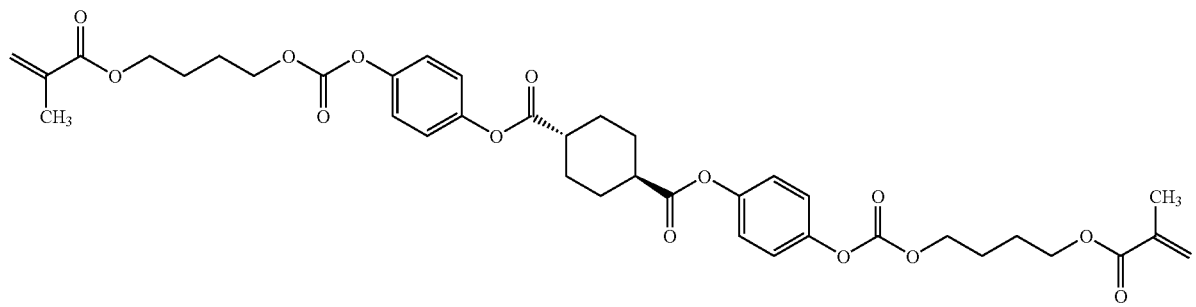
I-14
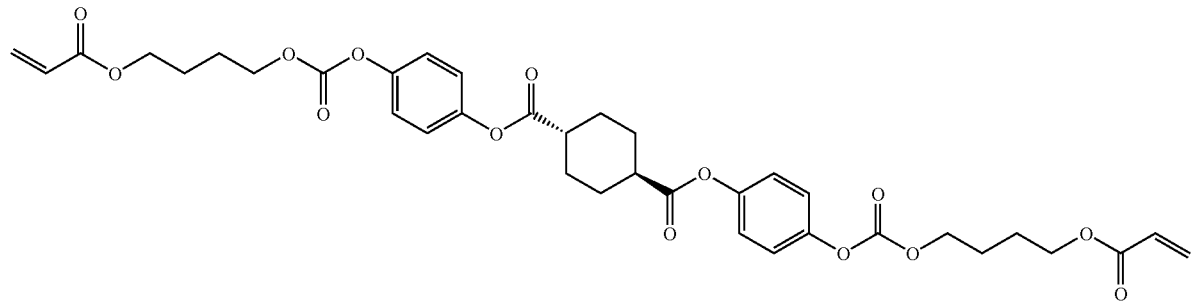

I-15
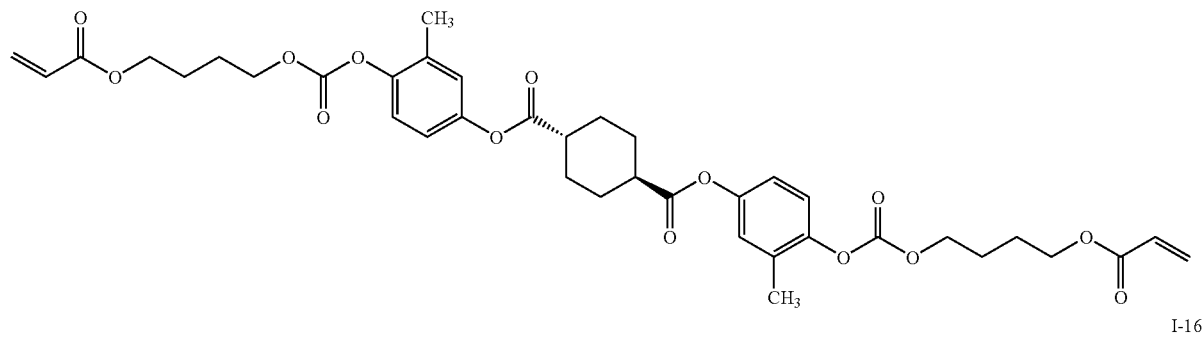
I-16
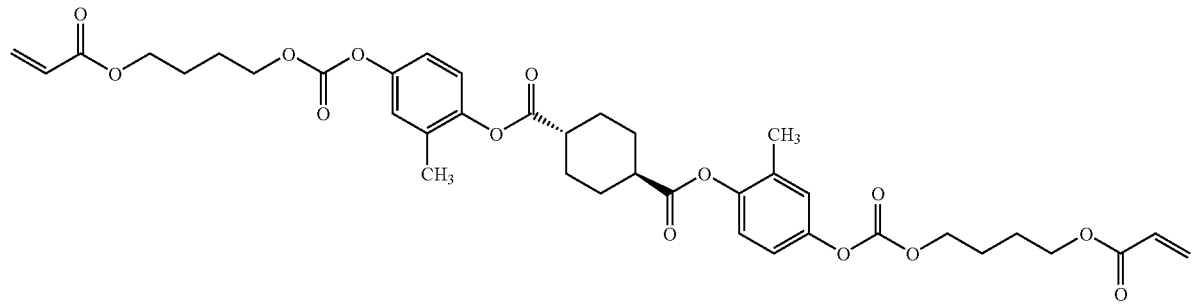
I-17
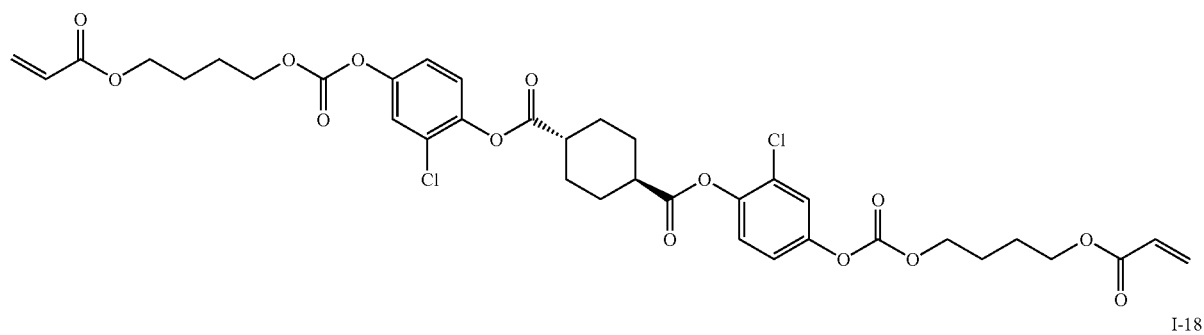
I-18
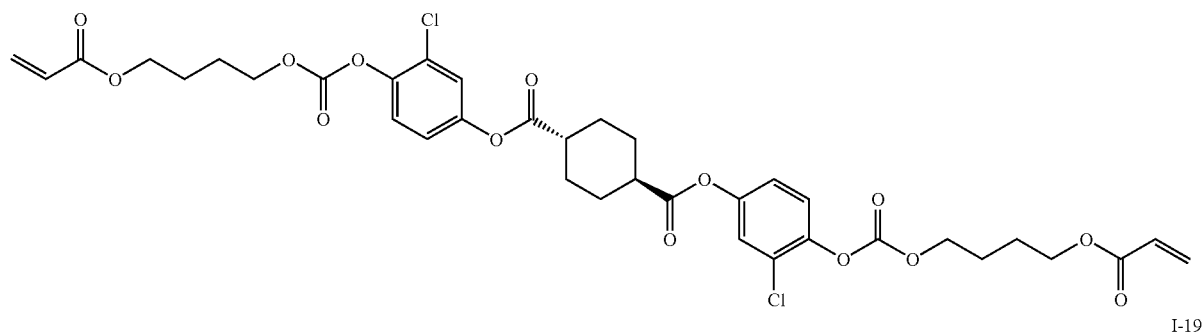
I-19
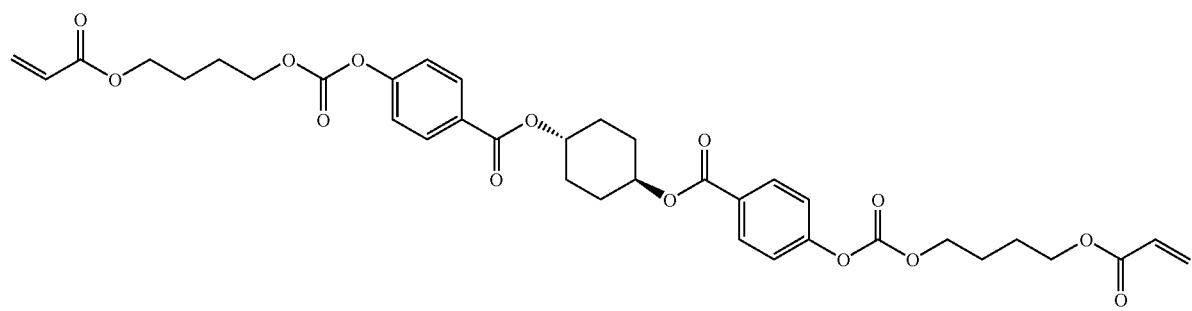

I-20

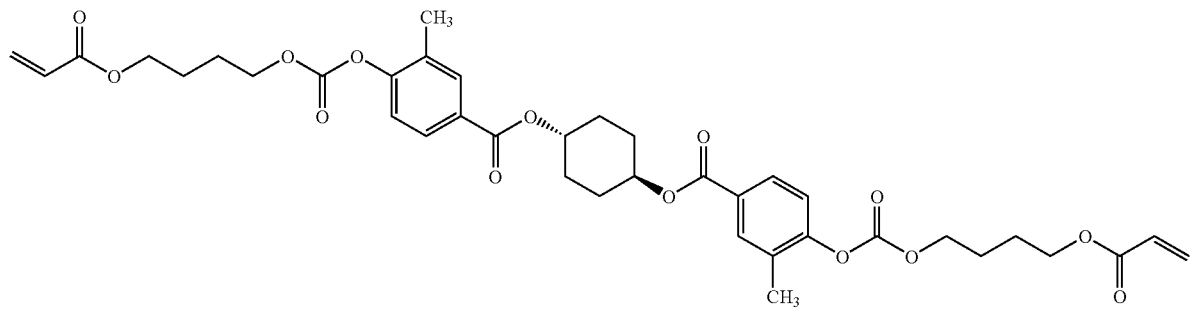

I-21

I-22

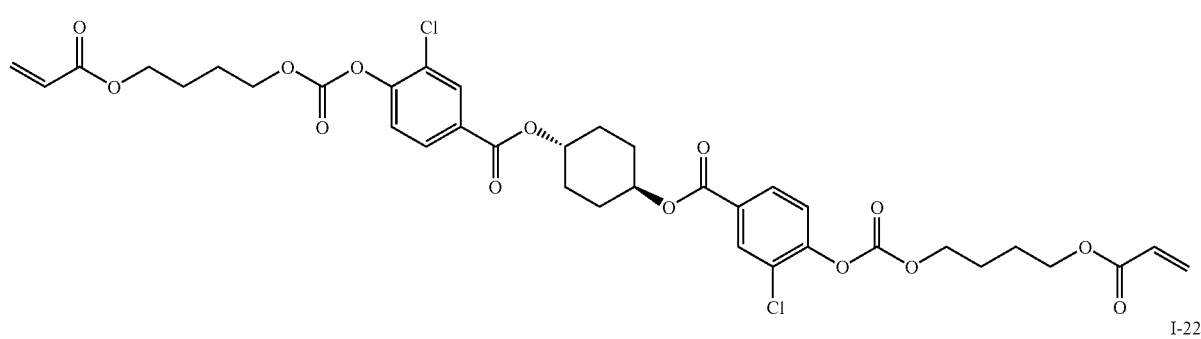

I-23

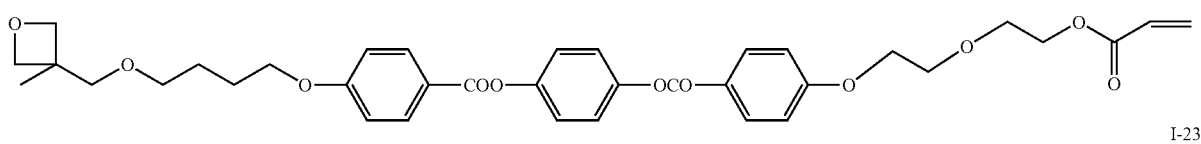

I-24

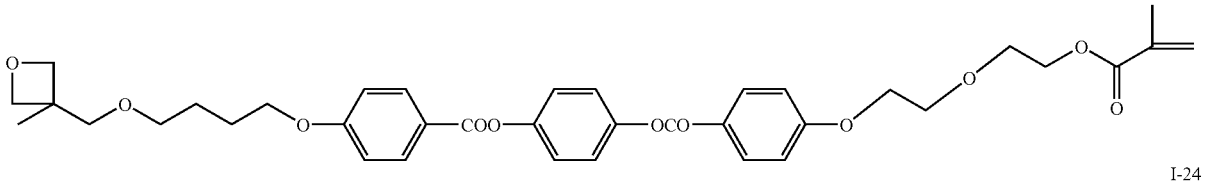

I-25

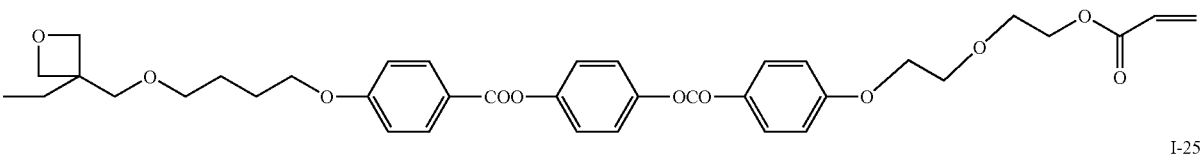

As described above, according to the present invention, discotic liquid-crystalline compounds are also preferably used. Examples of the discotic liquid-crystalline compound, which can be used in the first embodiment, are described in various documents, and include benzene derivatives described in C. Destrade et al., Mol. Cryst., Vol. 171, p. 111 (1981); torxene derivatives described in C. Destrade et al., Mol. Cryst., Vol. 122, p. 141 (1985) and Physics Lett., A, Vol. 78, p. 82 (1990); cyclohexane derivatives described in B. Kohne et al., Angew. Chem., Vol. 96, p. 70 (1984); and aza-crown-base or phenylacetylene-base macrocycles described in J. M. Lehn, J. Chem. Commun., p. 1794 (1985) and in J. Zhang et al., J. Am. Chem. Soc., Vol. 116, p. 2655 (1994). The above mentioned discotic (disk-like) compounds generally have a discotic core in a central portion and groups (L), such as linear alkyl or alkoxy groups or substituted banzoyloxy groups, which radiate from the core. Among them, there are compounds exhibiting liquid crystallinity, and such compounds are generally called as discotic liquid crystal. When such molecules are aligned uniformly, the aggregate of the aligned molecules may exhibit an optically negative uniaxial property.

In the specification, the term of "formed of a discotic compound" is used not only when finally comprising the discotic compound as a low-molecular weight compound, but also when finally comprising a high-molecular weight discotic compound, no longer exhibiting liquid crystallinity, formed by carrying out crosslinking reaction of the low-molecular weight discotic compound having at least one reactive group capable of thermal reaction or photo reaction under heating or under irradiation of light.

According to the present invention, it is preferred that the discotic liquid-crystalline compound is selected from the formula (III) below:

$$D(-L-P)_n \qquad \text{Formula (III)}$$

In the formula, D represents a discotic core, L represents a divalent linking group, P represents a polymerizable group, and n is an integer from 4 to 12.

Preferred examples of the discotic core (D), the divalent linking group (L) and the polymerizable group (P) are respectively (D1) to (D(15), (L1) to (L25) and (P1) to (P18) described in Japanese Laid-Open Patent Publication (Tokkai) No. 2001-4837; and the descriptions in the publication regarding the discotic core (D), the divalent linking group (L) and the polymerizable group (P) may be preferably applicable to this embodiment.

Preferred examples of the discotic compound are shown below.

TE-1

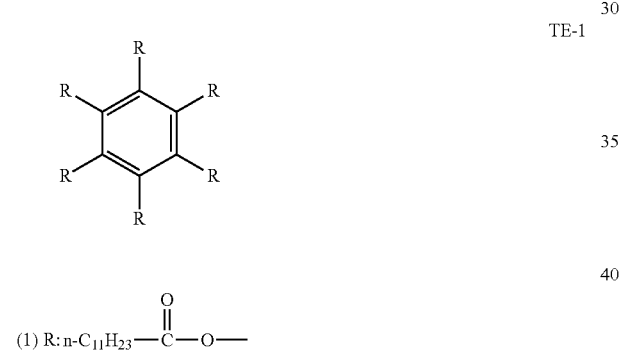

TE-2

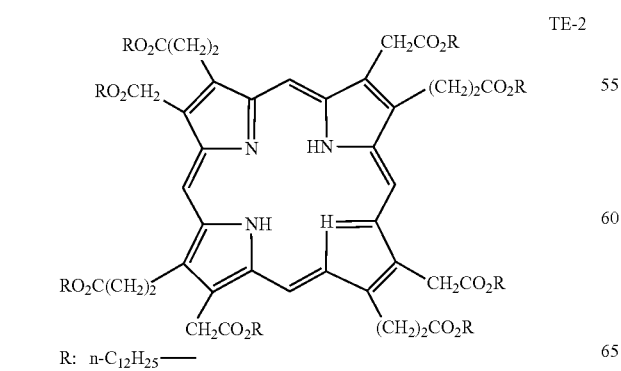

TE-3

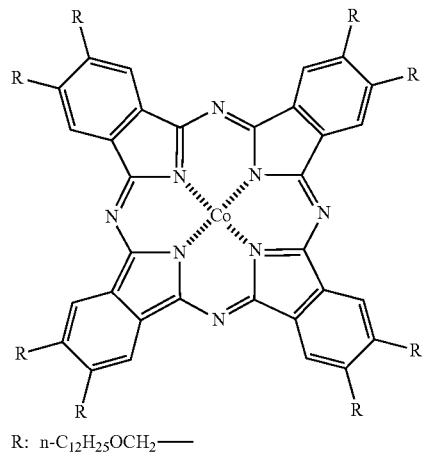

R: n-$C_{12}H_{25}OCH_2$—

TE-4

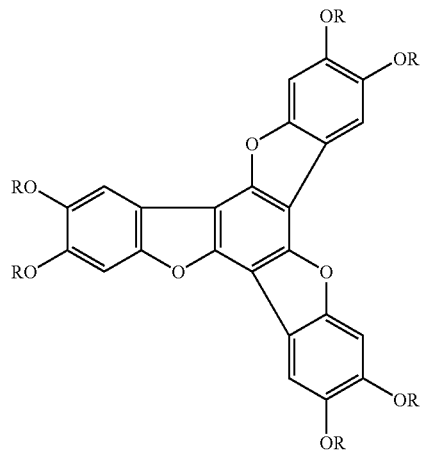

(1) R: 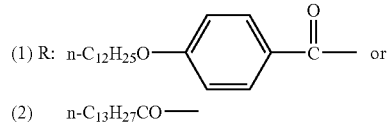 or (2) n-$C_{13}H_{27}CO$—

TE-5

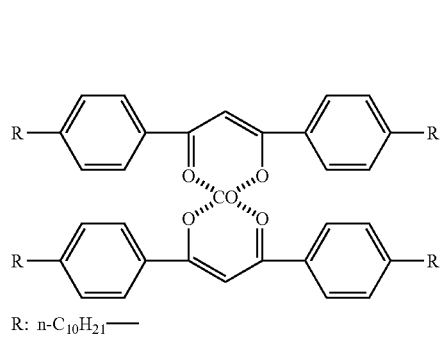

R: n-$C_{10}H_{21}$—

TE-6
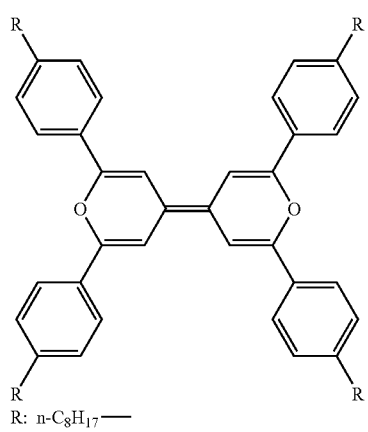
R: n-C₈H₁₇—
TE-7
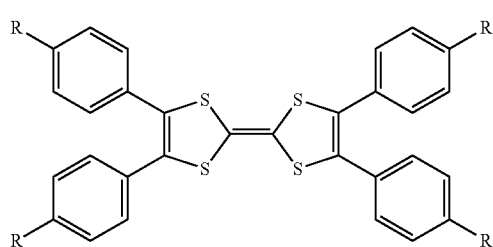
R: n-C₁₆H₃₃O—
TE-8
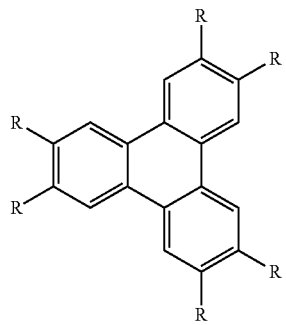
(1)  n-C$_m$H$_{2m+1}$O—
(m: an integer from 2 to 5)
(2) 
(3) 
(4) 
(5) 
(6) 
(m: an integer from 7 to 10)
(7) 
(m: an integer from 4 to 10)
(8) 
(m: an integer from 4 to 10)
TE-9
R:
(1) 
(2) 
(3)

TE-10

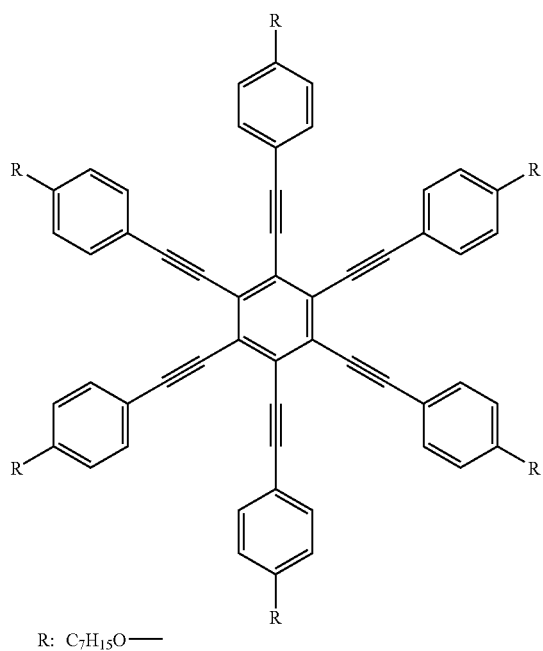

R: $C_7H_{15}O$—

TE-11

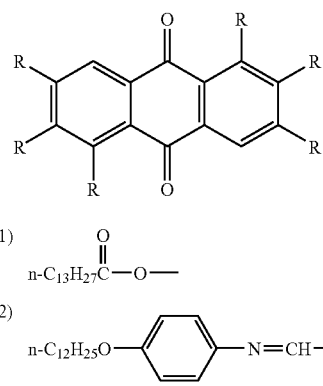

R:

(1)

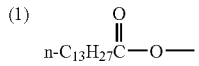

(2)

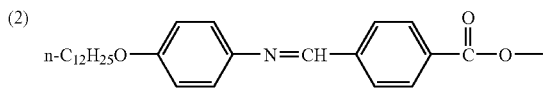

The optically anisotropic layer may be formed according to a process comprising applying a composition (for example a coating liquid) comprising at least on liquid crystalline compound to a surface of an alignment layer, described in detail later, aligning liquid crystalline molecules as to show a liquid crystal phase, and fixing the liquid crystal phase under heating or light-irradiating.

When a discotic liquid crystalline compound having polymerizable groups is used as the liquid crystalline compound, the discotic molecules in the layer may be fixed in any alignment state such as a horizontal alignment state, vertical alignment state, tilted alignment state and twisted alignment state. In the specification, each of the terms "horizontal alignment" and "planar alignment" means that, regarding rod-like liquid-crystalline molecules, the molecular long axes thereof and a layer plane are parallel to each other, and, regarding discotic liquid-crystalline molecules, the disk-planes of the cores thereof and a layer plane are parallel to each other. However, they are not required to be exactly parallel to each other, and, in the specification, the term "planar alignment" should be understood as an alignment state in which molecules are aligned with a tilt angle against a layer plane less than 10 degree. The tilt angle is preferably from 0 to 5 degree, more preferably 0 to 3 degree, much more preferably from 0 to 2 degree, and most preferably from 0 to 1 degree.

When two or more optically anisotropic layers formed of the liquid-crystalline compositions are stacked, the combination of the liquid-crystalline compositions is not particularly limited, and the combination may be a stack formed of liquid-crystalline compositions all comprising discotic liquid-crystalline molecules, a stack formed of liquid-crystalline compositions all comprising rod-like liquid-crystalline molecules, or a stack formed of a layer comprising discotic liquid-crystalline molecules and a layer comprising rod-like liquid-crystalline molecules. Combination of orientation state of the individual layers also is not particularly limited, allowing stacking of the optically anisotropic layers having the same orientation status, or stacking of the optically anisotropic layer having different orientation states.

The optically anisotropic layer may be formed by applying a coating liquid, containing a liquid-crystalline compound, a compound having two or more types of reactive groups and, if necessary, a polymerization initiator as described below or other additives, to a surface of an alignment layer, described in detail later. The solvent used for preparing the coating liquid is preferably an organic solvent. Examples of organic solvents include amides (e.g., N,N-dimethyl formamide), sulfoxides (e.g., dimethyl sulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone) and ethers (e.g., tetrahydrofuran, 1,2-dimethoxyethane). Alkyl halides and ketones are preferred. Two or more organic solvents may be used in combination.

[Fixing of Liquid-crystalline Molecules in an Alignment State]

It is preferred that the liquid-crystalline molecules in an alignment state are fixed without disordering the state. Fixing is preferably carried out by the polymerization reaction of the reactive groups contained in the liquid-crystalline molecules. The polymerization reaction includes thermal polymerization reaction using a thermal polymerization initiator and photo-polymerization reaction using a photo-polymerization initiator. Photo-polymerization reaction is preferred. Photo-polymerization reaction may be radical or cationic polymerization.

Examples of radical photo-polymerization initiators include alpha-carbonyl compounds (described in U.S. Pat. Nos. 2,367,661 and 2,367,670), acyloin ethers (described in U.S. Pat. No. 2,448,828), alpha-hydrocarbon-substituted aromatic acyloin compounds (described in U.S. Pat. No. 2,722,512), polynuclear quinone compounds (described in U.S. Pat. Nos. 3,046,127 and 2,951,758), combinations of triarylimidazole dimers and p-aminophenyl ketone (described in U.S. Pat. No. 3,549,367), acridine and phenazine compounds (described in Japanese Laid-Open Patent Publication (Tokkai) syo No. 60-105667 and U.S. Pat. No. 4,239,850) and oxadiazole compounds (described in U.S. Pat. No. 4,212,970).

As the cationic-polymerization initiator, examples include organic sulfonium salts, iodonium salts, and phosphonium salts. The organic sulfonium salts are preferred, and triphenyl sulfonium salts are particularly preferred. As a counter ion of these compounds, hexafluoroantimonate, hexafluorophosphate, or the like is preferably used.

The amount of the photo-polymerization initiators to be used is preferably 0.01 to 20% by weight, more preferably 0.5 to 5% by weight on the basis of solids in the coating liquid. Irradiation for polymerizing the liquid-crystalline molecules preferably uses UV rays. The irradiation energy is preferably 10 mJ/cm² to 10 J/cm², and more preferably 25 to 800 mJ/cm². Illuminance is preferably 10 to 1000 mW/cm², more preferably 20 to 500 mW/cm², and further preferably 40 to 350 mW/cm². The irradiation wavelength is preferably 250 to 450 nm, and more preferably 300 to 410 nm at the peak. Irradiation may be carried out in an atmosphere of inert gas such as nitrogen gas and/or under heating to facilitate the photo-polymerization reaction.

[Orientation Induced by Irradiation of Polarized Light (Photoinduced Orientation)]

The optically anisotropic layer may exhibit or enhance in-plane retardation attributed to photoinduced orientation with the aid of polarized light irradiation. The polarized light irradiation may be carried out in photo-polymerization process in the fixation of orientation, or the polarized light irradiation may precede and then may be followed by non-polarized light irradiation for further fixation, or the non-polarized light irradiation for fixation may precede and the polarized light irradiation may succeed for the photoinduced orientation. It is preferred that only the polarized light irradiation is conducted or the polarized light irradiation precedes and is followed by non-polarized light irradiation for further fixation. When the polarized light irradiation is carried out in photo-polymerization process in the fixation of orientation and a radical photo-polymerization initiator is used as the photo-polymerization initiator, the polarized light irradiation is preferably carried out under an inert gas atmosphere having an oxygen concentration of 0.5% or below. The irradiation energy is preferably 20 mJ/cm² to 10 J/cm², and more preferably 100 mJ/cm² to 800 mJ/cm². The illuminance is preferably 20 to 1000 mW/cm², more preferably 50 to 500 mW/cm², and still more preferably 100 to 350 mW/cm². Types of the liquid-crystalline molecule to be hardened by the polarized light irradiation are not particularly limited, wherein the liquid-crystalline molecule having an ethylenic unsaturated group as the reactive group is preferable. It is preferred that the irradiation light to be used has a peak falling within the range from 300 to 450 nm, more preferred from 350 to 400 nm.

[Post-curing with UV-light Irradiation after Irradiation of Polarized Light]

After the first irradiation of polarized light for photoinduced orientation, the optically anisotropic layer may be irradiated with polarized or non-polarized light so as to improve the reaction rate (post-curing step). As a result, the adhesiveness is improved and, thus, the optically anisotropic layer can be produced with larger feeding speed. The post-curing step may be carried out with polarized or non-polarized light, and preferably with polarized light. Two or more steps of post-curing are preferably carried out with only polarized light, with only non-polarized light or with combination of polarizing and non-polarized light. When polarized and non-polarized light are combined, irradiating with polarized light previous to irradiating with non-polarized light is preferred. The irradiation of UV light may be or may not be carried out under an inert gas atmosphere. However, when a radical photo-polymerization initiator is used as the photo-polymerization initiator, the irradiation may be carried out preferably under an inert gas atmosphere where the oxygen gas concentration is 0.5% or lower. The irradiation energy is preferably 20 mJ/cm² to 10 J/cm², and more preferably 100 to 800 mJ/cm². The illuminance is preferably 20 to 1000 mW/cm², more preferably 50 to 500 mW/cm², and still more preferably 100 to 350 mW/cm². As the irradiation wave length, the irradiation of polarized light has a peak falling within the range preferably from 300 to 450 nm, more preferably from 350 to 400 nm. The irradiation of non-polarized light has a peak falling within the range preferably from 200 to 450 nm, more preferably from 250 to 400 nm.

[Fixing the Alignment of Liquid-crystalline Compounds Having Radically Reactive Group and Cationically Reactive Group]

As described above, it is also preferred that liquid-crystalline compound have two or more reactive groups which have different polymerization condition to each other. In such case, an optically anisotropic layer comprising polymer having unreacted reactive group can be produced by polymerizing only one type of reactive groups among plural types of reactive groups by selecting polymerization condition. In the followings, the conditions which are suitable for the polymerization and fixation of the liquid-crystalline compounds having radically reactive group and cationically reactive group (the aforementioned I-22 to I-25 as specific examples) are explained.

First, as the polymerization initiator, only a photopolymerization initiator which acts on a reactive group intended to be polymeraized is preferred to be used. That is, it is preferred that, when a radically reactive groups are polymerized only radical photopolymerization initiator is used, and when a cationically reactive groups are polymerized only cationic photopolymerization initiator is used. The content of the photopolymerization initiator falls in the range preferably from 0.01 to 20% by weight, more preferably from 0.1 to 8% by weight, and further preferably from 0.5 to 4% by weight of the total weight of the solid components contained in the coating solution.

Second, light irradiation for the polymerization is preferably conducted by using ultra violet ray. When the irradiation energy and/or illuminance are too high, non-selective reaction of both of the radically reactive group and cationically reactive group is of concern. In view of the above, the irradiation energy is preferably 5 mJ/cm² to 500 mJ/cm², more preferably 10 to 400 mJ/cm², and further preferably 20 to 200 mJ/cm². The illuminance is preferably 5 to 500 mW/cm², more preferably 10 to 300 mW/cm², and still more preferably 20 to 100 mW/cm². As the irradiation wave length, the light has a peak falling within the range preferably from 250 to 450 nm, more preferably from 300 to 410 nm.

Among photopolymerization reaction, the reaction by using a radical photopolymerization initiator is prevented by oxygen, and the reaction by using a cationic photopolymerization initiator is not prevented by oxygen. Therefore, when one of the reactive groups of the liquid-crystalline compounds having radically reactive group and cationically reactive group is selectively reacted, it is preferred that the light irradiation is carried out in an atmosphere of inert gas such as nitrogen gas when the radically reactive group is selectively reacted, and in an atmosphere containing oxygen (for example, in air atmosphere) when the cationically reactive group is selectively reacted.

[Horizontal Orientation Agent]

At least one compound selected from the group consisting of the compounds represented by formula (1), (2) or (3), and fluorine-containing homopolymer and copolymer using the monomer represented by the general formula (4), which are shown below, may be added to the composition used for forming the optically anisotropic layer may comprise, in order to promote aligning the liquid-crystalline molecules horizontally.

The formula (1) to (4) will be described in detail below.

Formula (1)

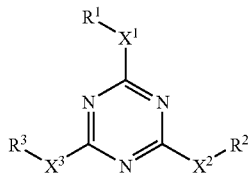

In the formula, $R^1$, $R^2$ and $R^3$ each independently represent a hydrogen atom or a substituent; and $X^1$, $X^2$ and $X^3$ each independently represent a single bond or a divalent linking group. As the substituent represented by each $R^1$, $R^2$ and $R^3$, preferable examples include a substituted or unsubstituted alkyl group (an unsubstituted alkyl group or an alkyl group substituted with fluorine atom is more preferable), a substituted or unsubstituted aryl group (an aryl group having an alkyl group substituted with fluorine atom is more preferable), a substituted or unsubstituted amino group, an alkoxy group, an alkylthio group, and a halogen atom. The divalent linking group represented by each of $X^1$, $X^2$ and $X^3$ may preferably be an alkylene group, an alkenylene group, a divalent aromatic group, a divalent heterocyclic group, —CO—, —$NR^a$— (wherein $R^a$ represents a $C_{1-5}$ alkyl group or hydrogen atom), —O—, —S—, —SO—, —$SO_2$—, or a divalent linking group formed by combining two or more groups selected from the above listed groups). The divalent linking group is more preferably a group selected from a group consisting of an alkylene group, phenylene group, —CO—, —$NR^a$—, —O—, —S—, and —$SO_2$—, or a divalent linking group formed by combining two or more groups selected from the above group. The number of the carbon atoms of the alkylene group is preferably 1 to 12. The number of the carbon atoms of the alkenylene group is preferably 2 to 12. The number of the carbon atoms of the divalent aromatic group is preferably 6 to 10.

Formula (2)

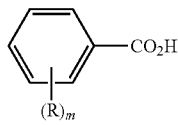

In the formula, R represents a substituent, and m represents an integer of 0 to 5. When m is 2 or more, plural R may be the same or different to each other. Preferable examples of the substituent represented by R are the same as the examples listed above for each of $R^1$, $R^2$, and $R^3$. m is preferably an integer of 1 to 3, more preferably 2 or 3.

Formula (3)

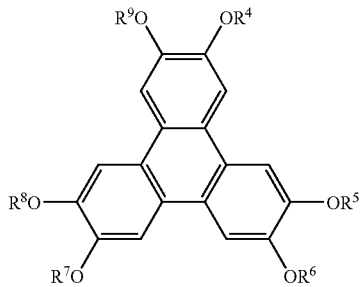

In the formula, $R^4$, $R^5$, $R^6$, $R^7$, $R^8$ and $R^9$ each independently represents a hydrogen atom or a substituent. Preferable examples of the substituent represented by each of $R^4$, $R^5$, $R^6$, $R^7$, $R^8$ and $R^9$ are the same as the examples listed above for each of $R^1$, $R^2$ and $R^3$ in the general formula (I).

Examples of the horizontal orientation agent, which can be used in the present invention, include those described in paragraphs [0092] to [0096] in Japanese Laid-Open Patent Publication (Tokkai) No. 2005-099248 and the methods for preparing such compounds are described in the document.

General formula (4)

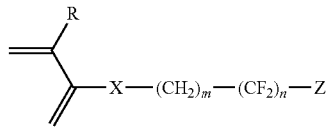

In the formula, R represents hydrogen atom or methyl group, X represents oxygen atom or sulfur atom, Z represents hydrogen atom or fluorine atom; m represents an integer of 1 to 6, n represents an integer of 1 to 2. The polymer compounds described in Japanese Laid-Open Patent Publications (Tokkai) Nos. 2005-206638 and 2006-91205 can be used as horizontal orientation agents for reducing unevenness in coating. The method of preparation of the compounds is also described in the publications.

The amount of the horizontal orientation agents added is preferably 0.01 to 20% by weight, more preferably 0.01 to 10% by weight, and most preferably 0.02 to 1% by weight with respect to the weight of the liquid crystalline compound. The compounds represented by the aforementioned general formula (1) to (4) may be used singly, or two or more types of them may be used in combination.

[Optically Anisotropic Layer Produced by Stretching]

The optically anisotropic layer may be produced by stretching polymer. When a polymer in the optically anisotropic layer, which is preferred to have at least one unreacted reactive group as described above, is produced, a polymer having a reactive group may be stretched or a reactive group may be introduced by using a coupling agent or the like to an optically anisotropic layer prepared by stretching. The characteristic of the optically anisotropic layer includes low cost, self-supporting property (a support is not needed when the layer is formed or maintained), and the like.

[Post-treatment of Optically Anisotropic Layer]

Various post-treatment may be conducted to modify the optically anisotropic layer produced. Examples of the post treatment include corona treatment for improving adhesiveness, addition of a plasticizer for improving plasticity, addition of a heat polymerization prohibiting agent for improving storage stability, and coupling treatment for improving reactivity. When the polymer in the optically anisotropic layer have a unreacted reactive group, addition of a polymerization initiator suited to the reactive group may also be a useful modification method. For example, by addition of a radical photopolymerization initiator to an optically anisotropic layer fixed by polymerization of a liquid crystalline compound having a cationically reactive group and a radically reactive group by using a cationic photopolymerization initiator, the reaction of the unreacted radically reactive group in the patterned light-exposure afterward can be promoted. As the method of addition of the plasticizer or the photopolymerization initiator, examples include immersing an optically anisotropic layer in the solution of the desired additive, and applying the solution of the desired additive to the optically anisotropic layer for the permeance of the solution. Further, when another layer is applied to the optically anisotropic layer, an additive may be added to the coating solution of the layer for permeance to the optically anisotropic layer.

[Birefringence Pattern Builder]

The birefringence pattern builder is a material for producing a birefringence pattern, and a material from which birefringence pattern can be obtained by proceeding predetermined steps. The birefringence pattern builder may generally be in a shape of film or sheet. The birefringence pattern builder may include a functional layer which can be applied with various accessory function, other than the optically anisotropic layer. Examples of the functional layer include support, alignment layer, reflective layer, and post-adhesive layer. Further, the birefringence pattern builder used as a transfer material or the birefringence pattern builder produced by using a transfer material may include temporary support, adhesive layer for transfer, or dynamic property control layer.

[Support]

The birefringence pattern builder may include support for the purpose of maintaining the dynamic stability. Support used for the birefringence pattern builder is not particularly limited, and it may be rigid or flexible. As a rigid support, examples include, although not particularly limited to, known glasses such as soda glass sheet having a silicon oxide film formed on the surface thereof, low-expansion glass, non-alkali glass, and silica glass sheet, metal plates such as aluminum plate, iron plate, and SUS plate, resin plate, ceramic plate, and stone plate. As a flexible support, examples include, although not particularly limited to, plastic films such as cellulose ester (for example, cellulose acetate, cellulose propionate, and cellulose butyrate), polyolefin (for example, norbornene based polymer), poly(meth)acrylate (for example, polymethylmethacrylate), polycarbonate, polyester, and polysulfone, paper, aluminium foil, and fabric. In view of the convenience of handling, the thickness of the rigid support is preferably 100 to 3000 μm, and more preferably 300 to 1500 μm. The thickness of the flexible support is preferably 3 to 500 μm, and more preferably 10 to 200 μm. The support is preferred to have heat-resistance sufficient for preventing coloring or deformation in the after-mentioned baking step. The support is also preferred to have reflective function itself instead of provided with the after-mentioned reflective layer separately.

When the support becomes the substrate in the substrate for liquid crystal display device, the support is preferably transparent. Examples of the substrate include known glasses such as soda glass sheet having a silicon oxide film formed on the surface thereof, low-expansion glass and non-alkali glass, a known glass sheet such as silica glass sheet, and transparent substrate formed of polymer. In the substrate for liquid crystal display device, substrate is preferred to have heat-resistance, because production of the substrate for liquid crystal display device include processes at high-temperature more than 180° C. for baking of color filter or alignment layer. As such substrate having heat-resistance, glass sheet, polyimide, polyether sulfone, eat-resisting polycarbonate, or polyethylene naphthalate is preferred. Glass sheet is particularly preferred in from the viewpoint of price, transparency, and heat-resistance. The substrate can be improved in the adhesiveness with the adhesive layer for transfer by being preliminarily subjected to a coupling treatment. The coupling treatment is preferably carried out by using the method described in Japanese Laid-Open Patent Publication "Tokkai" No. 2000-39033. The thickness of the substrate is preferably 700 to 1200 μm in general, most preferably 300 to 1000 μm, although being not specifically limited.

The substrate which is used for the process of the present invention may be a color filter substrate having a color filter layer on the above substrate.

[Alignment Layer]

As described above, an alignment layer may be used for forming the optically anisotropic layer. The alignment layer may be generally formed on a surface of a support or a temporary support, or on a surface of an undercoating layer formed on the support. The alignment layer has ability of controlling the alignment of liquid crystalline molecules thereon, and, as far as having such ability, may be selected from various known alignment layers. The alignment layer that can be employed in the present invention may be provided by rubbing a layer formed of an organic compound (preferably a polymer), oblique vapor deposition, the formation of a layer with microgrooves, or the deposition of organic compounds (for example, omega-tricosanoic acid, dioctadecylmethylammonium chloride, and methyl stearate) by the Langmuir-Blodgett (LB) film method. Further, alignment layers imparted with orientation functions by exposure to an electric or magnetic field or irradiation with light are also known.

An alignment layer in the laminated structure of the present invention may have a function as a layer for oxygen shut-off.

Examples of the organic compound, which can be used for forming the alignment layer, include polymers such as polymethyl methacrylate, acrylic acid/methacrylic acid copolymer, styrene/maleimide copolymer, polyvinyl alcohol, poly (N-methyrol acrylamide), polyvinylpyrrolidone, styrene/vinyl toluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, carboxymethyl cellulose, polyethylene, polypropylene and polycarbonates; and silane coupling agents. Preferred exampled of the polymer include polyimide, polystyrene, styrene based polymers, gelatin, polyvinyl alcohol and alkyl-modified polyvinyl alcohol having at least one alkyl group (preferably $C_6$ or longer alkyl group).

For production of an alignment layer, a polymer may preferably used. The types of polymer, which is used for forming the alignment layer, may be decided depending on what types of alignment state of liquid crystal (in particular how large of tilt angle) is preferred. For forming an alignment layer capable of aligning liquid crystalline molecules horizontally, it is required not to lower the surface energy of the alignment layer, and polymer may be selected from typical polymers have been used for alignment layers. Examples of such polymer are described in various documents concerning liquid crystal cells or optical compensation sheets. Polyvinyl alcohols, modified polyvinyl alcohols, poly acrylic acid, acrylic acid/acrylate copolymers, polyvinyl pyrrolidone, cellulose and modified cellulose are preferably used. Materials used for producing the alignment layer may have at least one functional group capable of reacting with the reactive group of liquid crystalline compound in the optically anisotropic layer. Examples of the polymer having such s functional group include polymers having side chains comprising a repeating unit having such functional group, and polymers having a cyclic moiety substituted with such a functional group. It is more preferable to use an alignment layer capable of forming a chemical bond with the liquid-crystalline compound at the interface, and a particularly preferable example of such alignment layer is a modified polyvinyl alcohol, described in Japanese Laid-Open Patent Publication "Tokkaihei" No.

9-152509, which has an acrylic group introduced in the side chain thereof using acid chloride or Karenz MOI (product of Showa Denko K. K.). The thickness of the alignment layer is preferably 0.01 to 5 µm, and more preferably 0.05 to 2 µm. The alignment layer may functions as an oxygen shut-off layer.

Polyimide, preferably fluorine-containing polyimide, films, which have been used as an alignment layer for LCD, are also preferable. The film may be formed by applying poly(amic acid), provided, for example, as LQ/LX series products by Hitachi Chemical Co., Ltd or as SE series products by NISSAN CHEMICAL INDUSTRIES, LTD, to a surface of the support, heating at 100 to 300° C. for 0.5 to one hour to form a polymer layer, and rubbing a surface of the polymer layer.

The rubbing treatment may be carried out with known techniques which have been employed in the usual step for aligning liquid crystalline molecules of LCD. In particular, the rubbing treatment may be carried out by rubbing a surface of a polymer layer in a direction with paper, gauze, felt, rubber, nylon or polyester fiber or the like. The rubbing treatment may be carried out, for example, by rubbing a surface of a polymer layer in a direction at several times with a cloth having same length and same diameter fibers grafted uniformly.

Examples of the material used in oblique vapor deposition include metal oxides such as $SiO_2$, which is a typical material, $TiO_2$ and $ZnO_2$; fluorides such as $MgF_2$; metals such as Au and Al. Any high dielectric constant metal oxides can be used in oblique vapor deposition, and, thus, the examples thereof are not limited to the above mentioned materials. The inorganic oblique deposition film may be produced with a deposition apparatus. The deposition film may be formed on an immobile polymer film (a support) or on a long film fed continuously.

[Reflective Layer]

The birefringence pattern builder may include reflective layer for the purpose of producing more easily identifiable birefringence pattern. As reflective layer, examples include metal layer such as aluminum or silver.

[Post-adhesive Layer]

The birefringence pattern builder may include post-adhesive layer in order that the patterned birefringent product produced after the after-mentioned patterned light exposure and baking can be attached to another product. The material of the post-adhesive layer is not particularly limited, but preferred to be a material which have adhesiveness even after the baking step for production of the birefringence pattern.

[Two or More Optically Anisotropic Layer]

The birefringence pattern builder may include two or more optically anisotropic layers. The two or more optically anisotropic layers may be adjacent to each other in direction of the normal line, or may sandwich another functional layer. The two or more optically anisotropic layers may have almost the same retardation to each other, or different retardation to each other. The slow axes of them may be in the same direction to each other, or different direction to each other.

As an example wherein a birefringence pattern builder having two or more optically anisotropic layers laminated so as that the slow axis of each is in the same direction is used, a pattern having large retardation can be produced. Even when the optically anisotropic layer at hand singly has insufficient retardation, a patterned optically anisotropic layer including a domain having large retardation can be readily obtained by laminating two or three layers and then conducting a patterned light-exposure.

As an example wherein a birefringence pattern builder having two or more optically anisotropic layers laminated so as that the direction of slow axis and retardation of each is different is used, a patterned wideband λ/4 plates can be produced. As a method for producing wideband λ/4 plate, a method is proposed wherein λ/4 plate and λ/2 plate are stacked so as that the slow axes of them are 60° apart to each other (The research report of Ono et al. IDW2005. page 1411). A birefringence pattern builder having λ/4 plate and λ/2 plate stacked so as that the slow axes of them are 60° apart to each other is useful for producing a pattern of the wideband λ/4 plate.

[Photosensitive Polymer Layer]

A photosensitive polymer layer functions as an adhesive layer for transfer in the after-mentioned transfer material or as a layer for forming step in a liquid crystal display device. The photosensitive polymer layer may be formed of a photosensitive polymer composition, for which either of positive type and negative type is acceptable, and commercial resist material may also be used. When used as an adhesive layer for transfer, adhesiveness is preferably generated by light irradiation. From the viewpoint of environment and explosion protection, the photosensitive polymer can be developed preferably with an aqueous solution containing 5% or less organic solvent, and more preferably with an alkaline solution. The photosensitive polymer layer is preferably formed of a polymer composition comprising at least (1) a polymer, (2) a monomer or oligomer, and (3) a photopolymerization initiator or photopolymerization initiator system.

These components (1) to (3) will be explained below.

(1) Polymer

The polymer (which may be referred simply to as "binder", hereinafter) is preferably a alkaline-soluble polymer consisting of a polymer having, in the side chain thereof, a polar group such as carboxylic acid groups or carboxylic salt. Examples thereof include methacrylic acid copolymer, acrylic acid copolymer, itaconic acid copolymer, crotonic acid copolymer, maleic acid copolymer, and partially-esterified maleic acid copolymer described in Japanese Laid-Open Patent Publication "Tokkaisho" No. 59-44615, Examined Japanese Patent Publication "Tokkosho" Nos. 54-34327, 58-12577 and 54-25957, Japanese Laid-Open Patent Publication "Tokkaisho" Nos. 59-53836 and 59-71048. Cellulose derivatives having on the side chain thereof a carboxylic acid group can also be exemplified. Besides these, also cyclic acid anhydride adduct of hydroxyl-group-containing polymer are preferably used. Particularly preferable examples include copolymer of benzyl(meth)acrylate and (meth)acrylic acid described in U.S. Pat. No. 4,139,391, and multi-system copolymer of benzyl(meth)acrylate and (meth)acrylic acid and other monomer. These binder polymers having polar groups may be used independently or in a form of composition comprising a general film-forming polymer. The content of the polymer generally falls in the range from 20 to 70% by weight, preferably from 25 to 65% by weight, and more preferably from 25 to 45% by weight with respect to the total weight of the solid components contained in the polymer composition.

(2) Monomer or Oligomer

The monomer or oligomer used for the photosensitive polymer layer is preferably selected from compounds, having two or more ethylenic unsaturated double bonds, capable of causing addition polymerization upon being irradiated by light. As such monomer and oligomer, compounds having at least one ethylenic unsaturated group capable of addition polymerization, and having a boiling point of 100° C. or above under normal pressure can be exemplified. The examples include monofunctional acrylates and monofunctional methacrylates such as polyethylene glycol mono(meth)acrylate, polypropylene glycol mono(meth)acrylate and phenoxyethyl(meth)acrylate; multi-functional acrylate and multi-functional methacrylate, obtained by adding ethylene oxide or propylene oxide to multi-functional alcohols such as trimethylol propane and glycerin, and then converting them into (meth)acrylates, such as polyethylene glycol di(meth)acrylate, polypropylene glycol di(meth)acrylate, trimethylolethane triacrylate, trimethylolpropane tri(meth)acrylate, trimethylolpropane diacrylate, neopentyl glycol di(meth)acrylate, pentaerythritol tetra(meth)acrylate, pentaerythritol tri(meth)acrylate, dipentaerythritol hexa(meth)acrylate, dipentaerythritol penta(meth)acrylate, hexanediol di(meth)acrylate, trimethylolpropane tri(acryloyloxypropyl)ether, tri(acryloyloxyethyl)isocyanurate, tri(acryloyloxyethyl)cyanurate, glycerin tri(meth)acrylate.

Additional examples of multi-functional acrylates and methacrylates include urethane acrylates such as those described in Examined Japanese Patent Publication "Tokko-sho" Nos. 48-41708, 50-6034 and Japanese Laid-Open Patent Publication "Tokkaisho" No. 51-37193; polyester acrylates such as those described in Japanese Laid-Open Patent Publication "Tokkaisho" No. 48-64183, Examined Japanese Patent Publication "Tokkosho" Nos. 49-43191 and 52-30490; and epoxyacrylates which are reaction products of epoxy polymer and (meth)acrylic acid. Of these, trimethylolpropane tri(meth)acrylate, pentaerythritol tetra(meth)acrylate, dipentaerythritol hexa(meth)acrylate, dipentaerythritol penta(meth)acrylate are preferable.

Besides these, also "polymerizable compound B" described in the Japanese Laid-Open Patent Publication "Tokkaihei" No. 11-133600 are exemplified as the preferable examples.

These monomers or oligomers can be used independently or in combination of two or more species thereof. The content of the monomer or oligomer generally falls in the range from 5 to 50% by weight, and more preferably from 10 to 40% by weight, of the total weight of the solid components contained in the polymer composition.

(3) Photopolymerization Initiator or Photopolymerization Initiator System

The photopolymerization initiator or photopolymerization initiator system used for the photosensitive polymer layer can be exemplified by vicinal polyketaldonyl compounds disclosed in U.S. Pat. No. 2,367,660, acyloin ether compounds described in U.S. Pat. No. 2,448,828, aromatic acyloin compounds substituted by α-hydrocarbon described in U.S. Pat. No. 2,722,512, polynuclear quinone compounds described in U.S. Pat. Nos. 3,046,127 and 2951758, combination of triaryl imidazole dimer and p-aminoketone described in U.S. Pat. No. 3,549,367, benzothiazole compounds and trihalomethyl-s-triazine compounds described in Examined Japanese Patent Publication "Tokkosho" No. 51-48516, trihalomethyl-triazine compounds described in U.S. Pat. No. 4,239,850, and trihalomethyl oxadiazole compounds described in U.S. Pat. No. 4,212,976. Trihalomethyl-s-triazine, trihalomethyl oxadiazole and triaryl imidazole dimer are particularly preferable.

Besides these, "polymerization initiator C" described in Japanese Laid-Open Patent Publication "Tokkaihei" No. 11-133600 can also be exemplified as a preferable example.

Such photopolymerization initiator or photopolymerization initiator system may be used independently or in a form of mixture of two or more species, wherein it is particularly preferable to use two or more species. Use of at least two species of photopolymerization initiator makes it possible to improve the display characteristics, and in particular to reduce non-uniformity in the display.

The content of the photopolymerization initiator or the photopolymerization initiator system generally falls in the range from 0.5 to 20% by weight, and more preferably from 1 to 15% by weight, of the total weight of the solid components contained in the polymer composition.

The photosensitive polymer layer preferably contains an appropriate surfactant, from the viewpoint of effectively preventing non-uniformity. Any surfactants are applicable so far as they are miscible with the photosensitive polymer composition. Surfactants preferably applicable to the present invention include those disclosed in paragraphs [0090] to [0091] in Japanese Laid-Open Patent Publication "Tokkai" No. 2003-337424, paragraphs [0092] to [0093] in Japanese Laid-Open Patent Publication "Tokkai" No. 2003-177522, paragraphs [0094] to [0095] in Japanese Laid-Open Patent Publication "Tokkai" No. 2003-177523, paragraphs [0096] to [0097] in Japanese Laid-Open Patent Publication "Tokkai" No. 2003-177521, paragraphs [0098] to [0099] in Japanese Laid-Open Patent Publication "Tokkai" No. 2003-177519, paragraphs [0100] to [0101] in Japanese Laid-Open Patent Publication "Tokkai" No. 2003-177520, paragraphs [0102] to [0103] in Japanese Laid-Open Patent Publication "Tokkaihei" No. 11-133600 and those disclosed as the invention in Japanese Laid-Open Patent Publication "Tokkaihei" No. 6-16684. In order to obtain higher effects, it is preferable to use any of fluorine-containing surfactants and/or silicon-base surfactants (fluorine-containing surfactant, or, silicon-base surfactant, and surfactant containing both of fluorine atom and silicon atom), or two or more surfactants selected therefrom, wherein the fluorine-containing surfactant is most preferable. When the fluorine-containing surfactant is used, the number of fluorine atoms contained in the fluorine-containing substituents in one surfactant molecule is preferably 1 to 38, more preferably 5 to 25, and most preferably 7 to 20. Too large number of fluorine atoms degrades the solubility in general fluorine-free solvents and thus is undesirable. Too small number of fluorine atoms does not provide effects of improving the non-uniformity and thus is undesirable.

Particularly preferable surfactants can be those containing a copolymer which includes the monomers represented by the formulae (a) and (b) below, having a ratio of mass of formula (a)/formula (b) of 20/80 to 60/40:

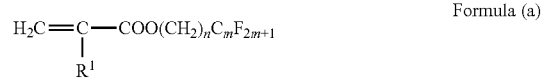

Formula (a)

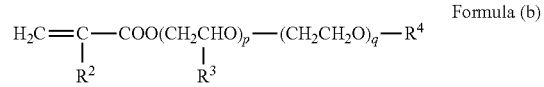

Formula (b)

In the formulas, $R^1$, $R^2$ and $R^3$ independently represent a hydrogen atom or a methyl group, $R^4$ represents a hydrogen atom or an alkyl group having the number of carbon atoms of 1 to 5. n represents an integer from 1 to 18, and m represents an integer from 2 to 14. p and q represents integers from 0 to 18, excluding the case where both of p and q are 0.

It is to be defined now that a monomer represented by the formula (a) and a monomer represented by the formula (b) of the particularly preferable surfactants are denoted as monomer (a) and monomer (b), respectively. $C_mF_{2m+1}$ in the formula (a) may be straight-chained or branched. m represents an integer from 2 to 14, and is preferably an integer from 4 to 12. Content of $C_mF_{2m+1}$ is preferably 20 to 70% by weight, and more preferably 40 to 60% by weight, of the monomer (a). $R^1$ represents a hydrogen atom or a methyl group. n represents 1 to 18, and more preferably 2 to 10. $R^2$ and $R^3$ in the formula (b) independently represent a hydrogen atom or a methyl group, and $R^4$ represents a hydrogen atom or an alkyl group having the number of carbon atoms of 1 to 5. p and q respectively represent integers of 0 to 18, excluding the case where both of p and q are 0. p and q are preferably 2 to 8.

The monomer (a) contained in one particularly preferable surfactant molecule may be those having the same structure, or having structures differing within the above-defined range. The same can also be applied to the monomer (b).

The weight-average molecular weight Mw of a particularly preferable surfactant preferably falls in the range from 1000 to 40000, and more preferably from 5000 to 20000. The surfactant characteristically contains a copolymer composed of the monomers expressed by the formula (a) and the formula (b), and having a ratio of mass of monomer (a)/monomer (b) of 20/80 to 60/40. Hundred parts by weight of a particularly preferable surfactant is preferably composed of 20 to 60 parts by weight of the monomer (a), 80 to 40 parts by weight of the monomer (b), and residual parts by weight of other arbitrary monomers, and more preferably 25 to 60 parts by weight of the monomer (a), 60 to 40 parts by weight of the monomer (b), and residual parts by weight of other arbitrary monomer.

Copolymerizable monomers other than the monomers (a) and (b) include styrene and derivatives or substituted compounds thereof including styrene, vinyltoluene, α-methylstyrene, 2-methylstyrene, chlorostyrene, vinylbenzoic acid, sodium vinylbenzene sulfonate, and aminostyrene; dienes such as butadiene and isoprene; and vinyl-base monomers such as acrylonitrile, vinylethers, methacrylic acid, acrylic acid, itaconic acid, crotonic acid, maleic acid, partially esterified maleic acid, styrene sulfonic acid, maleic anhydride, cinnamic acid, vinyl chloride and vinyl acetate.

A particularly preferable surfactant is a copolymer of the monomer (a), monomer (b) and so forth, allowing monomer sequence of random or ordered, such as forming a block or graft, while being not specifically limited. A particularly preferable surfactant can use two or more monomers differing in the molecular structure and/or monomer composition in a mixed manner.

Content of the surfactant is preferably adjusted to 0.01 to 10% by weight to the total amount of solid components of the photosensitive polymer layer, and more preferably to 0.1 to 7% by weight. The surfactant contains predetermined amounts of a surfactant of a specific structure, ethylene oxide group and polypropylene oxide group. Therefore, addition of the surfactant at an amount within a specific range to the photosensitive polymer layer enables non-uniformity to reduce in the display on the liquid crystal display device provided with the photosensitive polymer layer. When the content is less than 0.01% by weight to the total amount of solid components, the non-uniformity in the display is not reduced, and when the content exceeds 10% by weight, the effect of reducing the non-uniformity in the display is saturated. Production of the color filter while adding the particularly preferable surfactant described in the above to the photosensitive polymer layer is preferable in terms of improving the non-uniformity in the display.

The commercial surfactants listed below may also be used directly. As applicable commercial surfactants, examples include fluorine-containing surfactants such as Eftop EF301, EF303 (products of Shin-Akita Kasei K. K.), Florade FC430, 431 (products of Sumitomo 3M Co., Ltd.), Megafac F171, F173, F176, F189, R08 (products of Dainippon Ink and Chemicals, Inc.), Surflon S-382, SC101, 102, 103, 104, 105, 106 (products of Asahi Glass Co., Ltd.), and silicon-base surfactants. Also polysiloxane polymer KP-341 (product of Shin-Etsu Chemical Co., Ltd.) and Troysol S-366 (product of Troy Chemical Industries, Inc.) may be used as the silicon-base surfactants. The compounds disclosed in paragraphs [0046] to [0052] in Japanese Laid-Open Patent Publication "Tokkai" No. 2004-331812, which are fluorine-containing surfactants not containing the monomer represented by the general formula (a).

[Method of Producing Birefringence Pattern Builder]

The method of producing the birefringence pattern builder is not particularly limited. For example, the birefringence pattern builder may be produced by:

directly forming an optically anisotropic layer on a support; transferring an optically anisotropic layer on a support by using another birefringence pattern builder used as a transfer material; forming a self-supporting optically anisotropic layer; forming another functional layer on a self-supporting optically anisotropic layer; or attaching a support to a self-supporting optically anisotropic layer; or the like. Among these, in view of avoiding limitation to the property of the optically anisotropic layer, direct formation of an optically anisotropic layer on a support and transfer of an optically anisotropic layer on a support by using transfer material are preferred. Further, in view of avoiding limitation to the support, transfer of an optically anisotropic layer on a support by using transfer material is more preferred. When the patterned birefringent product is a substrate for liquid crystal display device, the production by using transfer material can reduce the production step particularly for the photosensitive polymer layer for forming steps.

As the method for producing the birefringence pattern builder having two or more optically anisotropic layers, the birefringence pattern builder may be produced by, for example, directly forming an optically anisotropic layer on another birefringence pattern builder; transferring an optically anisotropic layer on a birefringence pattern builder by using another birefringence pattern builder used as a transfer material. Among these, transfer of an optically anisotropic layer on a birefringence pattern builder by using another birefringence pattern builder used as a transfer material is more preferable.

A birefringence pattern builder used as a transfer material will be explained in the followings. A birefringence pattern builder used as a transfer material may be referred to as "transfer material for producing birefringence pattern" in the specification especially in the after-mentioned Examples.

[Temporary Support]

The birefringence pattern builder used as a transfer material is preferred to include a temporary support. The temporary support is not particularly limited and may be transparent or opaque. Polymer films may be used as a temporary support. Examples of the polymer, which can constitute a temporary support include cellulose ester (for example, cellulose acetate, cellulose propionate, and cellulose butyrate), polyolefin (for example, norbornene based polymer), poly(meth)acrylate (for example, polymethylmethacrylate), polycarbonate, polyester, and polysulfone. For the purpose of property examination in a manufacturing process, the support is preferably selected from transparent and low-birefringence polymer films. Examples of the low-birefringence polymer films include cellulose ester films and norbornene based polymer films. Commercially available polymers such as a norbornene based polymer, "ARTON" provided by JSR and "ZEONEX" and "ZEONOR" provided by ZEON CORPORATION may be used. Polycarbonate, poly(ethylene terephthalate), or the like which is inexpensive, may also be preferably used.

[Adhesive Layer for Transfer]

The transfer material is preferred to have an adhesive layer for transfer. The adhesive layer for transfer is not particularly limited as far as the layer is transparent and non-colored, and has sufficient property for transfer. Examples include adhesive layer using an adhesive agent, a pressure-sensitive polymer layer, a heat-sensitive polymer layer, and the above-mentioned photo-sensitive polymer layer. Among these, the heat-sensitive polymer layer and the photo-sensitive polymer layer are preferred in view of heat-resistance required in the application to a substrate for liquid crystal display device.

The adhesive agent is preferred to exhibit, for example, good optical transparency, suitable wettability, and adhesive characteristics such as cohesiveness and adhesiveness. Specific examples are adhesive agents prepared using a suitable base polymer such as an acrylic polymer, silicone polymer, polyester, polyurethane, polyether, or synthetic rubber. The adhesive characteristics of the adhesive layer can be suitably controlled by conventionally known methods. These include adjusting the composition and/or molecular weight of the base polymer forming the adhesive layer, and adjusting the degree of crosslinking and/or the molecular weight thereof by means of the crosslinking method, the ratio of incorporation of crosslinking functional groups, and the crosslinking agent blending ratio.

The pressure sensitive polymer layer is not specifically limited as far as it develops adhesiveness when pressure is applied. Various adhesives, such as rubbers, acrylics, vinyl ethers, and silicones, can be employed in the pressure-sensitive adhesive. The adhesives may be employed in the manufacturing and coating stages in the form of solvent adhesives, non-water-based emulsion adhesives, water-based emulsion adhesives, water-soluble adhesives, hot melt adhesives, liquid hardening adhesives, delayed tack adhesives, and the like. Rubber adhesives are described in the New Polymer Library 13, "Adhesion Techniques," Kobunshi Kankokai (K. K.), p. 41 (1987). There are vinyl ether adhesives comprised mainly of alkyl vinyl ether compounds having 2 to 4 carbon atoms in the form of vinyl chloride/vinyl acetate copolymers, vinyl acetate polymers, polyvinyl butyrals, and the like, to which a plasticizer is admixed. Silicone adhesives may be employed in which rubber siloxane is used to impart film condensation strength during film formation and resinous siloxane is used to impart adhesiveness.

The heat-sensitive polymer layer is not specifically limited as far as it develops adhesiveness when heat is applied. Examples of heat-sensitive adhesives are hot-melt compounds and thermoplastic resins. Examples of the hot-melt compounds are low molecular weight compounds in the form of thermosetting resins such as polystyrene resin, acrylic resin, styrene-acrylic resin, polyester resin, and polyurethane resin; and various waxes in the form of vegetable waxes such as carnauba wax, Japan wax, candelilla wax, rice wax, and auricury wax; animal waxes such as beeswax, insect waxes, shellac, and whale wax; petroleum waxes such as paraffin wax, microcrystalline wax, polyethylene wax, Fischer-Tropshe wax, ester wax, and oxide waxes; and mineral waxes such as montan wax, ozokerite, and ceresin wax. Further examples are rosin, hydrated rosin, polymerized rosin, rosin-modified glycerin, rosin-modified maleic acid resin, rosin-modified polyester resin, rosin-modified phenol resin, ester rubber, and other rosin derivatives; as well as phenol resin, terpene resin, ketone resin, cyclopentadiene resin, aromatic hydrocarbon resin, aliphatic hydrocarbon resin, and alicyclic hydrocarbon resin.

These hot-melt compounds normally have a molecular weight of not greater than 10,000, preferably not greater than 5,000, and a melting or softening point desirably falling within a range of 50 to 150° C. These hot-melt compounds may be used singly or in combinations of two or more. Examples of the above-mentioned plasticizing resin are ethylene copolymers, polyamide resins, polyester resins, polyurethane resins, polyolefin resins, acrylic resins, and cellulose resins. Among these, the ethylene copolymers are preferably used.

[Dynamic Property Control Layer]

Between the support and the optically anisotropic layer of the transfer material, a dynamic property control layer to control mechanical characteristics and conformity to irregularity may be preferably provided. The dynamic property control layer preferably exhibit flexible elasticity, is softened by heat, or fluidize by heat. A thermoplastic polymer layer is particularly preferred for the dynamic property control layer. Components used for the thermoplastic polymer layer are preferably organic polymer substances described in Japanese Laid-Open Patent Publication "Tokkaihei" No. 5-72724, and are particularly preferably selected from organic polymer substances having softening points, measured by the Vicat method (more specifically, a method of measuring softening point of polymer conforming to ASTMD1235 authorized by American Society For Testing and Materials) of approximately 80° C. or below. More specifically, organic polymers such as polyolefins including polyethylene and polypropylene; ethylene copolymers including those composed of ethylene and vinyl acetate or saponified product thereof, or composed of ethylene and acrylate ester or saponified product thereof; polyvinyl chloride; vinyl chloride copolymers including those composed of vinyl chloride and vinyl acetate or saponified product thereof; polyvinylidene chloride; vinylidene chloride copolymer; polystyrene; styrene copolymers including those composed of styrene and (meth)acrylate ester or saponified product thereof; polyvinyl toluene; vinyltoluene copolymers such as being composed of vinyl toluene and (meth)acrylate ester or saponified product thereof; poly(meth)acrylate ester; (meth)acrylate ester copolymers including those composed of butyl(meth)acrylate and vinyl acetate; vinyl acetate copolymers; and polyamide polymers including nylon, copolymerized nylon, N-alkoxymethylated nylon and N-dimethylamino-substituted nylon.

[Delamination Layer]

The birefringence pattern builder used as a transfer material may include a delamination layer on the temporary support. The delamination layer controls the adhesion between the temporary support and the delamination layer or between the delamination layer and the layer laminated immediately above, and takes a role of helping the separation of the temporary support after the transfer of the optically anisotropic layer. The above-mentioned other functional layers such as alignment layer and the dynamic property control layer may function as the delamination layer.

[Intermediate Layer]

The transfer material preferably has an intermediate layer for the purpose of preventing mixing of the components during coating of a plurality of layers and during storage after the coating. As the intermediate layer, the oxygen shut-off film having an oxygen shut-off function described as a "separation layer" in Japanese Laid-Open Patent Publication "Tokkaihei" No. 5-72724 is preferably used, by which sensitivity during the light exposure increases, and this improves the productivity. Any films showing a low oxygen permeability and being dispersible and soluble to water or aqueous alkaline solution are preferably used as the oxygen shut-off film, and such films can properly be selected from any known films. Of these, particularly preferable is a combination of polyvinyl alcohol and polyvinyl pyrrolidone.

One layer may work simultaneously as the above thermoplastic polymer layer, oxygen shut-off layer, and alignment layer.

[Surface Protecting Layer]

A thin surface protecting layer is preferably provided on the polymer layer for protecting the above layers against contamination or damage upon storage. The property of the surface protecting layer is not particularly limited and the surface protecting layer may be formed of the same or a similar material to that of the temporary layer. The surface protecting layer should be readily separated from the layer adjacent thereto (for example an adhesive layer for transfer). As the material for the surface protecting layer, silicon paper, polyolefin, or polytetrafluoroethylene sheet is suitable.

The individual layers of the optically anisotropic layer, photosensitive polymer layer, adhesive layer for transfer, and optionally-formed alignment layer, thermoplastic polymer layer, dynamic property control layer, and intermediate layer can be formed by coating such as dip coating, air knife coating, curtain coating, roller coating, wire bar coating, gravure coating and extrusion coating (U.S. Pat. No. 2,681,294). Two or more layers may be coated simultaneously. Methods of simultaneous coating is described in U.S. Pat. Nos. 2,761,791, 2,941,898, 3,508,947, 3,526,528, and in "Kotingu Kogaku (Coating Engineering), written by Yuji Harazaki, p. 253, published by Asakura Shoten (1973).

When the layer immediately above the optically anisotropic layer (for example, the adhesive layer for transfer) is applied to the optically anisotropic layer, the coating solution may be added with a plasticizer or a photopolymerization initiator. These additives penetrate into the optically anisotropic layer and may achieve the modification of the layer at the same time.

[Method of Transferring Transfer Material to Target Transfer Material]

Methods of transferring the transfer material on a target transfer material are not specifically limited, so far as the optically anisotropic layer can be transferred onto the target transfer material. For example, the transfer material in a film form may be attached to the substrate so that the surface of the adhesive layer for transfer is faced to the surface of the target transfer material, by pressing with or without heating with rollers or flat plates of a laminator. Specific examples of the laminator and the method of lamination include those described in Japanese Laid-Open Patent Publication Nos. 7-110575, 11-77942, 2000-334836 and 2002-148794, wherein the method described in Japanese Laid-Open Patent Publication No. 7-110575 is preferable in terms of low contamination.

Examples of the target transfer material include a support, a laminated structure including a support and another functional layer, and a birefringence pattern builder.

[Steps Included in Transfer]

The temporary support may be separated or not be separated after the transfer of a birefringence pattern builder on the target transfer material. When the temporary support is not separated, the temporary support preferably has transparency suited for the patterned light exposure afterwards and heat-resistance sufficient for surviving the baking step. A step for removing unwanted layers which has been transferred with the optically anisotropic layer may be included in the process. For example, when polyvinyl alcohol/polyvinylpyrrolidone copolymer is used as the alignment layer, the alignment layer and the layers above can be removed by development with an aqueous weak alkaline developing solution. Methods of the development may be any of known methods such as paddle development, shower development, shower-and-spin development and dipping development. The temperature of the developing solution is preferably 20° C. to 40° C., and pH of the developing solution is preferably 8 to 13.

Other layer such as electrode layers may be formed on the surface remained after the separation of the temporary layer or the removal of the unwanted layers. Another transfer material may be transferred on the surface remained after the separation of the temporary layer or the removal of the unwanted layers. The transfer material may be the same or different from the previously transferred transfer material.

Further the slow axis of the optically anisotropic layer in the first transferred transfer material may be in the same or different direction from that of the slow axis of the optically anisotropic layer in the second transferred transfer material. As described above, transferring plural optically anisotropic layers is useful for production of a birefringence pattern having large retardation with plural optically anisotropic layers stacked so as that the directions of the slow axes are the same, and a specific birefringence pattern with plural optically anisotropic layers stacked so as that the directions of the slow axes are different to each other.

[Production of Patterned Birefringent Product]

A patterned birefringent product can be produced by subjecting the birefringence pattern builder to at least patterned light exposure and heating (baking).

[Patterned Light Exposure]

Patterned light exposure for producing birefringence pattern is conducted in a manner that the region in which birefringence is desired to be maintained is applied with light. The retardation disappearance temperature rises in the light-exposed region of the optically anisotropic layer. The method of patterned light exposure may be a contact light exposure using mask, proximity light exposure, projected light exposure, or direct drawing by focusing on the predetermined point by using laser or electron beam without mask. The irradiation wavelength of the light source for the light exposure is preferably in the range of 250 to 450 nm at peak, and more preferably in the range of 300 to 410 nm at peak. When a step is simultaneously formed with the photosensitive polymer layer, a light of the wavelength which can harden the polymer layer (for example, 365 nm, 405 nm) is preferably irradiated. Specific examples of the light source include extra-high voltage mercury lamp, high voltage mercury lamp, metal halide lamp, and blue laser. Energy of exposure generally falls in the range preferably from about 3 mJ/cm$^2$ to 2000 mJ/cm$^2$, more preferably from about 5 mJ/cm$^2$ to 1000 mJ/cm$^2$, further preferably from about 10 mJ/cm$^2$ to 500 mJ/cm$^2$, most preferably from about 10 mJ/cm$^2$ to 100 mJ/cm$^2$.

Another birefringence pattern builder may be transferred on the laminated structure obtained by conducting patterned light exposure to a birefringence pattern builder, and then another patterned light exposure may be conducted. The retardation values retained after baking can be effectively differentiated between the region which is non-light-exposed domain both in the first and the second exposure (generally having the lowest retardation), the region which is light-exposed domain in the first exposure and non-light-exposed domain in the second exposure, and the region which is light-exposed domain both in the first and the second exposure (generally having the highest retardation). The region which is non-light-exposed domain in the first exposure and light-exposed domain in the second exposure can be considered to be the same as the region which is light-exposed domain both in the first and the second exposure. In a similar manner, four or more regions can be readily formed by conducting transfer and patterned light exposure alternately three, four or more times.

[Heating (Baking)]

Birefringence pattern can be produced by applying heat to the birefringence pattern builder after patterned light exposure at 50 to 400° C., preferably 80 to 400° C. When the retardation disappearance temperature of the optically anisotropic layer in the birefringence pattern builder used for forming birefringence pattern before the light exposure is referred to as T1 (° C.), and the retardation disappearance temperature after the light exposure as T1 (° C.), (provided that when the retardation disappearance temperature is not in the range of the temperature of 250° C. or lower, T2=250), the temperature of baking is preferably T1° C. or higher and T2° C. or lower, more preferably (T1+10)° C. or higher and (T2−5)° C. or lower, most preferably (T1+20)° C. or higher and (T2−10)° C. or lower.

By baking, the retardation in the non-light exposed domain in the birefringence pattern builder lowers, whereas the retardation in the light exposed domain, in which retardation disappearance temperature has risen by the previous patterned light exposure, lowers only slightly, absolutely does not lower, or rises. As a result, the retardation in the non-light exposed domain is smaller than that in the light exposed domain, enabling production of birefringence pattern (a patterned optically anisotropic layer).

In order to exert the optical effect, the retardation in the light exposed domain after baking is preferably 5 nm or higher, more preferably 10 nm to 5000 nm, most preferably 20 nm to 2000 nm. Under 5 nm, the visual identification of the birefringence pattern produced becomes difficult (see Table 1).

Again in order to exert the optical effect, the retardation in the non-light exposed domain in the birefringence pattern builder after baking becomes preferably 80% or lower, more preferably 60% or lower, further preferably 20% or lower, compared to that before baking, and most preferably becomes lower than 5 nm. When the retardation becomes lower than 5 nm after baking, the domain can be seen as a domain having no retardation. That is, black when viewed in a crossed Nicol state, and no color when viewed in a parallel Nicol state or on a polarizing plate+reflective plate, can be displayed. As above, a birefringence pattern builder wherein the retardation in the non-light exposed domain becomes lower than 5 nm is useful when a color image is displayed by using birefringence pattern, or when plural different patterns are laminated and used.

As a reference, rough indication of residual rate of retardation in the non-light exposed domain compared to that before baking, easiness of visual differentiation between non-light exposed and light exposed domains, and the visible color in the non-light exposed domain, when an optically anisotropic layer after baking (the retardation of which is 100 nm before baking) is viewed in a crossed Nicol state, is shown in Table 2.

TABLE 2

| Re in the non-light exposed domain after baking (nm) | Residual rate of Re in the non-light exposed domain compared to before baking | Easiness of the visual differentiation between non-light exposed and light exposed domains | The visible color in the non-light exposed domain |
|---|---|---|---|
| 100 | 100% | X | white |
| 80 | 80% | Δ | gray |
| 60 | 60% | ○ | gray |
| 40 | 40% | ○ | dark gray |
| 20 | 20% | ○ | very dark gray |
| 10 | 10% | ○ | grayish black |
| 5 | 5% | ○ | grayish black |
| 3 | 3% | ○ | black |

○: easily visible
Δ: visible with difficulty
X: not visible

Alternatively, another birefringence pattern builder may be transferred on the birefringence pattern builder which is baked, and a patterned light exposure and baking may be conducted again thereon. Retardations which remain after the second exposure can be effectively varied between the region which is non-light-exposed domain both in the first and the second exposure, the region which is light-exposed domain in the first exposure and non-light-exposed domain in the second exposure, the region which is non-light-exposed domain in the first exposure and light-exposed domain in the second exposure (retardation in the non-light-exposed domain in the first exposure is already disappeared by the baking), and the region which is light-exposed domain both in the first and the second exposure. This method is useful when two domains having birefringence of different slow-axis directions to each other are needed to be formed without overlap to each other.

[Functional Layer Laminated on Birefringence Pattern]

Birefringence pattern builder can be subjected to a light exposure and baking to obtain birefringence pattern as above, which can be then laminated with functional layers with various functions to obtain a patterned birefringent product. Examples of the functional layer include, but not limited to, hard coating layer for preventing damage on the surface, and reflective layer which renders the birefringence pattern easily visible. For an easy identification of the pattern, reflective layer is particularly preferred to be provided under the birefringence pattern.

[Patterned Birefringent Product]

The product obtained by conducting light exposure and baking as above to the birefringence pattern builder is normally colorless and transparent, but when it is sandwiched by two polarizing plates, or one polarizing plate and one reflective layer, the product exhibits characteristic contrast or color, and becomes easily identifiable visually. Using this property, the patterned birefringent product obtained by the above process can be used as, for example, a mean of preventing forgery. That is, the patterned birefringent product obtained by the process of the present invention, especially the patterned birefringent product having reflective layer is normally almost invisible, whereas, through a polarizing plate, the patterned birefringent product can exhibit multi-colored image which can be easily identified. A copy of the birefringence pattern without polarizing plate exhibits no image, whereas a copy through polarizing plate exhibits a permanent pattern which is visible without a polarizing plate. Therefore, the reproduction of the birefringence pattern is difficult. Such kind of process of producing birefringence pattern is not widely spread, and needs unusual kind of material. Therefore, the process can be considered to be suited for a mean of preventing forgery.

[Optical Element]

The patterned birefringent product obtained by the above process can be also used as an optical element. For example, when the patterned birefringent product obtained by the above process is used as a structural optical element, a particular optical element which exhibit effect only against a specific polarized light can be produced. For example, a diffraction grating produced with the birefringence pattern of the present invention functions as a polarization separation device which strongly diffracts a specific polarized light, and can be used as a projector or an optical communication device.

[Substrate for Liquid Crystal Display Device]

The patterned birefringent product may be a substrate for liquid crystal display device It is preferable that the region having retardation Re1 (light-exposed domain) in the optically anisotropic layer exhibit optical biaxiality which can exactly compensate a liquid crystal cell, in particular a VA-mode liquid crystal cell. When a rod-like liquid-crystalline compound having reactive group is used to form a film exhibiting optical biaxiality, it is necessary to align rod-like molecules in a twisted cholesteric orientation, or in a twisted hybrid cholesteric orientation in which the tilt angles of the molecules are varied gradually in the thickness-direction, and then to distort the twisted cholesteric orientation or the twisted hybrid cholesteric orientation by irradiation of polarized light. Examples of the method for distorting the orientation by the polarized light irradiation include a method of using a dichroic liquid-crystalline polymerization initiator (EP1389199A1), and a method of using a rod-like liquid-crystalline compound having in the molecule thereof a photo-alignable functional group such as cinnamoyl group (Japanese Laid-Open Patent Publication "Tokkai" No. 2002-6138). The present invention can adopt any of these methods.

It is preferable that the above-explained optically anisotropic layer is a positive a-plate which can exactly compensate a liquid crystal cell of a VA-mode or semi-transmissive type. On the other hand, the above-explained optically anisotropic layer as a positive c-plate can exactly compensate IPS mode, and is preferable. In either device of VA-mode or IPS-mode, one of the protective films of the polarizing plate is preferred to be an optical compensation sheet. The optically anisotropic layer as a protective film of the polarizing plate is preferably c-plate in VA-mode, and, in IPS-mode, is preferably an optically biaxial film, in which the minimum refractive index is found in a thickness direction. A uniaxial optically anisotropic layer in the transfer material used in the present invention can be formed by aligning the director of the molecule of a uniaxial rod-like liquid-crystalline compound. Such uniaxial alignment can be achieved by a method of aligning a non-chiral liquid crystal on a rubbed alignment layer or on a photo-alignment layer, by a method of aligning liquid crystal with the aid of magnetic field or electric field, or by a method of aligning liquid crystal with applying external force such as stretching or shearing.

In the present invention, a pattern having different retardation of Re1 and Re2 (Re1>Re2) can be obtained by forming an optically uniaxial alignment on a substrate, or forming the alignment on a temporary support and transferring the layer on a substrate to form a uniform optically anisotropic layer, conducting a patterned-light exposure directly or through a photomask, and baking the substrate. The light-exposed domain preferably shows Re1. Re2 is preferably 80% or lower, more preferably 50% or lower compared to Re1.

Further, when a step is formed, development with liquid may be conducted before the above heating step. Although the developing solution used in the developing step after the light exposure is not particularly limited, an alkaline developing solution is preferred from the viewpoint of environment and explosion protection, and a known developing solution such as those described in Japanese Laid-Open Patent Publication "Tokkai" No. (Hei) 5-72724 can be used. The developing solution is preferably selected so as that the polymer layer dissolves in the solution in the developing step. For example, a solution which contains a compound having pKa of 7 to 13 at a concentration of 0.05 to 5 mol/L is preferable. The above developing solution may be further added with known surfactant. The concentration of the surfactant is preferably 0.01 to 10 weight % compared to the weight of the total solution.

Methods of the development may be any of known methods such as paddle development, shower development, shower-and-spin development and dipping development. Non-cured portion of the polymer layer after the light exposure can be removed by showering a developing solution. The thermoplastic polymer layer, the intermediate layer and the like are preferably removed before the development, typically by spraying an alkaline solution having only a small dissolving power against the polymer layer by using a shower. It is also preferable to remove the development residue after the development, by spraying a shower of cleaning agent, and typically by brushing at the same time. The developing solution may be any known ones, and preferable examples include "T-SD1" (trade name; product of Fuji Photo Film Co., Ltd.) containing phosphate, silicate, nonionic surfactant, defoaming agent and stabilizing agent; or "T-SD2" (trade name; product of Fuji Photo Film Co., Ltd.) containing sodium carbonate and phenoxyoxyethylene-base surfactant. The temperature of the developing solution is preferably 20° C. to 40° C., and pH of the developing solution is preferably 8 to 13.

EXAMPLES

Paragraphs below will more specifically describe the present invention referring to Examples. Any materials, reagents, amount and ratio of use and operations shown in Examples may appropriately be modified without departing from the spirit of the present invention. It is therefore understood that the present invention is by no means limited to specific Examples below.

(Preparation of Coating Liquid CU-1 for Dynamic Property Control Layer (Thermoplastic Polymer Layer))

The composition below was prepared, filtered through a polypropylene filter having a pore size of 30 μm, and the filtrate was used as coating liquid CU-1 for forming a dynamic property control layer.

| Composition of Coating Liquid for forming Thermoplastic Polymer Layer | (% by weight) |
|---|---|
| methyl methacrylate/2-ethylhexyl acrylate/benzyl methacrylate/methacrylate copolymer (copolymerization ratio (molar ratio) = 55/30/10/5, weight-average molecular weight = 100,000, Tg≈70° C.) | 5.89 |
| styrene/acrylic acid copolymer (copolymerization ratio (molar ratio) = 65/35, weight-average molecular weight = 10,000, Tg≈100° C.) | 13.74 |
| BPE-500 (from Shin-Nakamura Chemical Co., Ltd.) | 9.20 |
| Megafac F-780-F (from Dainippon Ink and Chemicals, Inc.) | 0.55 |
| methanol | 11.22 |
| propylene glycol monomethyl ether acetate | 6.43 |
| methyl ethyl ketone | 52.97 |

(Preparation of Coating Liquid AL-1 for Alignment Layer)

The composition below was prepared, filtered through a polypropylene filter having a pore size of 30 μm, and the filtrate was used as coating liquid AL-1 for forming an intermediate layer/alignment layer.

| Composition of Coating Liquid AL-1 for Intermediate Layer/Alignment layer | (% by weight) |
|---|---|
| polyvinyl alcohol (PVA205, from Kuraray Co., Ltd.) | 3.21 |
| polyvinylpyrrolidone (Luvitec K30, from BASF) | 1.48 |
| distilled water | 52.1 |
| methanol | 43.21 |

(Preparation of Coating Liquid LC-1 for Optically Anisotropic Layer)

The composition below was prepared, filtered through a polypropylene filter having a pore size of 0.2 μm, and the filtrates were used as coating liquid LC-1 for forming an optically anisotropic layer.

LC-1-1 was synthesized according to the method described in Japanese Patent Unexamined Publication No. 2004-123882. LC-1-1 is a liquid crystalline compound having two reactive groups, one of which is acrylic group, a radically reactive group, and the other of which is oxetanyl group, a cationically reactive group.

LC-1-2 was synthesized according to the method described in Tetrahedron Lett., Vol. 43, p. 6793 (2002).

| Composition of Coating Liquid for Optically Anisotropic Layer | (% by weight) |
|---|---|
| rod-like liquid crystal (LC-1-1) | 19.57 |
| horizontal orientation agent (LC-1-2) | 0.01 |
| cationic photopolymerization initiator (Cyracure UVI6974 from Dow Chemical Company) | 0.40 |
| polymerization control agent (IRGANOX1076, Chiba Speciality Chemicals Co., Ltd.) | 0.02 |
| methyl ethyl ketone | 80.0 |

(LC-1-1)

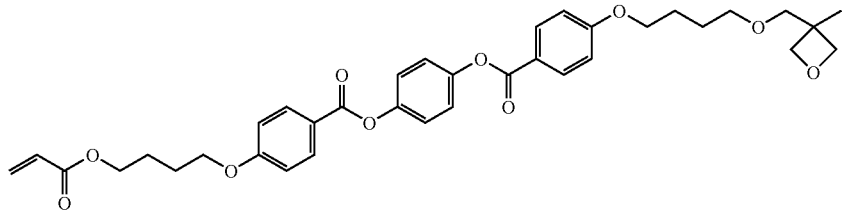

(LC-1-2)

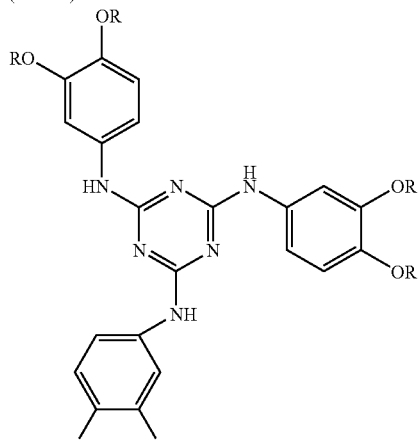

R = CH$_2$CH$_2$OCH$_2$CH$_2$C$_6$F$_{13}$ (Preparation of Coating Liquid LC-2 for Optically Anisotropic Layer)

The composition below was prepared, filtered through a polypropylene filter having a pore size of 0.2 μm, and the filtrates were used as coating liquid LC-2 for forming an optically anisotropic layer.

LC-1-1 and LC-2-1 are liquid crystalline compounds each having two reactive groups, one of which is acrylic group, a radically reactive group, and the other of which is oxetanyl group, a cationically reactive group.

| Composition of Coating Liquid for Optically Anisotropic Layer | (% by weight) |
|---|---|
| rod-like liquid crystal (LC-1-1) | 9.79 |
| rod-like liquid crystal (LC-2-1) | 9.78 |
| horizontal orientation agent (LC-1-2) | 0.01 |
| cationic photopolymerization initiator (Cyracure UVI6974 from Dow Chemical Company) | 0.40 |

| | |
|---|---|
| polymerization control agent (IRGANOX1076, Chiba Speciality Chemicals Co., Ltd.) | 0.02 |
| methyl ethyl ketone | 80.0 |

(LC-2-1)

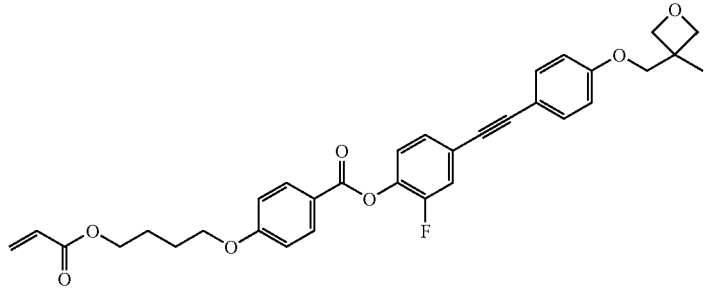

(Preparation of Coating Liquid LC-3 for Optically Anisotropic Layer)

The composition below was prepared, filtered through a polypropylene filter having a pore size of 0.2 μm, and the filtrates were used as coating liquid LC-3 for forming an optically anisotropic layer.

LC-3-1 was synthesized according to the method described in WO93/22397. LC-3-1 is a liquid crystalline compound having two reactive groups, both of which are acrylic groups, radically reactive groups.

| Composition of Coating Liquid for Optically Anisotropic Layer | (% by weight) |
|---|---|
| rod-like liquid crystal (LC-3-1) | 31.93 |
| horizontal orientation agent (LC-1-2) | 0.07 |
| radical photopolymerization initiator (IRGACURE907, Chiba Speciality Chemicals Co., Ltd.) | 1.00 |
| photopolymerization promoter (Kayacure DETX-S, from Nippon Kayaku Co., Ltd.) | 0.33 |
| methyl ethyl ketone | 66.67 |

(LC-3-1)

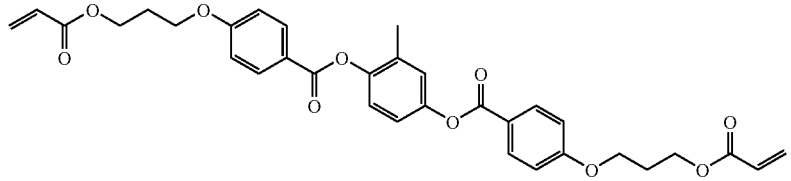

(Preparation of Coating Liquid LC-4 for Optically Anisotropic Layer)

The composition below was prepared, filtered through a polypropylene filter having a pore size of 0.2 μm, and the filtrates were used as coating liquid LC-4 for forming an optically anisotropic layer.

LC-4-1 and LC-4-2 were synthesized according to the method described in D. J. Broer et al., Makromol. Chem. 190, 3201-3215 (1989).

LC-4-3 was synthesized according to the method described in British Patent No. 2,280,445.

LC-3-1 is a liquid crystalline compound having two reactive groups, both of which are acrylic groups, radically reactive groups. LC-4-1, LC-4-2, LC-4-3, and LC-4-4 are a liquid crystalline compounds each having one reactive group, which is acrylic groups, a radically reactive group.

| Composition of Coating Liquid for Optically Anisotropic Layer | (% by weight) |
|---|---|
| rod-like liquid crystal (LC-3-1) | 2.00 |
| rod-like liquid crystal (LC-4-1) | 10.77 |
| rod-like liquid crystal (LC-4-2) | 8.33 |
| rod-like liquid crystal (LC-4-3) | 4.17 |

-continued
| | |
|---|---|
| rod-like liquid crystal (LC-4-4) | 3.33 |
| rod-like liquid crystal (LC-4-5) | 3.33 |
| horizontal orientation agent (LC-1-2) | 0.07 |
| radical photopolymerization initiator (IRGACURE907, Chiba Speciality Chemicals Co., Ltd.) | 1.00 |
| photopolymerization promoter (Kayacure DETX-S, from Nippon Kayaku Co., Ltd.) | 0.33 |
| methyl ethyl ketone | 66.67 |
(LC-4-1)
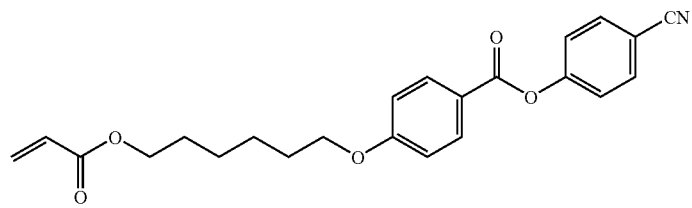
(LC-4-2)
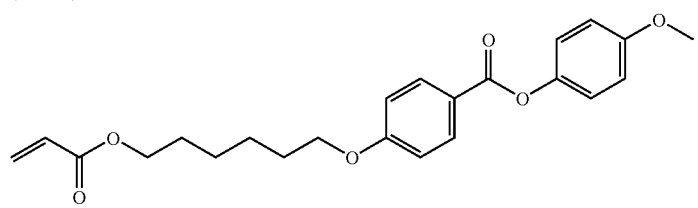
(LC-4-3)
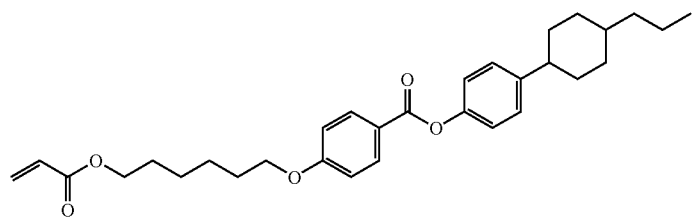
(LC-4-4)
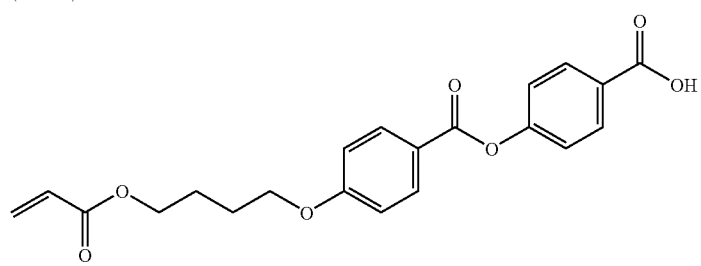
(LC-4-5)
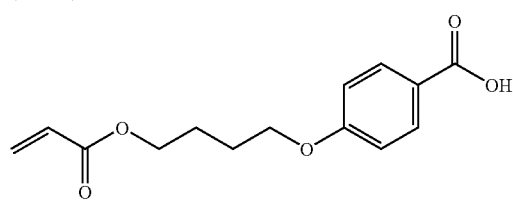

(Preparation of Coating Liquid AD-1 for Adhesive Layer for Transfer)

The composition below was prepared, filtered through a polypropylene filter having a pore size of 0.2 μm, and the filtrate was used as coating liquid AD-1 for forming an adhesive layer for transfer.

| Composition of Coating Liquid for forming Adhesive Layer for Transfer | (% by weight) |
|---|---|
| random copolymer of benzyl methacrylate/methacrylic acid/methyl methacrylate (copolymerization ratio (molar ratio) = 35.9/22.4/41.7, weight-average molecular weight = 38,000) | 8.05 |
| KAYARAD DPHA (from Nippon Kayaku Co., Ltd.) | 4.83 |
| radical polymerization initiator (2-trichloromethyl-5-(p-styrylstyryl)-1,3,4-oxadiazole) | 0.12 |
| hydroquionone monomethyl ether | 0.002 |
| Megafac F-176-PF (from Dainippon Ink and Chemicals, Inc.) | 0.05 |
| propylene glycol monomethyl ether acetate | 34.80 |
| methyl ethyl ketone | 50.538 |
| methanol | 1.61 |

Example 1

Production of Birefringence Pattern Builder and Patterned Birefringent Product (Production of Sample TRC-1 for Evaluation of Optically Anisotropic Layer and Transfer Material for Producing Birefringence Pattern TR-1)

To the surface of a temporary support formed of a 100-μm-thick polyethylene terephthalate film with easily adhesible property (COSMOSHINE A4100 from Toyobo Co., Ltd.), the coating liquid for a dynamic property control layer, CU-1, and the coating liquid for an alignment layer, AL-1, in this order were applied by using a wire bar coater and dried. The obtained layers had dry film thickness of 14.6 μm and 1.6 μm, respectively. Next the coating liquid for optically anisotropic layer, LC-1, was applied to the surface using a wire bar coater, dried under heating at 105° C. on the surface of the film for 2 minutes, to thereby obtain a layer of a liquid crystal phase. The coated layer was then illuminated in the air atmosphere by ultraviolet radiation by using a 160 W/cm, air-cooled metal halide lamp (product of Eyegraphics Co., Ltd.), so as to fix the alignment state of the phase to thereby obtain a 2.4-μm-thick optically anisotropic layer to produce sample TRC-1 for evaluation of the optically anisotropic layer. The ultraviolet ray used was 50 mW/cm$^2$ illuminance in the range of UV-B (integrated value in the wavelength between 280 and 320 nm), and 35 mJ/cm$^2$ irradiation energy in the range of UV-B. The optically anisotropic layer in the sample TRC-1 was formed of polymer which was solid at 20° C., and presented MEK (methyl ethyl ketone)-resistance.

Finally, the coating liquid for adhesive layer for transfer, AD-1, was applied to surface of the sample TRC-1, dried to obtain an adhesive layer for transfer of 1.0-μm-thick, which was then pressure-bonded with a protective film (a 12-μm-thick polypropylene film), to thereby obtain transfer material for producing birefringence pattern TR-1.

(Production of Sample TRC-1-2 for Evaluation of Optically Anisotropic Layer and Transfer Material for Producing Birefringence Pattern TR-1-2 as Comparative Examples)

Sample TRC-1-2 for evaluation of optically anisotropic layer and transfer material for producing birefringence pattern TR-1-2 were produced in a similar manner to those of TRC-1 and TR-1, respectively, except that no ultraviolet radiation was conducted. The optically anisotropic layer in the sample TRC-1-2 was formed of low-molecular-weight compound which was solid at 20° C., and did not present MEK-resistance.

(Production of Sample TRC-2 for Evaluation of Optically Anisotropic Layer and Transfer Material for Producing Birefringence Pattern TR-2 as Comparative Examples)

To the surface of a temporary support formed of a 100-μm-thick polyethylene terephthalate film with easily adhesible property (COSMOSHINE A4100 from Toyobo Co., Ltd.), the coating liquid for a dynamic property control layer, CU-1, and the coating liquid for an alignment layer, AL-1, in this order were applied by using a wire bar coater and dried. The obtained layers had dry film thickness of 14.6 μm and 1.6 μm, respectively. Next the coating liquid for optically anisotropic layer, LC-2, was applied to the surface using a wire bar coater, dried under heating at 95° C. on the surface of the film for 2 minutes, to thereby obtain a layer of a liquid crystal phase. The coated layer was then illuminated in the air atmosphere by ultraviolet radiation by using a 160 W/cm, air-cooled metal halide lamp (product of Eyegraphics Co., Ltd.), so as to fix the alignment state of the phase to thereby obtain a 2.4-μm-thick optically anisotropic layer to produce sample TRC-2 for evaluation of the optically anisotropic layer. The ultraviolet ray used was 240 mW/cm$^2$ illuminance in the range of UV-A (integrated value in the wavelength between 320 and 400 nm), and 200 mJ/cm$^2$ irradiation energy in the range of UV-A. The optically anisotropic layer in the sample TRC-2 was formed of polymer which was solid at 20° C., but did not present MEK-resistance.

Finally, the coating liquid for adhesive layer for transfer, AD-1, was applied to surface of the sample TRC-2, dried to obtain an adhesive layer for transfer of 1.0-μm-thick, which was then pressure-bonded with a protective film (a 12-μm-thick polypropylene film), to thereby obtain transfer material for producing birefringence pattern TR-2.

(Production of Sample TRC-3 for Evaluation of Optically Anisotropic Layer and Transfer Material for Producing Birefringence Pattern TR-3 as Comparative Examples)

To the surface of a temporary support formed of a 100-μm-thick polyethylene terephthalate film with easily adhesible property (COSMOSHINE A4100 from Toyobo Co., Ltd.), the coating liquid for a dynamic property control layer, CU-1, and the coating liquid for an alignment layer, AL-1, in this order were applied by using a wire bar coater and dried. The obtained layers had dry film thickness of 14.6 μm and 1.6 μm, respectively. Next the coating liquid for optically anisotropic layer, LC-3, was applied to the surface using a wire bar coater, dried under heating at 105° C. on the surface of the film for 2 minutes, to thereby obtain a layer of a liquid crystal phase. The coated layer was then illuminated in the air atmosphere by ultraviolet radiation by using a 160 W/cm, air-cooled metal halide lamp (product of Eyegraphics Co., Ltd.), so as to fix the alignment state of the phase to thereby obtain a 1.8-μm-thick optically anisotropic layer to produce sample TRC-3 for evaluation of the optically anisotropic layer. The ultraviolet ray used was 100 mW/cm$^2$ illuminance in the range of UV-A (integrated value in the wavelength between 320 and 400 nm), and 80 mJ/cm$^2$ irradiation energy in the range of UV-A. The optically anisotropic layer in the sample TRC-3 was formed of polymer which was solid at 20° C., and presented MEK-resistance.

Finally, the coating liquid for adhesive layer for transfer, AD-1, was applied to surface of the sample TRC-3, dried to obtain an adhesive layer for transfer of 1.0-μm-thick, which was then pressure-bonded with a protective film (a 12-μm-thick polypropylene film), to thereby obtain transfer material for producing birefringence pattern TR-3.

(Production of Sample TRC-4 for Evaluation of Optically Anisotropic Layer and Transfer Material for Producing Birefringence Pattern TR-4 as Comparative Examples)

To the surface of a temporary support formed of a 100-μm-thick polyethylene terephthalate film with easily adhesible property (COSMOSHINE A4100 from Toyobo Co., Ltd.), the coating liquid for a dynamic property control layer, CU-1, and the coating liquid for an alignment layer, AL-1, in this order were applied by using a wire bar coater and dried. The obtained layers had dry film thickness of 14.6 μm and 1.6 μm, respectively. Next the coating liquid for optically anisotropic layer, LC-4, was applied to the surface using a wire bar coater, dried under heating at 90° C. on the surface of the film for 2 minutes, to thereby obtain a layer of a liquid crystal phase. The coated layer was then illuminated in the air atmosphere by ultraviolet radiation by using a 160 W/cm, air-cooled metal halide lamp (product of Eyegraphics Co., Ltd.), so as to fix the alignment state of the phase to thereby obtain a 1.8-μm-thick optically anisotropic layer to produce sample TRC-4 for evaluation of the optically anisotropic layer. The ultraviolet ray used was 100 mW/cm$^2$ illuminance in the range of UV-A (integrated value in the wavelength between 320 and 400 nm), and 80 mJ/cm$^2$ irradiation energy in the range of UV-A. The optically anisotropic layer in the sample TRC-4 was formed of polymer which was solid at 20° C., and presented MEK-resistance.

Finally, the coating liquid for adhesive layer for transfer, AD-1, was applied to surface of the sample TRC-4, dried to obtain an adhesive layer for transfer of 1.0-μm-thick, which was then pressure-bonded with a protective film (a 12-μm-thick polypropylene film), to thereby obtain transfer material for producing birefringence pattern TR-4.

(Effect of Properties of Optically Anisotropic Layer to Transfer Material for Producing Birefringence Pattern)

Table 3 shows the state and MEK-resistance of each of the samples TRC-1 to 4, and availability of the transfer material for producing birefringence pattern TR-1 to 4 produced therefrom.

TABLE 3

| Number | State at 20° C. | MEK-resistance | property for transfer material for producing birefringence pattern |
|---|---|---|---|
| TRC-1 (present invention) | Solid (polymer) | ○ | ○ |
| TRC-1-2 (Comparative Example) | Solid (low-molecular-weight compound) | X | X(birefringence was disappeared when applied with adhesive layer for transfer) |
| TRC-2 (Comparative Example) | Solid (polymer) | X | X(birefringence was disappeared when applied with adhesive layer for transfer) |
| TRC-3 (Comparative Example) | Solid (polymer) | ○ | ○ |
| TRC-4 (Comparative Example) | Solid (polymer) | ○ | ○ |

As shown in Table 3, in each of the optically anisotropic layer of TRC-1-2 which was formed of low-molecular-weight compound and had no solvent-resistance, and the optically anisotropic layer of TRC-2 which was formed of polymer but had no solvent-resistance, birefringence was disappeared when applied with adhesive layer. Therefore, TRC-1-2 and TRC-2 cannot be used for forming an optically anisotropic layer of transfer material for producing birefringence pattern. On the other hand, the optically anisotropic layer of each TRC-1, TRC-3, and TRC-4 can be used as an optically anisotropic layer of a transfer material for producing birefringence pattern.

In the following, the birefringence pattern builders produced by using TR-1, TC-3, and TR-4 are compared.

(Production of Birefringence Pattern Builder BPM-1 of Present Invention)

A non-alkali glass substrate was cleaned using a rotating nylon-haired brush while spraying a glass cleaner solution conditioned at 25° C. by a shower for 20 seconds. After showered with purified water, the substrate was sprayed with a silane coupling solution (0.3% aqueous solution of N-β-(aminoethyl)-γ-aminopropyl trimethoxysilane, trade name: KBM-603, Shin-Etsu Chemical Co., Ltd.) by a shower for 20 seconds, and then cleaned with a shower of purified water. The obtained substrate was then heated in a substrate preheating heater at 100° C. for 2 minutes.

The above-described transfer material for producing birefringence pattern TR-1, after being separated from its protective film, was laminated onto the substrate preheated at 100° C. for 2 minutes by using a laminator (product of Hitachi Industries Co., Ltd. (model Lamic II)) under a rubber roller temperature of 130° C., a line pressure of 100 N/cm, and a travel speed of 1.4 m/min. After the lamination, the temporary support was delaminated to obtain the birefringence pattern builder BPM-1 of the present invention.

(Production of Birefringence Pattern Builder BPM-3 as Comparative Example)

The birefringence pattern builder BPM-3 as a comparative example was produced in a similar manner to that of BPM-1, except that TR-3 was used instead of TR-1 as the transfer material for producing birefringence pattern.

(Production of Birefringence Pattern Builder BPM-4 as Comparative Example)

The birefringence pattern builder BPM-4 as a comparative example was produced in a similar manner to that of BPM-1, except that TR-4 was used instead of TR-1 as the transfer material for producing birefringence pattern.

(Measurement of Retardation)

Regarding each of the samples BPM-1, BPM-3, and BPM-4, frontal retardation of at an wavelength 545 nm, and each retardation at wavelength of 545 nm when the sample was inclined at ±40° to the axis of rotation for which the fast axis was used, were measured using a fiber-type spectrometer based on the parallel Nicol method. Results of the retardation measurements are shown in Table 4.

TABLE 4

| Sample | frontal Re | 40° Re | −40° Re |
|---|---|---|---|
| BPM-1 (Present Invention) | 201.2 | 182.8 | 175.6 |
| BPM-3 (Comparative Example) | 198.9 | 176.5 | 181.2 |
| BPM-4 (Comparative Example) | 204.6 | 183.3 | 182.1 |

(Measurement of Retardation Disappearance Temperature)

Figure 8:
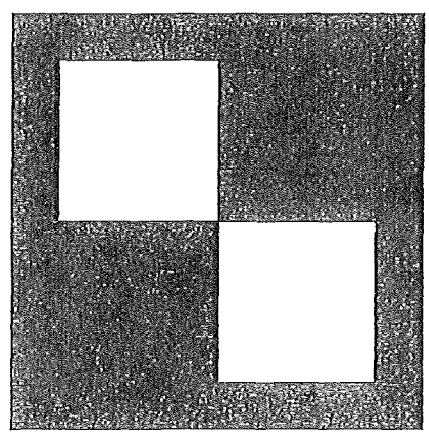
FIG. 8 shows the shape of the photomask I used in Example. White regions are light-exposed domain and black regions are non-light-exposed domain.

Regarding each of the samples BPM-1, BPM-3, and BPM-4, patterned light exposure with energy of 50 mJ/cm$^2$ was conducted by using the maskaligner M-3L manufactured by Mikasa Co., Ltd. and photomask I (FIG. 8). The retardation disappearance temperature was measured by observing each of the obtained light-exposed and non-light-exposed domains through the polarizing microscope Eclipse E600Pol manufactured by Nicon Co., Ltd while heating the sample from room temperature to 250° C. at the rate of 20° C./min on the hot stage manufactured by Mettler Co., Ltd. The results are shown in Table 5.

TABLE 5

| Sample | Retardation Disappearance Temperature (° C.) | |
| --- | --- | --- |
| | non-light-exposed domain | light-exposed domain |
| BPM-1 (Present Invention) | 173 | No Disappearance |
| BPM-3 (Comparative Example) | No Disappearance | No Disappearance |
| BPM-4 (Comparative Example) | 132 | 132 |

The measurement of the retardation disappearance temperature gave the different result between light-exposed and non-light-exposed domains only in BPM-1. This difference can be considered to relate to the existence of an unreacted reactive group in the optically anisotropic layer and the structure of the liquid crystalline compound used in the production of the optically anisotropic layer. That is, the optically anisotropic layer of BPM-1 has acrylic group remained unreacted as the layer was produced through a cationic polymerization of the liquid crystalline compound LC-1-1 having both of acrylic group as a radically reactive group and oxetanyl group as a cationically reactive group, by conducting a light exposure with addition of a cationic polymerization initiator. On the other hand, the optically anisotropic layer of BPM-3 and BPM-4 insufficiently have unreacted reactive groups, as the layers were produced through a radical polymerization of the liquid crystalline compound having only acrylic group as a radically reactive group, by conducting a light exposure with addition of a radical polymerization initiator. This is considered to cause the difference in the retardation disappearance temperatures between light-exposed and non-light-exposed domains only in BPM-1.

In each of the samples, the retardation which was disappeared through the increase of the temperature still remained disappeared even when the temperature was returned to room temperature.

(Production of Retardation Pattern)

Regarding each of the samples BPM-1, BPM-3, and BPM-4, patterned light exposure with energy of 50 mJ/cm$^2$ was conducted by using the maskaligner M-3L manufactured by Mikasa Co., Ltd. and photomask I. Subsequently, baking was conducted in a clean oven at 230° C. for one hour, a retardation pattern of BP-1, BP-3, or BM-4 was produced, respectively. The retardation of light-exposed or non-light-exposed domain of each sample was measured. Results are shown in Table 6.

TABLE 6

| Sample | Re (545) | |
| --- | --- | --- |
| | non-light-exposed domain | light-exposed domain |
| BP-1 (Present Invention) | 1.6 | 197.3 |
| BP-3 (Comparative Example) | 196.7 | 195.8 |
| BP-4 (Comparative Example) | 2.6 | 3.2 |

BP-1, which has retardation disappearance temperatures in the light-exposed domain and retardation disappearance temperatures higher than 250° C. in the non-light-exposed domain, gave clearly different retardation between light-exposed and non-light-exposed domains. On the other hand, BP-3 which has retardation disappearance temperatures higher than 250° C. in the whole part and BP-4 which has a retardation disappearance temperature unchanged before and after a light-exposure gave substantially no difference in retardation between light-exposed and non-light-exposed domains.

Figure 9:
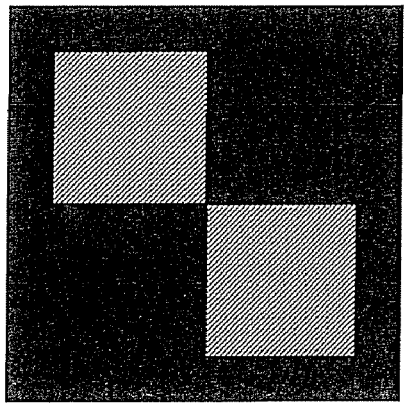
FIG. 9 is a view showing a frame format of the pattern of the patterned birefringent product prepared in Example 1 when it is viewed in a crossed Nicol state.
Figure 9:
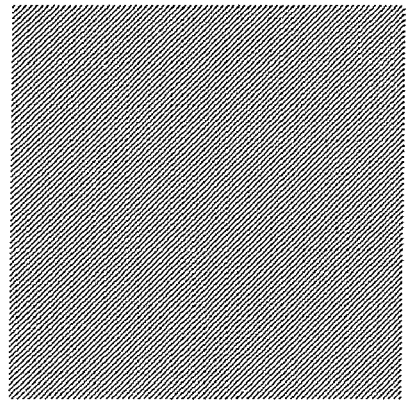
Figure 9:
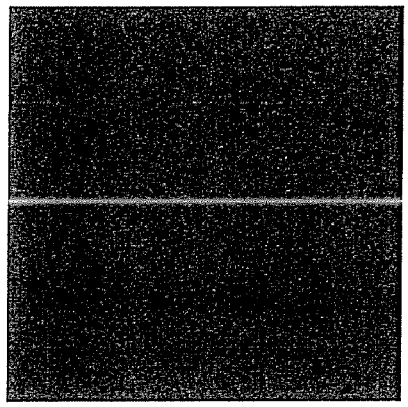

The pattern of the above samples when viewed in a crossed Nicol state is shown in FIG. 9. In the Figure, the evenly black parts are the parts observed as black in a crossed Nicol state, and the parts marked with diagonal lines are the parts observed as pale yellow in a crossed Nicol state. BPM-1, which has retardation disappearance temperature before light exposure and no retardation disappearance temperature after light exposure, gave retardation pattern in BP-1 by conducting patterned-light-exposure and baking in this order, and BP-1 showed a clear pattern of black and pale yellow when viewed in a crossed Nicol state. BP-1 has a low retardation value in the non-light exposed domain and thus the domain is observed as black in a crossed Nicol state, which enables such clear display of the pattern.

On the other hand, BP-3 has retardation remained both in the light-exposed and non-light-exposed domains, and BP-4 has low retardation both in the light-exposed and non-light-exposed domains. Therefore, the production of pattern was difficult in each of BP-3 and BP-4.

Example 2

Birefringence Pattern Builder with Plural Optically Anisotropic Layers Laminated (Production of Transfer Material for Producing Birefringence Pattern TR-5)

Transfer material for producing birefringence pattern TR-5 was produced in a similar manner to that of TR-1 except that the thickness of the optically anisotropic layer was 3.6 μm.

(Production of Birefringence Pattern Builder BPM-5 of the Present Invention)

A non-alkali glass substrate was cleaned using a rotating nylon-haired brush while spraying a glass cleaner solution conditioned at 25° C. by a shower for 20 seconds. After showered with purified water, the substrate was sprayed with a silane coupling solution (0.3% aqueous solution of N-β-(aminoethyl)-γ-aminopropyl trimethoxysilane, trade name: KBM-603, Shin-Etsu Chemical Co., Ltd.) by a shower for 20 seconds, and then cleaned with a shower of purified water. The obtained substrate was then heated in a substrate preheating heater at 100° C. for 2 minutes.

The above-described transfer material for producing birefringence pattern TR-5, after being separated from its protective film, was laminated onto the substrate preheated at 100° C. for 2 minutes by using a laminator (product of Hitachi Industries Co., Ltd. (model Lamic II)) under a rubber roller temperature of 130° C., a line pressure of 100 N/cm, and a travel speed of 1.4 m/min.

After the lamination, the temporary support was delaminated. On the obtained substrate, the transfer material for producing birefringence pattern TR-5 was laminated again in a similar manner to the above. The directions of the slow axes of both of the first- and second-laminated optically anisotropic layers were carefully arranged so as to be about the same to each other.

After the second lamination, the temporary support was delaminated. On the obtained substrate, the transfer material for producing birefringence pattern TR-1 was further laminated again in a similar manner to the above. Again the directions of the slow axes of both of the above two optically anisotropic layers and the presently laminated optically anisotropic layer were carefully arranged so as to be about the same to each other. After the lamination, the temporary support was delaminated to obtain birefringence pattern builder BPM-5 of the present invention with plural optically anisotropic layers laminated (Example 2).

(Production of Retardation Pattern)

BPM-5 was subjected to a patterned light exposure with energy of 50 mJ/cm$^2$ by using the maskaligner M-3L manufactured by Mikasa Co., Ltd. and photomask I. Subsequently, baking was conducted in a clean oven at 230° C. for one hour, and a retardation pattern of BP-5 was produced. The retardation in light-exposed or non-light-exposed domain of each sample was measured. Results are shown in Table 7.

TABLE 7

| Sample | Re (545) | |
| --- | --- | --- |
| | non-light-exposed domain | light-exposed domain |
| BP-5 | 4.2 | 779.2 |

In the above sample, the non-light-exposed domain shows substantially low retardation, whereas the non-light-exposed domain shows high retardation which is almost as high as 800 nm.

Figure 10:
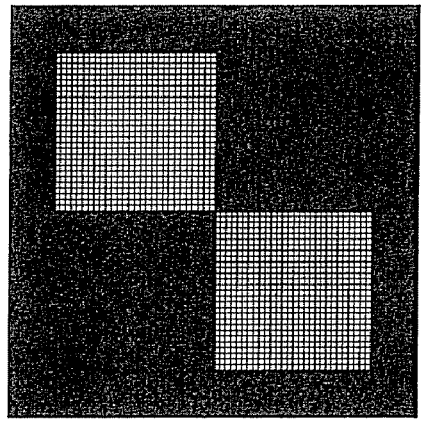
FIG. 10 is a view showing a frame format of the pattern of the patterned birefringent product prepared in Example 2 when it is viewed in a crossed Nicol state.

The pattern of the above samples when viewed in a crossed Nicol state is shown in FIG. 10. In the Figure, the evenly black parts are the parts observed as black in a crossed Nicol state, and the parts marked with grid pattern are the parts observed as yellow green in a crossed Nicol state. As above, a pattern including a domain showing a high retardation value can be obtained by laminating plural optically anisotropic layers.

Example 3

Production of Multi-color Pattern by Repeating Transfer-Light Exposure-Baking Plural Times (Production of Transfer Material for Producing Birefringence Pattern TR-6)

Transfer material for producing birefringence pattern TR-6 was produced in a similar manner to that of TR-1 except that the thickness of the optically anisotropic layer was 1.2 μm.

(Production of Multi-color Birefringence Pattern BP-6 of the Present Invention)

A non-alkali glass substrate was cleaned using a rotating nylon-haired brush while spraying a glass cleaner solution conditioned at 25° C. by a shower for 20 seconds. After showered with purified water, the substrate was sprayed with a silane coupling solution (0.3% aqueous solution of N-β-(aminoethyl)-γ-aminopropyl trimethoxysilane, trade name: KBM-603, Shin-Etsu Chemical Co., Ltd.) by a shower for 20 seconds, and then cleaned with a shower of purified water. The obtained substrate was then heated in a substrate preheating heater at 100° C. for 2 minutes.

The above-described transfer material for producing birefringence pattern TR-1, after being separated from its protective film, was laminated onto the substrate preheated at 100° C. for 2 minutes by using a laminator (product of Hitachi Industries Co., Ltd. (model Lamic II)) under a rubber roller temperature of 130° C., a line pressure of 100 N/cm, and a travel speed of 1.4 m/min.

Figure 11:
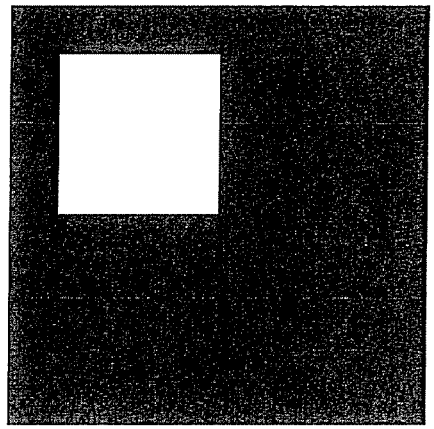
FIG. 11 shows the shape of the photomask II used in Example. White regions are light-exposed domain and black regions are non-light-exposed domain.

After the lamination, the temporary support was delaminated. The obtained substrate was subjected to a patterned light exposure with energy of 50 mJ/cm$^2$ by using the maskaligner M-3L manufactured by Mikasa Co., Ltd. and photomask II (FIG. 11). Subsequently, a baking was conducted in a clean oven at 230° C. for one hour.

On the substrate obtained after the baking, the transfer material for producing birefringence pattern TR-6 was further laminated in a similar manner to the above. The directions of the slow axes of the optically anisotropic layers in the first laminated TR-1 and in the presently laminated TR-6 were carefully arranged so as to be about the same to each other.

Figure 12:
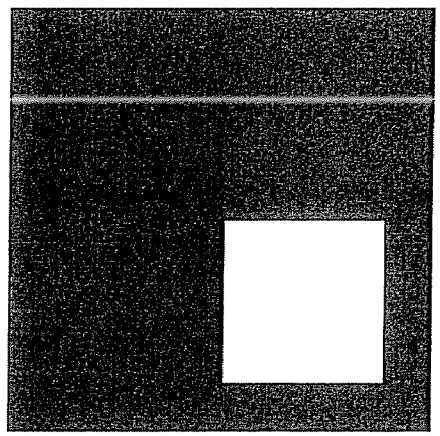
FIG. 12 shows the shape of the photomask III used in Example. White regions are light-exposed domain and black regions are non-light-exposed domain.

After the lamination, the temporary support was delaminated. The obtained substrate was subjected to a patterned light exposure with energy of 50 mJ/cm$^2$ by using the maskaligner M-3L manufactured by Mikasa Co., Ltd. and photomask III (FIG. 12). Subsequently, a baking was conducted in a clean oven at 230° C. for one hour to obtain a multi-color birefringence pattern BP-6 of the present invention.

The retardation in non-light-exposed domain, photomask II-light-exposed domain, or photomask III-light-exposed domain of the sample was measured. Results are shown in Table 8.

TABLE 8

| Sample | Re (545) | | |
| --- | --- | --- | --- |
| | non-light-exposed domain | photomask II light-exposed domain | photomask III light-exposed domain |
| BP-6 | 1.2 | 198.2 | 102.4 |

Each of the non-light-exposed domain, photomask II-light-exposed domain, or photomask III-light-exposed domain gave a different value to each other as the retardation of the sample.

Figure 13:
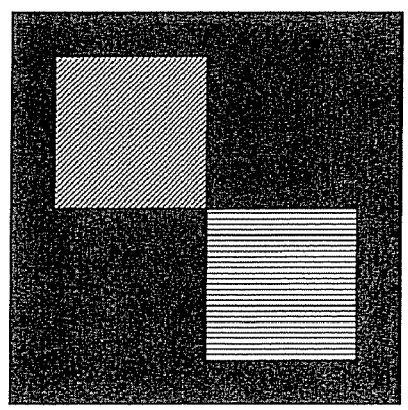
FIG. 13 is a view showing a frame format of the pattern of the patterned birefringent product prepared in Example 3 when it is viewed in a crossed Nicol state.

The pattern of the above samples when viewed in a crossed Nicol state is shown in FIG. 13. In the Figure, the evenly black parts are the parts observed as black in a crossed Nicol state, the parts marked with horizontal lines are the parts observed as white in a crossed Nicol state, and the parts marked with diagonal lines are the parts observed as pale yellow in a crossed Nicol state. As shown above, a multi-value retardation pattern can be easily obtained by independently conducting patterning of each of the plural optically anisotropic layers by repeating the cycle of transfer-patterned light exposure-baking.

Example 4

Production of Birefringence Pattern Having Reflective Layer (Production of Transfer Material for Producing Birefringence Pattern TR-7)

To the surface of a temporary support formed of a 75-μm-thick polyethylene terephthalate film, the coating liquid for a dynamic property control layer, CU-1, and the coating liquid for an alignment layer, AL-1, in this order were applied by using a wire bar coater and dried. The obtained layers had dry film thickness of 14.6 μm and 1.6 μm, respectively. Next the coating liquid for optically anisotropic layer, LC-1, was applied to the surface using a wire bar coater, dried under heating at 105° C. on the surface of the film for 2 minutes, to thereby obtain a layer of a liquid crystal phase. The coated layer was then illuminated in the air atmosphere by ultraviolet radiation by using a 160-W/cm$^2$, air-cooled metal halide lamp (product of Eyegraphics Co., Ltd.), so as to fix the alignment state of the phase to thereby obtain a 1.7-μm-thick optically anisotropic layer. The ultraviolet ray used was 50 mW/cm$^2$ illuminance in the range of UV-B (integrated value in the wavelength between 280 and 320 nm), and 35 mJ/cm$^2$ irradiation energy in the range of UV-B. Finally, the coating liquid for adhesive layer for transfer, AD-1, was applied to the surface, dried to obtain an adhesive layer for transfer of 1.0-

μm-thick, which was then pressure-bonded with a protective film (a 12-μm-thick polypropylene film), to thereby obtain transfer material for producing birefringence pattern TR-7.

(Production of Birefringence Pattern Having Reflective Layer BP-7)

A glass substrate evaporated with aluminum was cleaned using a rotating nylon-haired brush while spraying a glass cleaner solution conditioned at 25° C. by a shower for 20 seconds. After showered with purified water, the substrate was sprayed with a silane coupling solution (0.3% aqueous solution of N-β-(aminoethyl)-γ-aminopropyl trimethoxysilane, trade name: KBM-603, Shin-Etsu Chemical Co., Ltd.) by a shower for 20 seconds, and then cleaned with a shower of purified water. The obtained substrate was then heated in a substrate preheating heater at 100° C. for 2 minutes.

The above-described transfer material for producing birefringence pattern TR-7, after being separated from its protective film, was laminated onto the substrate preheated at 100° C. for 2 minutes by using a laminator (product of Hitachi Industries Co., Ltd. (model Lamic II)) under a rubber roller temperature of 130° C., a line pressure of 100 N/cm, and a travel speed of 1.4 m/min.

After the lamination, the temporary support was delaminated. The obtained substrate after the delamination was then subjected to a patterned light exposure with energy of 50 mJ/cm$^2$ by using the maskaligner M-3L manufactured by Mikasa Co., Ltd. and photomask I.

Subsequently, shower development was carried out using a triethanolamine-base developing solution (containing 2.5% of triethanolamine, a nonionic surfactant, and a polypropylene-base defoaming agent, trade name: T-PD1, product of Fuji Photo Film Co., Ltd.) at 30° C. for 50 seconds, under a flat nozzle pressure of 0.04 MPa, to thereby remove the dynamic property control layer (thermoplastic polymer layer) and the alignment layer.

Thereafter, a baking was conducted in a clean oven at 230° C. for one hour to obtain a birefringence pattern BP-7 having reflective layer of the present invention.

Figure 14:
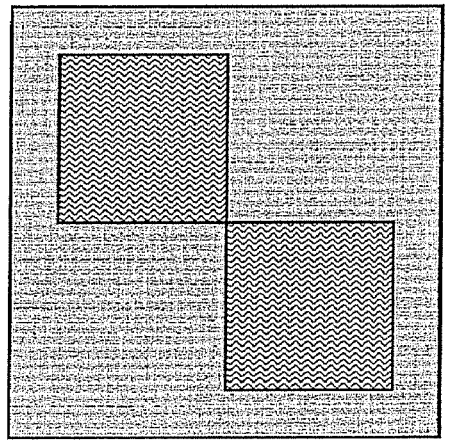
FIG. 14 is a view showing a frame format of the pattern of the patterned birefringent product prepared in Example 4 when it is viewed in a crossed Nicol state.

The pattern of the above sample when viewed through a polarizing plate superimposed thereon is shown in FIG. 14. In the Figure, the gray parts are the parts observed as silver, the parts marked with wavy lines are the parts observed as blue purple. As shown above, a birefringence pattern can be produced to be observed in a reflective mode, wherein the pattern can be identified only by holding a polarizing plate thereon.

Example 5

Production of Birefringence Pattern Having Plural Optically Anisotropic Layer Having Different Slow Axis Direction (Production of Transfer Material for Producing Birefringence Pattern TR-8)

Transfer material for producing birefringence pattern TR-8 was produced in a similar manner to that of TR-7 except that the thickness of the optically anisotropic layer was 3.4 μm.

(Production of Birefringence Pattern Having Plural Optically Anisotropic Layer Having Different Slow Axis Direction BP-8)

A glass substrate evaporated with aluminum was cleaned using a rotating nylon-haired brush while spraying a glass cleaner solution conditioned at 25° C. by a shower for 20 seconds. After showered with purified water, the substrate was sprayed with a silane coupling solution (0.3% aqueous solution of N-β-(aminoethyl)-γ-aminopropyl trimethoxysilane, trade name: KBM-603, Shin-Etsu Chemical Co., Ltd.) by a shower for 20 seconds, and then cleaned with a shower of purified water. The obtained substrate was then heated in a substrate preheating heater at 100° C. for 2 minutes.

The above-described transfer material for producing birefringence pattern TR-7, after being separated from its protective film, was laminated onto the substrate preheated at 100° C. for 2 minutes by using a laminator (product of Hitachi Industries Co., Ltd. (model Lamic II)) under a rubber roller temperature of 130° C., a line pressure of 100 N/cm, and a travel speed of 1.4 m/min.

After the lamination, the temporary support was delaminated. The obtained substrate was subjected to a shower development using a triethanolamine-base developing solution (containing 2.5% of triethanolamine, a nonionic surfactant, and a polypropylene-base defoaming agent, trade name: T-PD1, product of Fuji Photo Film Co., Ltd.) at 30° C. for 50 seconds, under a flat nozzle pressure of 0.04 MPa, to thereby remove the dynamic property control layer (thermoplastic polymer layer) and the alignment layer.

Subsequently, transfer material for producing birefringence pattern TR-8 was laminated in a similar manner. The direction of the slow axis of the second-laminated optically anisotropic layer was arranged so as to be 60° clockwise to the direction of the slow axis of the first-laminated optically anisotropic layer.

After the second lamination, the temporary support was delaminated. The obtained substrate was then subjected to a patterned light exposure with energy of 50 mJ/cm$^2$ by using the maskaligner M-3L manufactured by Mikasa Co., Ltd. and photomask I.

Subsequently, a shower development was conducted using a triethanolamine-base developing solution (containing 2.5% of triethanolamine, a nonionic surfactant, and a polypropylene-base defoaming agent, trade name: T-PD1, product of Fuji Photo Film Co., Ltd.) at 30° C. for 50 seconds, under a flat nozzle pressure of 0.04 MPa, to thereby remove the dynamic property control layer (thermoplastic polymer layer) and the alignment layer.

Thereafter, a baking was conducted in a clean oven at 230° C. for one hour to obtain a birefringence pattern having reflective layer of Example 5.

Figure 15:
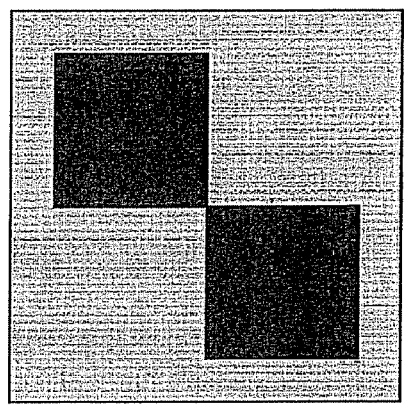
FIG. 15 is a view showing a frame format of the pattern of the patterned birefringent product prepared in Example 5 when it is viewed in a crossed Nicol state.

The pattern of the above sample when viewed through a polarizing plate superimposed thereon is shown in FIG. 15. The polarizing plate was superimposed on the pattern so as that the transmission axis of the polarizing plate is 75° clockwise to the direction of the slow axis of the first-laminated optically anisotropic layer. In the Figure, the gray parts are the parts observed as silver, and the evenly black parts are the parts observed as black. When an image is displayed with a birefringence pattern between a reflective layer and a polarizing plate, expression of black needs wideband λ/4 retardation, which cannot be achieved by a general uniaxial birefringence pattern. In the process of the present invention, the lamination of plural optically anisotropic layers enables easy production of a pattern having wideband λ/4 retardation, and thus a black pattern can be obtained.

Example 6

Production of Product Wherein Birefringence Pattern is Used for Mean of Preventing Forgery (Production of Birefringence Pattern BP-9 Having Reflective Layer)

A substrate including a glass plate and aluminum foil temporarily jointed thereto was prepared and heated in a substrate preheating heater at 100° C. for 2 minutes.

The transfer material for producing birefringence pattern TR-1, after being separated from its protective film, was laminated onto the substrate preheated at 100° C. for 2 minutes by using a laminator (product of Hitachi Industries Co., Ltd. (model Lamic II)) under a rubber roller temperature of 130° C., a line pressure of 100 N/cm, and a travel speed of 1.4 m/min.

Figure 16:
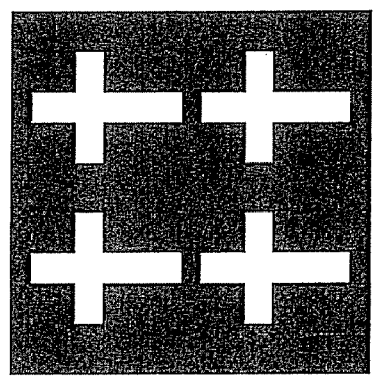
FIG. 16 shows the shape of the photomask IV used in Example. White regions are light-exposed domain and black regions are non-light-exposed domain.

After the lamination, the temporary support was delaminated. The obtained substrate was then subjected to a patterned light exposure with energy of 50 mJ/cm$^2$ by using the maskaligner M-3L manufactured by Mikasa Co., Ltd. and photomask IV (FIG. 16).

The transfer material for producing birefringence pattern TR-6 was laminated again in a similar manner to the above. The directions of the slow axes of both of the first- and second-laminated optically anisotropic layers were carefully arranged so as to be about the same to each other.

Figure 17:
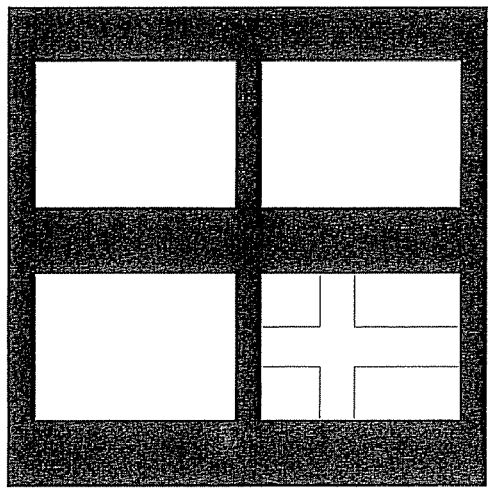
FIG. 17 shows the shape of the photomask V used in Example. White regions are light-exposed domain and black regions are non-light-exposed domain.

After the lamination, the temporary support was delaminated. The obtained substrate was then subjected to a patterned light exposure with energy of 50 mJ/cm$^2$ by using the maskaligner M-3L manufactured by Mikasa Co., Ltd. and photomask V (FIG. 17). Further, after a baking in a clean oven at 230° C. for one hour, the resulting aluminum foil with birefringence pattern stacked thereon was separated form the glass plate to obtain the multi-color birefringence pattern on a reflective layer, BP-9.

Figure 18:
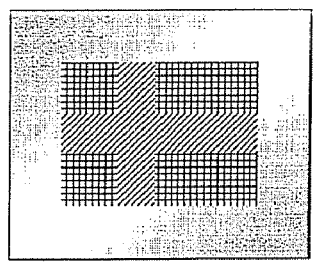
FIG. 18 is an enlarged view showing a pattern observed when the patterned birefringent product prepared in Example 5 is viewed through a polarizing plate.

The enlarged view of the pattern of BP-9 when viewed through a polarizing plate superimposed thereon is shown in FIG. 18. In the Figure, in contrast to the aluminum foil as ground indicating silver, two color pattern including the parts marked with grid pattern indicating dark blue and the parts marked with diagonal lines indicating yellow to orange is observed.

Figure 19:
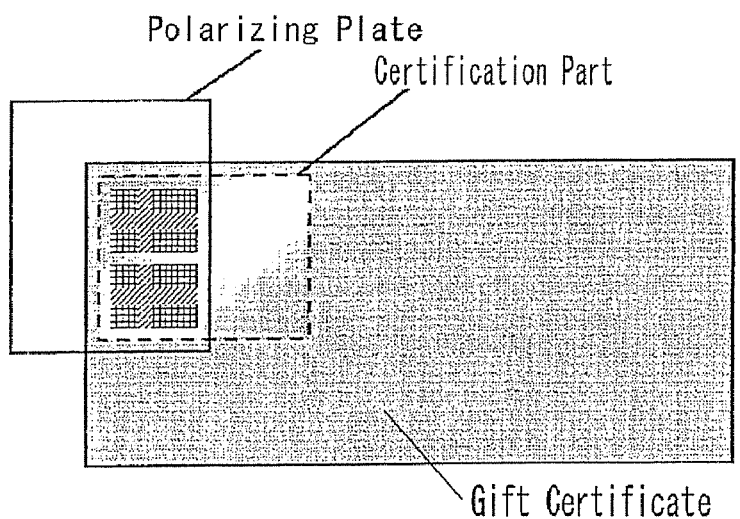
FIG. 19 shows an example wherein the patterned birefringent product prepared in Example 5 cut into suitable-size parts are attached to a gift certificate with adhesive.

FIG. 19 shows an example wherein the birefringence pattern thus produced, which was cut into a suitable-size part, was attached to a gift certificate with adhesive. The certification part in the figure is the reflective part provided with the birefringence pattern. The birefringence pattern in the certification part is almost invisible, but by holding a polarizing plate thereon the pattern became visible as a two color pattern. By the pattern, the identification of true or false can be achieved.

Example 7

Production of Birefringence Pattern by Using Stretched Polymer (Preparation of Coating Liquid OL-1 for Optically Anisotropic Layer)

The composition below was prepared, filtered through a polypropylene filter having a pore size of 0.2 μm, and the filtrates were used as coating liquid OL-1 for forming an optically anisotropic layer.

OL-1-1 was rod-like compound having two reactive groups, one of which is acrylic group, a radically reactive group, and the other of which is oxetanyl group, a cationically reactive group.

CL-1-2 is a surfactant which is added for the purpose of improving coating property. The compound was prepared according to the method described in Tetrahedron Lett., Vol. 43, p. 6793 (2002).

| Composition of Coating Liquid for Optically Anisotropic Layer | (% by weight) |
|---|---|
| rod-like compound (OL-1-1) | 29.17 |
| horizontal orientation agent (CL-1-2) | 0.10 |
| crystalline control agent (Paliocolor LC756, BASF Japan) | 3.33 |
| cationic photopolymerization initiator (CPI100-P, SAN-APRO Co., Ltd.) | 0.67 |
| polymerization control agent (IRGANOX1076, Chiba Speciality Chemicals Co., Ltd.) | 0.07 |
| methyl ethyl ketone | 66.66 |

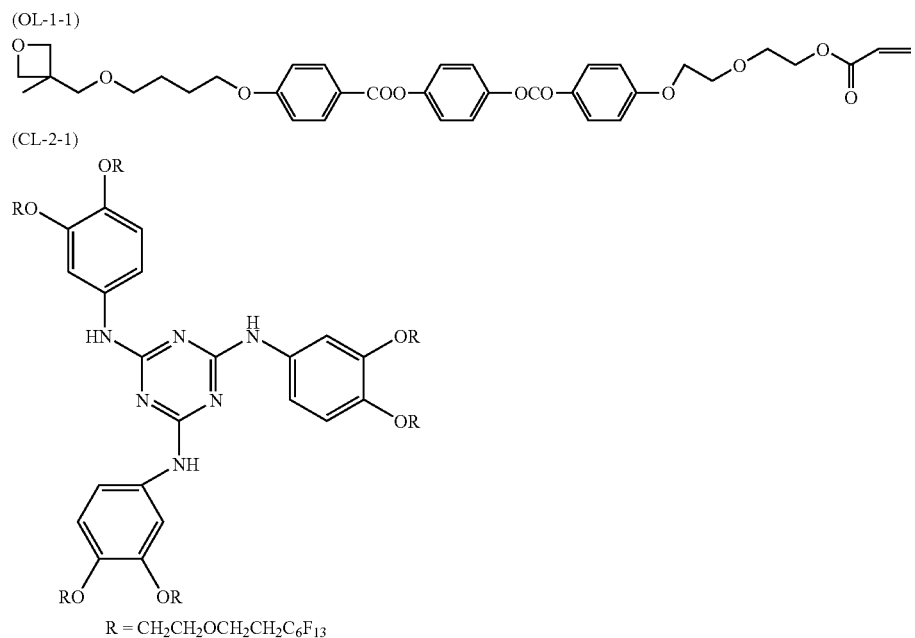

(OL-1-1)

(CL-2-1)

R = CH$_2$CH$_2$OCH$_2$CH$_2$C$_6$F$_{13}$ (Production of Transfer Material for Producing Birefringence Pattern TR-X)

To the surface of a temporary support formed of a 75-μm-thick polyethylene terephthalate film, the coating liquid for a dynamic property control layer CU-1, and the coating liquid for an alignment layer AL-1, in this order were applied by using a wire bar coater and dried. The obtained layers had dry film thickness of 14.6 μm and 1.6 μm, respectively. Next the coating liquid for optically anisotropic layer OL-1, was applied to the surface using a wire bar coater, dried under heating at 110° C. on the surface of the film for 2 minutes. The coated layer was then illuminated in the air atmosphere by ultraviolet radiation by using a 160 W/cm, air-cooled metal halide lamp (product of Eyegraphics Co., Ltd.), so as to fix the alignment state to thereby obtain a 3.5-μm-thick optically anisotropic layer. The ultraviolet ray used was 100 mW/cm$^2$ illuminance in the range of UV-A (integrated value in the wavelength between 320 and 400 nm), and 80 mJ/cm$^2$ irradiation energy in the range of UV-A.

Subsequently, the coating liquid for adhesive layer for transfer AD-1 was applied to surface of the optically anisotropic layer, dried to obtain an adhesive layer for transfer of 1.2-μm-thick. Finally, the sample produced was 50%-stretched at the rate of 10 mm/minute at 90° C. by using Universal Material Testing Instrument, TENSILON, to thereby obtain transfer material for producing birefringence pattern TR-X. The optically anisotropic layer in TR-X was formed of polymer which was solid at 20° C., and presented MEK-resistance.

(Production of Birefringence Pattern Builder BPM-X of Present Invention)

A non-alkali glass substrate was cleaned using a rotating nylon-haired brush while spraying a glass cleaner solution conditioned at 25° C. by a shower for 20 seconds. After showered with purified water, the substrate was sprayed with a silane coupling solution (0.3% aqueous solution of N-β-(aminoethyl)-γ-aminopropyl trimethoxysilane, trade name: KBM-603, Shin-Etsu Chemical Co., Ltd.) by a shower for 20 seconds, and then cleaned with a shower of purified water. The obtained substrate was then heated in a substrate preheating heater at 100° C. for 2 minutes.

The above-described transfer material for producing birefringence pattern TR-X was laminated onto the substrate preheated at 100° C. for 2 minutes by using a laminator (product of Hitachi Industries Co., Ltd. (model Lamic II)) under a rubber roller temperature of 130° C., a line pressure of 100 N/cm, and a travel speed of 1.4 m/min. After the lamination, the temporary support was delaminated to obtain the birefringence pattern builder BPM-X.

(Production of Birefringence Pattern)

BPM-X was subjected to a patterned light exposure with energy of 50 mJ/cm$^2$ by using the maskaligner M-3L manufactured by Mikasa Co., Ltd. and photomask I.

Subsequently, shower development was carried out using a triethanolamine-base developing solution (containing 2.5% of triethanolamine, a nonionic surfactant, and a polypropylene-base defoaming agent, trade name: T-PD1, product of Fuji Photo Film Co., Ltd.) at 30° C. for 50 seconds, under a flat nozzle pressure of 0.04 MPa, to thereby remove the dynamic property control layer and the alignment layer.

Baking was then conducted in a clean oven at 230° C. for one hour, and a retardation pattern of BP-X of the present invention was produced. The retardation of light-exposed or non-light-exposed domain of the sample was measured. Results are shown in Table 9.

TABLE 9

| Sample | Re (545) non-light-exposed domain | Re (545) light-exposed domain |
|---|---|---|
| BP-X | 13.7 | 85.0 |

The produced sample showed clearly different retardation between light-exposed and non-light-exposed domains. As above, the birefringence pattern of the present invention can be produced by using stretching method. When the birefringence pattern is produced by using stretching method, the optical anisotropy of the optically anisotropic layer can be controlled by the degree of the stretching.

(Production of Transfer Material of Example 8)

To the surface of a temporary support formed of a 100-μm-thick polyethylene terephthalate film with easily adhesible property (COSMOSHINE A4100 from Toyobo Co., Ltd.), the coating liquid for a dynamic property control layer CU-1, and the coating liquid for an alignment layer AL-1, in this order were applied by using a wire bar coater and dried. The obtained layers had dry film thickness of 14.6 μm and 1.6 μm, respectively. Next the coating liquid for optically anisotropic layer, LC-1, was applied to the surface using a wire bar coater, dried under heating at 105° C. on the surface of the film for 2 minutes, to thereby obtain a layer of a liquid crystal phase. The coated layer was then illuminated in the air atmosphere by ultraviolet radiation by using a 160 W/cm, air-cooled metal halide lamp (product of Eyegraphics Co., Ltd.), so as to fix the alignment state of the phase to thereby obtain a 3.5-μm-thick optically anisotropic layer. Finally, the coating liquid for adhesive layer for transfer, AD-1, was applied to surface of optically anisotropic layer to thereby obtain transfer material of Example 8.

(Production of Transfer Material of Example 9)

Transfer material of Example 9 was obtained in a similar manner to that of Example 8 except that the thickness of the optically anisotropic layer is 1.8 μm.

(Measurement of Retardation)

Frontal retardation of at an wavelength 545 nm, and each retardation at wavelength of 545 nm when the sample was inclined at ±40° to the axis of rotation for which the fast axis was used, were measured using a fiber-type spectrometer based on the parallel Nicol method. Results of the retardation measurements are shown in Table 10.

TABLE 10

| Sample | Frontal Re | 40° Re | −40° Re |
|---|---|---|---|
| Example 8 | 278.5 | 251.4 | 248.1 |
| Example 9 | 138.9 | 124.6 | 122.9 |

(Production of Substrate for Liquid Crystal Display Device)

A color filter substrate having black matrix and color filter of three color RGB on a glass substrate was formed by a general method described on page 240 of "Color Liquid Crystal Display" edited by Shunsuke Kobayashi, Sangyo Tosho (1994). The above-described transfer material of Example 8 was then laminated onto the color filter substrate preheated at 100° C. for 2 minutes, using a laminator (product of Hitachi Industries Co., Ltd. (model Lamic II)) under a rubber roller temperature of 130° C., a line pressure of 100 N/cm and a travel speed of 2.2 m/min.

After the temporary support was separated therefrom, the substrate was subjected to light exposure in a pattern-making manner using a proximity-type exposure apparatus having an extra-high-voltage mercury lamp (product of Hitachi Electronics Engineering Co., Ltd.), wherein the substrate and a mask (quartz-made photomask having an image pattern formed thereon) were vertically held while keeping a distance between the surface of the photomask and the photosensitive polymer layer of 200 μm away from each other, under an exposure energy of 25 mJ/cm$^2$.

Subsequently, the substrate was baked in a muffle furnace at 230° C. for one hour to obtain a substrate for liquid crystal display device of Example 10 having a retardation pattern as shown in FIG. 7 (c). Further, a substrate for liquid crystal display device of Example 11 was produced in a similar manner to that of Example 10, except that the transfer material of Example 9 was used instead of the transfer material of Example 8.

On the color filter as used in Example 10, the transfer material of Example 8 was laminated in a similar manner to that of Example 10. After the temporary support is separated, coating liquid AD-1 for forming a adhesive layer for transfer (photo-sensitive polymer layer) was spin-coated to form a 2.0 μm-thick photo-sensitive polymer layer. Next, the substrate was subjected to light exposure in a pattern-making manner using a proximity-type exposure apparatus having an extra-high-voltage mercury lamp (product of Hitachi Electronics Engineering Co., Ltd.), wherein the substrate and a mask (quartz-made photomask having an image pattern formed thereon) were vertically held while keeping a distance between the surface of the photomask and the photosensitive polymer layer of 200 μm away from each other, under an exposure energy of 25 mJ/cm$^2$. Thereafter, the photosensitive polymer layer was developed using a shower of a sodium carbonate-base developing solution (containing 0.06 mol/L of sodium hydrogencarbonate, sodium carbonate of the same concentration, 1% of sodium dibutylnaphthalene sulfonate, anionic surfactant, defoaming agent and stabilizer, trade name: T-CD1, product of Fuji Photo Film Co., Ltd.) under a conical nozzle pressure of 0.15 MPa, to thereby obtain a step layer.

After residues were removed using a rotating nylon-haired brush while being blasted with a shower of a cleaning agent (containing phosphate, silicate, nonionic surfactant, defoaming agent and stabilizer, trade name: T-SD1 (product of Fuji Photo Film Co., Ltd.) under a conical nozzle pressure of 0.02 MPa, the substrate was baked in a muffle furnace at 230° C. for one hour to obtain a substrate for liquid crystal display device of Example 12 having a retardation pattern as shown in FIG. 4 (c). Further, a substrate for liquid crystal display device of Example 13 was produced in a similar manner to that of Example 12, except that the transfer material of Example 9 was used instead of the transfer material of Example 8. The pattern of retardation of Examples 12 or 13 was measured and the results are shown in Table 11.

TABLE 11

| Sample | Light-exposed domain Re(545) | Non-Light-exposed domain Re(545) |
|---|---|---|
| Example 12 | 275.5 | 1.8 |
| Example 13 | 134.3 | 0.4 |

Example 14

Production of Semi-transmissive LCD

A transparent electrode film and a polyimide alignment layer were formed on the substrate for liquid crystal display device of Example 13. By using a TFT substrate having a reflective plate as the opposing substrate, semi-transmissive type ECB-LCD was produced.

A LCD as comparative example 1 was produced in a similar manner to that of Example 14 except that whole-area light-exposure was conducted instead of the patterned light-exposure. LCD as comparative example 2 was produced in a similar manner to that of Example 14 except that no light-exposure was conducted. Also, a semi-transmissive LCD having structure shown in FIG. 7 (b) was produced as comparative example 3. Results of visual evaluation of Example 14 and Comparative Example 1 to 3 are shown in Table 12.

TABLE 12

| Sample | Results of Visual Evaluation |
|---|---|
| Example 14 | Good contrast viewing angle property, showing almost non-sensible color shift in the black state. |
| Comparative Example 1 | Tone and color are abnormal, and normal image was not formed. |
| Comparative Example 2 | Tone and color are obviously abnormal, although more normal than those in Comparative Example 1 |
| Comparative Example 3 | Normal when viewed from the front, but viewing angle is narrower than that of Example 14 and tone reversal was observed in the oblique direction |

Industrial Applicability

By the process of the present invention, a patterned birefringent product excellent in resolution and heat-resistance can be obtained. The birefringence pattern is easily pattern-identifiable when observed through a polarizing plate, whereas it is almost transparent and colorless when observed through no polarizing plate, and effective for preventing forgery and addition of color effect. Further, by the process of producing a substrate for liquid crystal display device using the above product, an optically anisotropic layer having patterned retardation can be provided in the liquid crystal cell almost without increasing the number of steps for producing liquid crystal display device, and far thinner semi-transmissive LCD can be produced compared to the conventional one. Particularly, when a transfer material is used, cost can be reduced by the decrease of the number of steps for production. The semi-transmissive LCD having the color filter substrate produced by the above process can contribute to produce thinner device and to improve the viewing angle characteristics.

Cross-Reference to Related Applications

This application claims benefit of priorities under 35 USC 119 to Japanese Patent Applications No. 2006-314089 filed on Nov. 21, 2006, and No. 2007-215185 filed on Aug. 21, 2007.

The invention claimed is:

1. A process of producing a patterned birefringent product, which comprises at least the following steps [1] to [3] in order:

[1] preparing a birefringence pattern builder which comprises an optically anisotropic layer comprising a polymer that has an unreacted reactive group,
wherein the optically anisotropic layer is a layer formed by coating with a solution comprising a liquid crystalline compound having two or more types of reactive groups which have different polymerization conditions from each other, and drying the solution to thereby form a liquid crystal phase, and then applying heat or irradiating ionized radiation to the liquid crystal phase for polymerization and fixation, said optically anisotropic layer has a retardation disappearance temperature in the range higher than 20° C., at said retardation disappearance temperature in-plane retardation becomes 30% or lower of the retardation at 20° C. of the same optically anisotropic layer, and said retardation disappearance temperature rises by light exposure;

[2] subjecting the birefringence pattern builder to patterned light exposure;

[3] heating the birefringence pattern builder obtained after the step [2] at 50° C. or higher and 400° C. or lower.

2. The process according to claim 1, wherein the risen retardation disappearance temperature is not in the range of 250° C. or lower.

3. The process according to claim 1, wherein the in-plane retardation at 20° C. of the birefringence pattern builder is 10 nm or higher.

4. The process according to claim 1, wherein the liquid crystalline compound has a radically reactive group and a cationically reactive group.

5. The process according to claim 4, wherein the radically reactive group is acrylic group and/or methacrylic group and the cationically reactive group is vinyl ether group, oxetanyl group, and/or epoxy group.

6. The process according to claim 1, wherein the optically anisotropic layer is a stretched film.

7. The process according to claim 1, wherein the birefringence pattern builder comprises two or more optically anisotropic layers.

8. The process according to claim 7, wherein the two or more optically anisotropic layers comprises at least two optically anisotropic layers having different direction of slow axis and/or different in-plane retardation to each other.

9. The process according to claim 1, wherein the optically anisotropic layer is a layer provided by conducting transfer of a transfer material comprising the optically anisotropic layer to a target transfer material.

10. The process according to claim 1, which comprises the following steps [13] and [14] in order after the step [2] and before the step [3]:

[13] transferring another birefringence pattern builder on the birefringence pattern builder obtained after the step [2];

[14] subjecting the structure obtained after the step [13] to patterned light exposure.

11. The process according to claim 1, which comprises the following steps [24] to [26] in order after the step [3]:

[24] transferring another birefringence pattern builder on the birefringence pattern builder obtained after the step [3];

[25] subjecting the structure obtained after the step [24] to patterned light exposure;

[26] heating the structure obtained after the step [25] at 50° C. or higher and 400° C. or lower.

\* \* \* \* \*